(12) United States Patent
Eckert et al.

(10) Patent No.: US 9,765,235 B2
(45) Date of Patent: Sep. 19, 2017

(54) PHOTOALIGNING MATERIAL

(75) Inventors: Jean-Francois Eckert, Kientzville (FR); Satish Palika, Zofingen (CH); Andreas Schuster, Freiburg (DE)

(73) Assignee: ROLIC AG, Zug (CH)

( * ) Notice: Subject to any disclaimer, the term of this patent is extended or adjusted under 35 U.S.C. 154(b) by 568 days.

(21) Appl. No.: 14/236,556

(22) PCT Filed: Jul. 24, 2012

(86) PCT No.: PCT/EP2012/064447
§ 371 (c)(1),
(2), (4) Date: Jan. 31, 2014

(87) PCT Pub. No.: WO2013/017467
PCT Pub. Date: Feb. 7, 2013

(65) Prior Publication Data
US 2014/0162076 A1 Jun. 12, 2014

(30) Foreign Application Priority Data

Aug. 2, 2011 (EP) .................................... 11176228
Dec. 5, 2011 (EP) .................................... 11191863

(51) Int. Cl.
*B32B 9/04* (2006.01)
*C09D 179/08* (2006.01)
*C08F 220/18* (2006.01)
*C08G 73/10* (2006.01)
*G02F 1/1337* (2006.01)
*C08F 222/10* (2006.01)

(52) U.S. Cl.
CPC .......... *C09D 179/08* (2013.01); *C08F 220/18* (2013.01); *C08G 73/1075* (2013.01); *C08F 222/1006* (2013.01); *G02F 1/133711* (2013.01); *G02F 1/133788* (2013.01); *G02F 2001/133715* (2013.01); *Y10T 428/31721* (2015.04)

(58) Field of Classification Search
CPC ............ C08F 220/18; C08F 222/1006; C08G 73/1075
USPC ....................................... 428/473.5
See application file for complete search history.

(56) References Cited

U.S. PATENT DOCUMENTS

| | | | |
|---|---|---|---|
| 9,097,938 B2 * | 8/2015 | Eckert | G02F 1/133711 |
| 2003/0232927 A1 | 12/2003 | Gibbons et al. | |
| 2008/0293888 A1 * | 11/2008 | Bachels | C07C 69/92 525/200 |
| 2009/0290109 A1 | 11/2009 | Lee et al. | |
| 2010/0048849 A1 | 2/2010 | Eckert et al. | |
| 2010/0266814 A1 | 10/2010 | Bury et al. | |
| 2012/0076952 A1 | 3/2012 | Bachels et al. | |

FOREIGN PATENT DOCUMENTS

| | | |
|---|---|---|
| DE | 1 078 120 B | 9/1958 |
| EP | 1 818 354 A2 | 8/2007 |
| GB | 872355 A | 7/1961 |
| JP | 58-109479 A | 6/1983 |
| JP | 0231681 B2 | 10/1984 |
| JP | 6-13740 A | 1/1994 |
| JP | 2009-58867 A | 3/2009 |
| JP | 4458299 B2 | 4/2010 |
| JP | 2011507041 A | 3/2011 |
| JP | 2011076066 A | 4/2011 |
| WO | 2007/071091 A1 | 6/2007 |
| WO | 2008/145225 A2 | 12/2008 |

OTHER PUBLICATIONS

STIC Search Peport dated Mar. 21, 2016.*
STIC Search Report dated Dec. 19, 2016.*

* cited by examiner

*Primary Examiner* — Eisa Elhilo
(74) *Attorney, Agent, or Firm* — Sughrue Mion, PLLC

(57) ABSTRACT

The present invention relates to a copolymer for the photoalignment of liquid crystals comprising a photoreactive group as given below in formula (I), compositions thereof, and its use for optical and electro optical devices, especially liquid crystal devices (LCDs).

13 Claims, No Drawings

PHOTOALIGNING MATERIAL

The present invention relates to a copolymer for the photoalignment of liquid crystals comprising a photoreactive group as given below in formula (I), compositions thereof, and its use for optical and electro optical devices, especially liquid crystal devices (LCDs).

There is an ever-growing demand to develop new photoaligning materials for optical and electro-optical applications. Homopolymers have limited flexibility in fine-tuning chemical and/or electro-optical characteristics. Therefore, often blends or formulations are composed which should give access to the desired properties. However, there are drawbacks due to solubility problems, phase seperations, inhomogenties on the alignment layer surface and changes in the electro-optical properties, which are undesirable. To circumvent these drawbacks there is a need for novel photoalignment materials which solve these problems and in addition do not disturb the desired electro-optical properties.

Accordingly, in the present invention a copolymer was found comprising
a) a first monomer having at least one, preferably at least two, photoreactive group of formula (I),

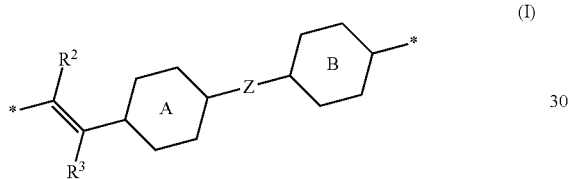

(I)

and, preferably comprising at least one terminal polar group, preferably a halogene group or nitrile, more preferably a fluorine group in the in the end of the monomer which is not linked to the main chain of the copolymer; and wherein the "polar group" is preferably halogen, preferably fluor, chlor, brom, iod, more preferred fluor;

groups containing oxygen, preferably hydroxy, carbonyl, such as a ketone or aldehyde group, carbonate ester, carboxylate, carboxyl acid, carboxyl ester, ether, acetal or ketal group, orthocarbonate ester;

groups containing cations, anions, salts;

groups containing nitrogen, preferably carboxamide, primary amine, secondary amine, tertiary amine, ammonium ion, amide, primary ketimine, secondary ketimine, primary aldimine, secondary aldimine, aminocarbonyl, imide, azide, azo, cyanate, isocyanate, nitrate, nitrile, isonitrile, nitrosooxy, nitro, nitroso, pyridyl, groups containing sulfur, preferably sulfhydryl, sulfide, disulfide, sulfinyl, sulfonyl, sulfino, sulfo, thiocyanate, isothiocyanate, carbonothioyl groups containing phosphorus, preferably phosphino, phosphono, phosphate, groups containing siloxane;

unsubstituted or substituted, branched alkyl, wherein it may be at least one —C—, —CH—, or —CH$_2$-group be replaced by a heteroatom such as —O—, —S—, or by a primary, secondary, tertiary or quartinary nitrogen, which is the ammonimum cation; preferably isopropyl, tert-butyl, sec-butyl, neopentyl, isopentyl;

unsubstituted or substituted, straight-chain alkyl, wherein at least one —C—, —CH—, or —CH$_2$-group is replaced by a heteroatom such as —O—, —S—, or by a primary, secondary, tertiary or quartinary nitrogen, which is the ammonimum cation;

unsubstituted or substituted straight-chain or branched alkenyl, which is preferably alkylacryloyloxy, preferably methacryloyloxy, acryloyloxy, vinyl, vinyloxy, allyl, allyloxy;

unsubstituted or substituted straight-chain or branched alkynyl, which is preferably acetyl;

unsubstituted or substituted carbocyclic or heterocyclic aromatic group or alicyclic group, incorporating preferably five, six, ten of 14 ring atoms, e.g. furan, benzene or phenylene, pyridine, pyrdinium cation, pyrimidine, pyrimidinium cation, naphthalenen, which may form ring assemblies, such as biphenylene or triphenylen, which are uninterrupted or interrupted by at least a single heteroatom and/or at least a single bridging group; or fused polycyclic systems, such as phenanthrene, tetraline. Preferably aromatic group are benzene, phenylene, biphenylene or triphenylen. More preferred aromatic groups are benzene, phenylene and biphenylene; further unsubstituted or substituted alicyclic group is preferably a non-aromatic carbocyclic or heterocyclic group, wherein heterocyclic group denotes a carbocyclic group, wherein at least one —C—, —CH—, or —CH$_2$-group is replaced by a heteroatom such as —O—, —S—, or by a primary, secondary, tertiary or quartinary nitrogen, which is the ammonimum cation; and preferably the alicyclic group is a ring system, with 3 to 30 carbon atoms, and preferably cyclopropane, cyclobutane, cyclopentane, cyclopentene, cyclohexane, cyclohexene, cyclohexadiene, decaline, aziridin, oxirane, thiirane, azrine, aziridium cation, oxirene, thiirene, diazirine diaziridium cation, oxaziridine, oxaziridium cation, dioxirane, azetidine, azetinium cation azete, azetidin cation, oxetane, oxete, thietane, thiete, diazetidine, diazetidinium cation, dioxetane, dioxete, dithietane, dithiete, oxolane, thiolane, pyrrolidine, pyrrolidinium cationpyrrole, thiophene, pyrrole, furan, dioxane, dioxolane, dithiolane, maleinimide, maleinamide, oxazoline, oxazolidine, oxazolidnium cation, oxazole, isooxazole, imidazole, imidazolium cation, imidazolidine, imidazolidinium cation, pyrazolidine, pyrazolidinium ctaion, pyrazole, pyrazolium cation, pyrazoline, thiazolidine, thiazolidinium cation, thiazole, thiazolium cation, thiazoline, isothiazole, furazan, oxadiazole, thiazole, dithiazole, tetrazole, piperidine, a piperidium cation, a piperazium oxane, pyran, thiane, thiopyrane, piperazine, diazine, morpholine, oxazine, thiomorpholine, thiazine, dioxine, dioxane, dithiane, dithiine, triazine, tetrazine, azepane, azepine, such as oxepane, oxepine, thiepane, thiepine, homopiperazine, diazepine, thiazepine, azocane, azocine, oxecane, quinoline, quinolinium cation, benzothiophene, indole, benzofuran, acridine, dibenzothiophene, carbazole, dibenzofuran; ammonium cation, selected from an imidazolium cation, a pyrazolium cation;

more preferred is in the context of the present invention the wording "polar group" represents for example groups containing halogens, preferably fluoro-, chloro-, bromo-, iodo-alkyl, hydroxyl, groups containing oxygen, preferably hydroxyl, ketone or aldehyde group, carbonate ester, carboxylate, carboxyl acid, carboxyl ester, ether, acetal or ketal group, orthocarbonate ester, groups containing nitrogene, preferably carboxamide, primary amine, secondary amine, tertiary amine, ammonium ion, primary ketimine, secondary ketimine, primary aldimine, secondary aldimine, imide, azide, azo, cyanate, isocyanate, nitrate, nitrile, isonitrile, nitrosooxy, nitro, nitroso, pyridyl, unsubstituted or substituted, straight-chain alkyl, wherein at least one —C—, —CH—, or —CH$_2$-group is replaced by a heteroatom such as —O—, —S—, or by a primary, secondary, tertiary or quartinary nitrogen, which is the ammonimum cation;

most preferred is in the context of the present invention the wording "polar group" represents nitril, fluor or fluoralkyl;

and b) a second monomer having at least one monomer selected from the group of compounds having at least one not-photoreactive or at least one photoreactive group, which is preferably represented by a coumarin group, chalcon group, stilbene group or an azobenzene group, preferably by a coumarin group; or or at least a radical scavenger group or at least a sensitizer group, wherein the radical scavenger is preferably a group comprising a thiol or hydroxy group; or lactone groups, such as benzofuranone derivatives; or acrylated bis-phenol-groups; or substituted or unsubstituted piperidine ring;

and wherein a sensitizer group is preferably a photosensitizer group, such as an polymerization initiator functional group, which is an amine or an aromatic ketone, such as benzophenone, an acetophenone, a benzyl, a benzoin, cationic photinitiator, thioxanthone group and derivaties thereof or a 4-methylbenzophenone group, a 4,4'-bis(dimethylamino) benzophenone group; or a thioxanthone group, 4,4'-thio-michler's ketone group;

with the proviso that the second monomer is different from the first monomer, and wherein Z represents a bridging group, A and B independently from each other represent an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms, $R^2$ and $R^3$ are independently from each other hydrogen, halogen or nitrile; unsubstituted or with halogen substituted $C_1$-$C_{12}$alkyl, in which one or more C-atom, CH—or CH$_2$-group may be replaced by a linking group; preferably $R^2$ and $R^3$ are independently from each other hydrogen, nitrile or fluorine, and more preferably $R^2$ and $R^3$ are hydrogen and/or nitrile.

Preferably, the present invention relates to a copolymer according to any of the preceding claims 1 or/and 2 comprising a first monomer having two photoreactive groups of formula (I) and a second monomer having at least one not-photoreactive or at least one photoreactive group, with the proviso that the second monomer is different from that the first monomer.

Further more preferably, the present invention relates to a copolymer comprising a first monomer of formula (I) and a second monomer having at least one not-photoreactive or at least one photoreactive group, preferably one not-photoreactive or at least one photoreactive group, in a molar ratio of 1:1 (mol of first monomer: mol of second monomer); or second monomer is in a mol ratio in relation to the total mol amount of the copolymer, of >10°/0 mol, preferably >20% mol, more preferably >25% mol and most preferably >30% mol.

In addition, preferred in the present invention is a copolymer comprising a first monomer of formula (I) and a second monomer having at least one not-photoreactive or at least one photoreactive group, wherein if the second monomer has a photoreactive group of (I), then the two rings A and B of formula (I) have no halogene substitution, more preferably no fluor substitution, or wherein, if the first monomer has a terminal nitril dubstituent, the second monomer has a halogen substituent, preferably a fluor substituent; preferably the fluor substitution is in the terminal group of the side chain or/and the rings A and B of formula (I) of the second monomer are fluor substituted.

In addition, preferred in the present invention are a copolymer comprising a first monomer of formula (I) and a second monomer having at least one not-photoreactive or at least one photoreactive group, Wherein, if the second monomer has a photoreactive group of (I), then "Z" is not —OCF$_2$—or "Z" of the first and second monomer are identical.

In addition, preferred in the present invention is a copolymer comprising a first monomer of formula (I) and a second monomer having at least one not-photoreactive or at least one photoreactive group, wherein if the second monomer has a photoreactive group of (I), then this photoreactive group of (I), is linked to the main chain by $C_1$-$C_{24}$alkylen, in which one or more C-atom, CH—or CH$_2$-group may be replaced by a linking group as described in the present invention; preferably by a linking group wherein the phenylene group is excluded.

Preferably, the second monomer comprises a photoreactive group, which is selected from formula (I), a coumarin group, a chalcon group, a stilbene group and an azobenzene group.

Preferred copolymers comprise a first monomer having two photoreactive groups of formula (I) and a second monomer having one not-photoreactive group.

Further, preferably the not-photoreactive group, is a carbocyclic or heterocyclic aromatic and/or alicyclic or aliphatic group, which is unsubstituted or substituted by an acrylate group, vinyl group, allyl group, epoxy group, maleinimide group, straight-chain or branched $C_1$-$C_{16}$alkyl group, $C_1$-$C_{16}$alkylacrylate group, $C_1$-$C_{16}$alkylvinyl group, $C_1$-$C_{16}$alkylallyl group, $C_1$-$C_{16}$alkylepoxy group, $C_1$-$C_{16}$alkylmaleinimide group, preferably unsubstituted or substituted by $C_1$-$C_{16}$alkylacrylate group, more preferably by $C_1$-$C_6$alkylacrylate group. More preferably the not-photoreactive group is an unsubstituted or substituted steroidal skeleton such as a cholesterol group, which is uninterrupted or interrupted by at least a single heteroatom and/or at least a single bridging group. Preferably, a cholesterol group is cholesteryl, cholestanyl, cholestan. In the context of the present invention the photoreactive or non-photoreactive group may be reactive by heat treatment, and is preferably also a thermic reactive group.

More preferred is a not-photoreactive group substituted or unsubstituted and selected from a carbocyclic or heterocyclic aromatic group, preferably a substituted or unsubstituted phenylen-(bridging group)-phenylene-, or -(phenylene)$_{n1}$-

(bridging group)$_{m1}$-(phenylene)$_{n2}$-(bridging group)$_{m1}$-(cyclohexylen)$_{n3}$-, wherein bridging group has the same meaning and preferences as given below, and n1, n2, n3 represent an integer of 0, 1, 2, 3, 3 or 4 and m1, m2 an integer of 0 or 1, with proviso that at least one n1, n2, n3 or n4 is >1; or the not-photoreactive group is naphthylene or phenylene, which are unsubstituted or substituted by at least one, preferably two, acrylate group, vinyl group, allyl group, epoxy group, maleinimide group, straight-chain or branched $C_1$-$C_{16}$alkyl group, $C_1$-$C_{16}$alkylacrylate group, $C_1$-$C_{16}$alkylvinyl group, $C_1$-$C_{16}$alkylallyl group, $C_1$-$C_{16}$alkylepoxy group, $C_1$-$C_{16}$alkylmaleinimide group, preferably unsubstituted or substituted by $C_1$-$C_{16}$alkylacrylate group, more preferably by $C_1$-$C_6$alkylacrylate group; or selected from a carbocyclic or heterocyclic alicyclic group, preferably a steroidal skeleton, preferred steroidal skeleton is a cholesterol group, which is uninterrupted or interrupted by at least a single heteroatom and/or at least a single bridging group. More preferred steroid skeleton is a cholesterol group, preferred is cholesteryl, cholestanyl, cholestan.

Especially more preferred is a not-photoreactive group substituted or unsubstituted a carbocyclic or heterocyclic aromatic group, preferably selected from di-(phenyl)alkylen, such as -phenylene-ethylene-phenylene-; -phenylene-propylene-phenylene-, -phenylene-isopropylene-phenylene-, phenylene-butylene-phenylene-, -phenylene-pentylene-phenylene-naphthylene, phenylene, fluorene, benzoic acid, benzyl alcohol, benzoic acid, 2-methoxybenzoic acid, octafluoro-biphenyl, benzidine, fluorenone, 3,5,3',5'-tetrabromo-biphenyl, 2,2'-dichloro-1,1'-biphenyl, 1,11-dimethyl-5,7-dihydro-dibenzo(a,c)cyclohepten-6-one, dibenzo(1,2)dithiine, benzo-phenone, diphenylmethane, 4,4-bis-(4-hydroxyphenyl)-valeric acid, 2,2-bis(4-hydroxyphenyl)-hexafluoropropane, 2,2-bis(4-methylphenyl)-hexafluoropropane, 2,2-bis(phenyl)hexa-fluoropropane, bis-(4-chloro-phenyl)-methanone, bis-(4-dimethyl-phenyl)-methanone, benzidine-3,3'-dicarboxylic acid, 1,1'-binaphthyl, diphenyl-3,3'-diglycolic acid, dihydroethidium, 2,2'-dichloro-5,5'-dimethoxybenzidine, 3-methoxybenzidine, 3,3'-dichlorobenzidine (diphenyl-d6), 2,2'-bis(trifluoromethyl)benzidine, 3,3'-bis(trifluoromethyl)-benzidine, 3,3'-dichloro-benzidine-d6, tetramethylbenzidine; or selected from a carbocyclic or heterocyclic alicyclic group, preferably a steroidal skeleton, preferred steroidal skeleton is a cholesterol group, which is uninterrupted or interrupted by at least a single heteroatom and/or at least a single bridging group. More preferred steroid skeleton is a cholesterol group, preferably is cholesteryl, cholestanyl, cholestan.

Preferably A represents an unsubstituted or substituted carbocyclic or heterocyclic aromatic group selected from a monocyclic ring of five or six atoms, two adjacent monocyclic rings of five or six atoms, a bicyclic ring system of eight, nine or ten atoms, or a tricyclic ring system of thirteen or fourteen atoms; and B represents an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;

$R^2$ and $R^3$ are independently from each other hydrogen, halogen or nitrile; unsubstituted or with halogen substituted $C_1$-$C_{12}$alkyl, in which one or more C-atom, CH— or $CH_2$-group may be replaced by a linking group; preferably $R^2$ and $R^3$ are independently from each other hydrogen, nitrile or fluorine, and more preferably $R^2$ and $R^3$ are hydrogen and/or nitrile.

Substituents of the aromatic or alicyclic groups are for example a straight-chain or branched $C_1$-$C_{16}$alkyl group, which is unsubstituted or substituted by fluorine, di-($C_1$-$C_{16}$alkyl)amino, $C_1$-$C_{15}$alkyloxy, nitro, nitrile and/or chlorine; and wherein one or more C-atom, CH— or $CH_2$-group may independently from each other be replaced by a linking group; halogen or nitrile. Preferred substituents are $C_1$-$C_6$alkyl group, especially methyl or ethyl, $C_1$-$C_6$alkoxy group, especially methoxy or ethoxy, chlorine, fluorine, or nitrile, more preferably methoxy, chlorine, fluorine, or CN and most preferably methoxy, chlorine or fluorine. Further, if the aromatic group is substituted, then it is preferably substituted once or twice.

Substituents of B are preferably halogen, $C_1$-$C_{16}$alkoxy, $C_1$-$C_{16}$alkyl, nitro or nitrile, preferably methoxy, fluorine, chlorine or nitrile, and more preferably fluorine.

DEFINITIONS

In the context of the present invention the term "copolymer" has also the meaning of "co oligomer". Copolymers according to the various non-limiting embodiments herein may have a polymeric or oligomeric form of a random copolymer, a block copolymer, a graft copolymer, a linear copolymer, a branched copolymer, a hyperbranched copolymer, a dendritic copolymer or a star copolymer. In specific non-limiting embodiments, the copolymers may include a polymer chain where different sections may have different forms, such as, for example, a random polymeric section and a block polymeric section. Formation of copolymers having one or more of the recitied forms may be accomplished using polymerization methods known in the art, including, but not limited to, addition polymerization, condensation, polymerization, controlled "living" polymerization, anionic polymerization, cationic polymerization, and radical polymerization.

In the context of the present invention the wording "terminal fluorine group" has the meaning of fluorine, or with at least one, preferably three or five and more preferably three fluorine substituted $C_1$-$C_{16}$alkyl group, especially $C_1$-$C_{12}$alkyl group, more especially $C_1$-$C_6$alkyl group, wherein one or more C-atom, CH— or $CH_2$-group is independently from each other not replaced or replaced by a linking group within the above given meaning and preferences; especially a C-atom, CH— or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—$CONCH_3$—, —O—, —CO, —CO—O—, —O—CO—, —CH=CH—, —C≡C—, —O—CO—O—.

In the context of the present invention halogen represents fluorine, chlorine, bromine, or iodine and preferably fluorine or chlorine and more preferably fluorine.

Preferred $C_1$-$C_{30}$alkyl is preferably $C_1$-$C_{16}$alkyl, more preferably $C_1$-$C_{12}$alkyl, most preferred $C_1$-$C_6$alkyl such as methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicsyl, uneicosyl, docosyl, tricosyl or triacontyl; more preferred C$_1$-C$_6$alkyl is for example methyl, ethyl, propyl, butyl, pentyl or hexyl. Preferred di-(C$_1$-C$_{16}$alkyl)amino or C$_1$-C$_{16}$alkyloxy has for the alkyl term the same preferences and meanings as given above.

Preferred C$_1$-C$_{24}$alkylen is methylen, ethylen, propylen, isopropylen, butylen, sec.-butylen, tert.-butylen, pentylen, hexylen, heptylen, octylen, nonylen, decylen, undecylen, dodecylen, tridecylen, tetradecylen, pentadecylen or hexadecylen; more preferred C$_1$-C$_{16}$alkylen is methylen, ethylen, propylen, butylen, pentylen, hexylen.

The term "bridging group" as used in the context of the present invention is preferably selected from —O—, —CO—, —CH(OH)—, —CH$_2$(CO)—, —OCH$_2$—, —CH$_2$O—, —O—CH$_2$—O—, —COO—, —OCO—, —OCF$_2$—, —CF$_2$O—, —CF$_2$—, —CON(C$_1$-C$_{16}$alkyl)-, —(C$_1$-C$_{16}$alkyl)NCO—, —CONH—, —NHCO—, —HNOCO—, —OCONH—, —NHCONH—, —OCOO—, —CO—S—, —S—CO—, —CSS, —SOO—, —OSO—, —SOS—, —SO—, —CH$_2$(SO)—, —SO$_2$—, —CH═CH—, —C≡C—, —CH═CH—COO—, —OCO—CH═CH—, —CH═N—, —C(CH$_3$)═N—, —N═N—, or a single bond; or a cyclic, straight-chain or branched, substituted or unsubstituted C$_1$-C$_{24}$alkylen, wherein one or more C-atom, CH— or CH$_2$-group may independently from each other be replaced by a linking group.

Preferably, the bridging group is —O—, —CO—, —COO—, —OCO—, —OCOO—, —OCF$_2$—, —CF$_2$O—, —CON(CH$_3$)—, —(CH$_3$)NCO—, —CONH—, —NHCO—, —CO—S—, —S—CO—, —CSS, —SOO—, —OSO—, —CSS—, —SOO—, —OSO—, —CH$_2$(SO$_2$)—, —CH$_2$—CH$_2$—, —OCH$_2$—, —CH$_2$O—, —CH═CH—, —C≡C—, —CH═CH—COO—, —OCO—CH═CH—, or a single bond.

More preferably bridging group is —COO—, —OCO—, —OCOO—, —OCF$_2$—, —CF$_2$O—, —CON(CH$_3$)—, —(CH$_3$)NCO—, —CONH—, —NHCO—, —CO—S—, —S—CO—, —CS—S—, —SOO—, —OSO, especially —COO—, —OCO—, —OCF$_2$—, —CF$_2$O—, —CON(CH$_3$)—, —(CH$_3$)NCO—, —CONH—, —NHCO— or a single bond.

Most preferred bridging group is a single bond, —COO— or —OCO—.

The term "linking group", as used in the context of the present invention is preferably be selected from a single bond, —S—, —S(CS)—, —(CS)S—, —CO—S—, —S—CO—, —O—, —CO, —CO—O—, —O—CO—,

—NR$^{2'}$—, —NR$^{2'}$—CO—, —CO—NR$^{2'}$—, —NR$^{2'}$—CO—O—, —O—CO—NR$^{2'}$—, —NR$^{2'}$—CO—NR$^{2'}$—, —CH═CH—, —C≡C—, —O—CO—O—, —Si(CH$_3$)$_2$—O—Si(CH$_3$)$_2$—, a cyclic, straight-chain or branched, substituted or unsubstituted C$_1$-C$_{24}$alkylen, wherein one or more C-atom, CH— or CH$_2$-group may independently from each other be replaced by —O—; and unsubstituted or substituted cyclohexylen and unsubstituted or substituted phenylene and wherein:

R$^{2'}$ represents a hydrogen atom or C$_1$-C$_6$alkyl; especially hydrogen or methyl; with the proviso that oxygen atoms of linking groups are not directly linked to each other;

preferred is a single bond, —O—, —O(CO), —S—, —(CO)O— or

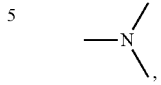

—NR$^{2'}$—.

The "carbocyclic or heterocyclic aromatic group" and "aromatic group" as used in the context of the present invention represents five, six, ten or 14 ring atoms, e.g. furan, benzene or phenylene, pyridine, triazine, pyrimidine, biphenylene, naphthalene, phenanthrene, triphenylene, tetraline which are uninterrupted or interrupted by at least a single heteroatom and/or at least a single bridging group; preferred are benzene, phenylene, naphthalene, biphenylene, phenanthrene, or triphenylen and more preferred are benzene, phenylene and biphenylene, especially phenylene.

The term "phenylene", as used in the context of the present invention for the substituents A or B in formula (I), preferably denotes a 1,2-, 1,3-, 1,4-, 1,2,4,- or 1,3,4,6-phenylene group, which is optionally substituted. It is preferred that the phenylene group is either a 1,3- or a 1,4-phenylene group. 1,4-phenylene groups are especially preferred.

The "alicyclic group" represents for example ring systems, with 3 to 40 carbon atoms, preferably C$_{17}$-C$_{40}$ carbon atoms as for example cyclopropane, cyclobutane, cyclopentane, cyclopentene, cyclohexane, cyclohexene, cyclohexadiene, decaline, tetrahydrofuran, dioxane, pyrrolidine, piperidine or a steroidal skeleton such as cholesterol, which are uninterrupted or interrupted by at least a single heteroatom and/or at least a single bridging group; and preferred are cyclohexane or a steroidal skeleton.

Further, preferred is a copolymer comprising
a) a first monomer having at least one, preferably at least two, photoreactive group of formula (II)

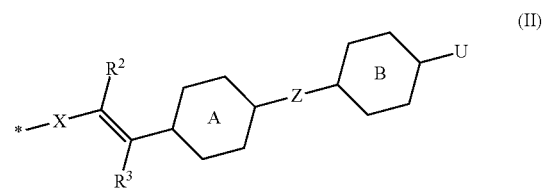

wherein
Z has the meanings and preferences as described above,
A and B independently from each other represent an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms, preferably A and B are benzene or phenylene, pyridine, triazine, pyrimidine, biphenylene, naphthalene, phenanthrene, triphenylene, tetraline which are uninterrupted or interrupted by at least a single heteroatom and/or at least a single bridging group; preferred are benzene, phenylene, naphthalene, biphenylene, phenanthrene, or triphenylen and more preferred are benzene, phenylene and biphenylene, especially phenylene, or a steroidal skeleton; further preferred B is cyclohexylene or a steroidal skeleton;

U represents hydrogen or a straight-chain or branched, unsubstituted or at least once, with halogen, nitile, ether, ester, siloxane, amide or amine substituted $C_1$-$C_{16}$alkyl group, especially $C_1$-$C_{12}$alkyl group, more especially $C_1$-$C_6$alkyl group, wherein one or more C-atom, CH— or $CH_2$-group is independently from each other not replaced or replaced by a linking group within the above given meaning and preferences; especially a C-atom, CH— or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—$CONCH_3$—, —O—, —CO, —CO—O—, —O—CO—, —CH═CH—, —C≡C—, —O—CO—O—, or unsubstituted or substituted cyclohexylen or unsubstituted or substituted phenylene;

preferably U is hydrogen; or unsubstituted, or with halogen, nitrile, ether, ester, amide or amine; preferably with fluorine or nitrile, especially with 1, 2, 3, 4, 5, 6, 7, 8, 9 or 10, more especially with 1, 2, 3, 4, 5, 6 or 7, and most especially by 1, 2, 3 or 5 fluorine; substituted $Q^1$-($C_1$-$C_6$alkylen), wherein one or more C-atom, CH— or $CH_2$-group is independently from each other not replaced or replaced by a linking group within the above given meaning and preferences; especially a C-atom, CH— or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—$CONCH_3$—, —O—, —CO, —CO—O—, —O—CO—, —CH═CH—, —C≡C—, —O—CO—O—, or unsubstituted or substituted cyclohexylen or unsubstituted or substituted phenylene; and wherein $Q^1$ represents a single bond or —NH—, —N($CH_3$)—, —NH—CO—, —CO—NH—, —NH—CO—O—, —O—CO—NH—, —NH—CONH—, —CON($CH_3$)—, —($CH_3$)NCO—, —O—, —CO—, —COO—, —OCO—, —$OCF_2$—, —$CF_2$—O—, —$CF_2$S—, —$SCF_2$—, —$CF_2$NH—, —$NHCF_2$—, —S—, —CS—, —SCS—, —SCO—, —CH═CH—, —C≡C— or —O—CO—O—;

preferably $Q^1$ is —O—, —CO—, —COO—, —OCO— or a single bond more preferably —O— or a single bond;

preferably the fluorine substituents are in the terminal position of the alkyl group, at the opposite side of the linkage to ring B, more preferably the alkyl group is represented or has as terminal group a fluorine alkyl residue of formula —$CF_3$—$CF_2$H, —$CH_2$F, —$CF_2CF_3$, —$CF_2CHF_2$, —$CF_2CH_2F$, —$CFHCF_3$, —$CFHCHF_2$, —$CFHCH_2F$, —$CF_2CH_3$, —$CFHCHF_2$, —$(CF_2)_2CF_3$, —$(CF_2)_2CHF_2$, —$(CF_2)_2CH_2F$, —$(CF_2)_2CH_3$, —$(CF_2)_3CHF_2$, —$(CF_2)_3CH_2F$, —$(CF_2)_3CF_3$, —$CF(CF_3)_2$ or —$CF_2(CHF)CF_3$, and most preferably of formula —$CF_2H$, —$CF_2H$, —$CH_2F$, —$CF_3$, —$CF_2CF_3$, —$CF_2CHF_2$; and especially most preferably of formula —$CF_3$, —$CH_2F$, —$CF_2CF_3$, especially —$CF_3$;

more preferably U is hydrogen, —$CF_3$—$CF_2H$, —$CH_2F$, -$Q^1$-($C_1$-$C_6$alkylen)-$CF_3$, -$Q^1$-($C_1$-$C_6$ alkylen)-$CF_2H$, -$Q^1$-($C_1$-$C_6$ alkylen)-$CH_2F$, -$Q^1$-($C_1$-$C_6$ alkylen)-$CF_2CF_3$, -$Q^1$-($C_1$-$C_6$ alkylen)-$CF_2CHF_2$, -$Q^1$-($C_1$-$C_6$ alkylen)-$CF_2CH_2F$, -$Q^1$-($C_1$-$C_6$ alkylen)-$CFHCF_3$, -$Q^1$-($C_1$-$C_6$ alkylen)-$CFHCHF_2$, -$Q^1$-($C_1$-$C_6$ alkylen)-$CFHCH_2F$, -$Q^1$-($C_1$-$C_6$alkylen)-$CF_2CH_3$, -$Q^1$-($C_1$-$C_6$ alkylen)-$CFHCHF_2$, -$Q^1$-($C_1$-$C_6$ alkylen)-$(CF_2)_2CF_3$, -$Q^1$-($C_1$-$C_6$ alkylen)-$(CF_2)_2CHF_2$, -$Q^1$-($C_1$-$C_6$alkylen)-$(CF_2)_2CH_2F$, -$Q^1$-($C_1$-$C_6$alkylen)-$(CF_2)_2CH_3$, -$Q^1$-($C_1$-$C_6$alkylen)-$(CF_2)_3CHF_2$, -$Q^1$-($C_1$-$C_6$alkylen)-$(CF_2)_3CH_2F$, -$Q^1$-($C_1$-$C_6$alkylen)-$(CF_2)_3CF_3$, -$Q^1$-($C_1$-$C_6$alkylen)-$CF(CF_3)_2$, -$Q^1$-($C_1$-$C_6$alkylen)-$CF_2(CHF)CF_3$, wherein one or more C-atom, CH— or $CH_2$—, group is independently from each other not replaced or replaced by a linking group within the above given meaning and preferences;

especially a C-atom, CH— or $CH_2$—, group is replaced by —NH—, —$NCH_3$—, —NH—CO—, —CO—NH—, —NH—CO—O—, —O—CO—NH—, —NH—CONH—, —$NCH_3$—, —$NCH_3$—CO—, —CO—$NCH_3$—, —$NCH_3$—CO—O—, —O—CO—$NCH_3$—, —$NCH_3$—$CONCH_3$—, —O—, —CO, —CO—O—, —O—CO—, —CH═CH—, —C≡C—, —O—CO—O—, or unsubstituted or substituted cyclohexylen or unsubstituted or substituted phenylene;

wherein -$Q^1$- has the meaning and preferences given above;

$R^2$ and $R^3$ independently from each represent hydrogen, fluorine, chlorine, nitrile, unsubstituted or with fluorine substituted $C_1$-$C_{12}$alkyl, in which one or more C-atom, CH— or $CH_2$-group may be replaced by a linking group; preferably $R^2$ and $R^3$ are independently from each other represents hydrogen and/or nitrile, preferably hydrogen;

X is a bivalent aromatic group, such as phenylene, especially 1,4-phenylene; or X is —$CH_2$—, —CO—, —CS—, —O(CO)—, —(CO)O—, —NH(CO)—, —(CO)NH—, —$OCF_2$—, —$SCF_2$—, —NH—$CF_2$—, (($C_1$-$C_6$alkyl)-N)CO—, preferably (($CH_3$)N)CO—, or —S(CS)—, —O(CS), —S(CO) preferably —O(CO)—, and b) a second monomer having at least one monomer selected from the group of compounds having at least one not-photoreactive or at least one photoreactive group, with the proviso that the second monomer is different from the first monomer.

More preferred is a copolymer comprising a) a first monomer of formula (II) with the same meaning and preferences as described above comprising at least one, preferably at least two, photoreactive groups of formula (II), wherein U is a straight-chain or branched, with fluorine, especially with 1, 2, 3, 4, 5, 6, 7, 8, 9 or 10, more especially with 1, 2, 3, 4, 5, 6 or 7, and most especially by 1, 2, 3 or 5 fluorine, in the terminal position of the alkyl group substituted $C_1$-$C_{16}$alkyl group, especially $C_1$-$C_{12}$alkyl group, more especially $C_1$-$C_6$alkyl group, wherein one or more C-atom, CH— or $CH_2$-group is independently from each other not replaced or replaced by a linking group within the above given meaning and preferences; especially a C-atom, CH— or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—$CONCH_3$—, —O—, —CO, —CO—O—, —O—CO—, —CH═CH—, —C≡C—, —O—CO—O—, or unsubstituted or substituted cyclohexylen or unsubstituted or substituted phenylene;

and b) a second monomer having at least one monomer selected from the group of compounds having at least one photoreactive group of formula (II) with the same meaning and preferences as described above, preferably A and B are benzene or phenylene, pyridine, triazine, pyrimidine, biphenylene, naphthalene, phenanthrene, triphenylene, tetraline which are uninterrupted or interrupted by at least a single heteroatom and/or at least a single bridging group; preferred are benzene, phenylene, naphthalene, biphenylene, phenanthrene, or triphenylen and more preferred are benzene, phenylene and biphenylene, especially phenylene, or a steroidal skeleton; further preferred B is cyclohexylene or a steroidal skeleton; further preferred A is phenylene and B is cyclohexylene, or A is phenylene and B is phenylene, or A is phenylene and B is a steroidal skeleton;

with the proviso that the U substituent is different from that of the first monomer, preferably, wherein the U substituent is a straight-chain or branched, with fluorine, especially with 1, 2, 3, 4, 5, 6, 7, 8, 9 or 10, more especially with 1, 2, 3, 4, 5, 6 or 7, and most especially by 1, 2, 3 or 5 fluorine, in the terminal position of the alkyl group unsubstituted or substituted $C_1$-$C_{16}$alkyl group, especially $C_1$-$C_{12}$alkyl group, more especially $C_1$-$C_6$alkyl group, wherein one or more C-atom, CH—or $CH_2$-group is independently from each other not replaced or replaced by a linking group within the above given meaning and preferences; especially a C-atom, CH—or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—CON$CH_3$—, —O—, —CO, —CO—O—, —O—CO—, —CH═CH—, —C≡C—, —O—CO—O—, or unsubstituted or substituted cyclohexylen or unsubstituted or substituted phenylene.

Most preferred is a copolymer comprising a) a first monomer of formula (II) with the same meaning and preferences as described above comprising at least one, preferably at least two, photoreactive groups of formula (II), preferably wherein A and B are benzene or phenylene, pyridine, triazine, pyrimidine, biphenylene, naphthalene, phenanthrene, triphenylene, tetraline which are uninterrupted or interrupted by at least a single heteroatom and/or at least a single bridging group; preferred are benzene, phenylene, naphthalene, biphenylene, phenanthrene, or triphenylen and more preferred are benzene, phenylene and biphenylene, especially phenylene, or a steroidal skeleton; further preferred B is cyclohexylene or a steroidal skeleton; further preferred A is phenylene and B is cyclohexylene, or A is phenylene and B is phenylene, or A is phenylene and B is a steroidal skeleton; and wherein U is a straight-chain or branched, with fluorine, especially with 1, 2, 3, 4, 5, 6, 7, 8, 9 or 10, more especially with 1, 2, 3, 4, 5, 6 or 7, and most especially by 1, 2, 3 or 5 fluorine, and especially most especially with 3 fluorine atoms, in the terminal position of the alkyl group substituted or unsubstituted $C_1$-$C_{16}$alkyl group, especially $C_1$-$C_{12}$alkyl group, more especially $C_1$-$C_6$alkyl group, wherein one or more C-atom, CH—or $CH_2$-group is independently from each other not replaced or replaced by a linking group within the above given meaning and preferences; especially a C-atom, CH—or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—CON$CH_3$—, —O—, —CO, —CO—O—, —O—CO—, —CH═CH—, —C≡C—, —O—CO—O—, or unsubstituted or substituted cyclohexylen or unsubstituted or substituted phenylene, and b) a second monomer having at least one monomer selected from the group of compounds having at least one photoreactive group of formula (II) with the same meaning and preferences as described above, preferably A and B are benzene or phenylene, pyridine, triazine, pyrimidine, biphenylene, naphthalene, phenanthrene, triphenylene, tetraline which are uninterrupted or interrupted by at least a single heteroatom and/or at least a single bridging group; preferred are benzene, phenylene, naphthalene, biphenylene, phenanthrene, or triphenylen and more preferred are benzene, phenylene and biphenylene, especially phenylene, or a steroidal skeleton; further preferred B is cyclohexylene or a steroidal skeleton; further preferred A is phenylene and B is cyclohexylene, or A is phenylene and B is phenylene, or A is phenylene and B is a steroidal skeleton;

with the proviso that the U substituent is different from that of the first monomer, preferably, wherein the U substituent is a straight-chain or branched, with fluorine, especially with 1, 2, 4, 5, 6, 7, 8, 9 or 10, more especially with 1, 2, 4, 5, 6 or 7, and most especially by 1, 2, 4 or 5 fluorine, most especially with 5 fluorine in the terminal position of the alkyl group unsubstituted or substituted $C_1$-$C_{16}$alkyl group, especially $C_1$-$C_{12}$alkyl group, more especially $C_1$-$C_6$alkyl group, wherein one or more C-atom, CH—or $CH_2$-group is independently from each other not replaced or replaced by a linking group within the above given meaning and preferences; especially a C-atom, CH—or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—CON$CH_3$—, —O—, —CO, —CO—O—, —O—CO—, —CH═CH—, —C≡C—, —O—CO—O—, or unsubstituted or substituted cyclohexylen or unsubstituted or substituted phenylene.

Further most preferred is a copolymer comprising a) a first monomer of formula (II) with the same meaning and preferences as described above comprising at least two photoreactive groups of formula (II), preferably, wherein U is a straight-chain or branched, with 3 fluorine atoms, in the terminal position of the alkyl group substituted $C_1$-$C_{16}$alkyl group, especially $C_1$-$C_{12}$alkyl group, more especially $C_1$-$C_6$alkyl group, wherein one or more C-atom, CH—or $CH_2$-group is independently from each other not replaced or replaced by a linking group within the above given meaning and preferences; especially a C-atom, CH—or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—CON$CH_3$—, —O—, —CO, —CO—O—, —O—CO—, —CH═CH—, —C≡C—, —O—CO—O—, or unsubstituted or substituted cyclohexylen or unsubstituted or substituted phenylene, and b) a second monomer having at least one monomer selected from the group of compounds having at least one not-photoreactive or at least one photoreactive group, preferably one photoreactive group, and more preferably with one photoreactive group of formula (II) with the same meaning and preferences as described above, preferably A and B are benzene or phenylene, pyridine, triazine, pyrimidine, biphenylene, naphthalene, phenanthrene, triphenylene, tetraline which are uninterrupted or interrupted by at least a single heteroatom and/or at least a single bridging group; preferred are benzene, phenylene, naphthalene, biphenylene, phenanthrene, or triphenylen and more preferred are benzene, phenylene and biphenylene, especially phenylene, or a steroidal skeleton; further preferred B is cyclohexylene or a steroidal skeleton; further preferred A is phenylene and B is cyclohexylene, or A is phenylene and B is phenylene, or A is phenylene and B is a steroidal skeleton; with the proviso that the U substituent is different from that of the first monomer, preferably, wherein the U substituent is a straight-chain or branched, with fluorine, especially with 1, 2, 4, 5, 6, 7, 8, 9 or 10, more especially with 1, 2, 4, 5, 6 or 7, and most especially by 1, 2, 4 or 5 fluorine, most especially with 5 fluorine in the terminal position of the alkyl group substituted or unsubstituted $C_1$-$C_{16}$alkyl group, especially $C_1$-$C_{12}$alkyl group, more especially $C_1$-$C_6$alkyl group, wherein one or more C-atom, CH— or $CH_2$-group is independently from each other not replaced or replaced by a linking group within the above given meaning and preferences; especially a C-atom, CH— or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—$CONCH_3$—, —O—, —CO, —CO—O—, —O—CO—, —CH═CH—, —C≡C—, —O—CO—O—, or unsubstituted or substituted cyclohexylen or unsubstituted or substituted phenylene; or a photoreactive group represented by a coumarin group, chalcon group, stilben group or an azobenzene group, preferably by a coumarin group;

with the proviso that the second monomer is different from the first monomer.

The main chain of the copolymer of the present invention is not particularly limited. Preferred main chain is polyamic acid, polyimide, polyamine, polyamic acid ester, polyester, polyamide, polysiloxane, cellulose, polyacetal, polyurea, polyurethane, polyorganosilane, polystyrene, poly(styrenephenyl-maleimide), polyacrylate, poly(meth)acrylate, polymaleimide, polynorbornene, polyhydroxyalkylenether, polyhydroxyether, polyhydroxyetheramine, polyaminoalkylenether, or poly-2-chloroacrylate, poly-2-phenylacrylate, poly-acrylamide, poly-methacrylamide, poly-2-chloroacrylamide, poly-2-phenyl-acrylamide, poly-N—($C_1$-$C_6$)alkyl substituted acrylamide-, poly-N—($C_1$-$C_6$)alkyl substituted methacrylamide, poly-N—($C_1$-$C_6$)alkyl substituted 2-chloroacrylamide, poly-N—($C_1$-$C_6$)alkyl substituted 2-phenylacrylamide, poly-vinyl ether, poly-vinyl ester, poly-vinyl, poly-carboxylic acid, poly-carboxylic halogenid, poly-carbonyl, poly-siloxane, poly-hydroxy, poly-halogenid and derivatives or a mixture thereof.

A polyamic acid, polyimide, polyamic acid ester, polystyrene derivative and poly(styrenephenylmaleimide)-derivative are preferred, polyamic acid ester, polyamic acid and polyimide are more preferred, and polyamic acid and polyimide are particularly preferred. In addition, more preferred is a copolymer comprising a) a first monomer of formula (II) with the same meaning and preferences as described above comprising at least one, preferably at least two, photoreactive groups of formula (II), wherein U is a straight-chain or branched, with fluorine, especially with 1, 2, 3, 4, 5, 6, 7, 8, 9 or 10, more especially with 1, 2, 3, 4, 5, 6 or 7, and most especially by 1, 2, 3 or 5 fluorine, in the terminal position of the alkyl group substituted $C_1$-$C_{16}$alkyl group, especially $C_1$-$C_{12}$alkyl group, more especially $C_1$-$C_6$alkyl group, wherein one or more C-atom, CH— or $CH_2$-group is independently from each other not replaced or replaced by a linking group within the above given meaning and preferences; especially a C-atom, CH— or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—$CONCH_3$—, —O—, —CO, —CO—O—, —O—CO—, —CH═CH—, —C≡C—, —O—CO—O—, or unsubstituted or substituted cyclohexylen or unsubstituted or substituted phenylene;

and b) a second monomer having at least one monomer selected from the group of compounds having at least one photoreactive group of formula (II) wherein A, Z, $R^2$, $R^3$ and U have the same meaning and preferences as given above, and B represent an unsubstituted or substituted carbocyclic or heterocyclic alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms, and preferably B is cyclopentane, cyclopentene, cyclohexane, cyclohexene, cyclohexadiene, decaline, tetrahydrofuran, dioxane, pyrrolidine, piperidine or a steroidal skeleton such as cholesterol, which are uninterrupted or interrupted by at least a single heteroatom and/or at least a single bridging group; and preferred are cyclohexane or a steroidal skeleton, preferably cyclohexene or steroidal skeleton, U represents hydrogen or a straight-chain or branched, unsubstituted or at least once, with halogen, nitile, ether, ester, siloxane, amide or amine substituted $C_1$-$C_{16}$alkyl group, especially $C_1$-$C_{12}$alkyl group, more especially $C_1$-$C_6$alkyl group, wherein one or more C-atom, CH— or $CH_2$-group is independently from each other not replaced or replaced by a linking group within the above given meaning and preferences; especially a C-atom, CH— or $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—$CONCH_3$—, —O—, —CO, —CO—O—, —O—CO—, —CH═CH—, —C≡C—, —O—CO—O—, or unsubstituted or substituted cyclohexylen or unsubstituted or substituted phenylene.

Preferred second monomer of the copolymer of formula (I) or (II), comprising a not-photoreactive group, is a diamine compound, and especially a diamine compound within the meaning and preference of the diamines "D", "$D^1$" or "$D^2$" as given below in the present invention, with the proviso that "D", "$D^1$" or "$D^2$" is not a radical group which is linked to the main chain of the copolymer of formula (I) or (II), however "D", "$D^1$" or "$D^2$" is saturated at this potential linking position with hydrogen.

Preferred first and/or second monomer, especially first monomer, comprising a photoreactive group of formula (I) is represented by for example a group of formula (IV)

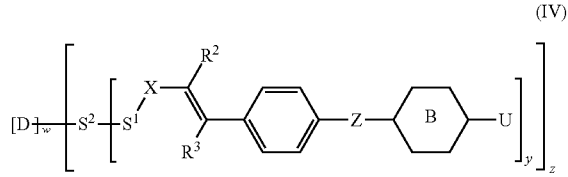

wherein X, Z, $R^2$, $R^3$ and U has the same meaning and preferences as given above; preferably Z has the meaning and preferences as described above, B represents an unsubstituted or substituted benzene or phenylene, pyridine, triazine, pyrimidine, biphenylene, naphthalene, phenanthrene, triphenylene, tetraline, preferably phenylene, or an alicyclic group selected from cyclopropane, cyclobutane, cyclopentane, cyclopentene, cyclohexane, cyclohexene, cyclohexadiene, decaline, tetrahydrofuran, dioxane, pyrrolidine, piperidine and a steroidal skeleton, preferably cyclohexane or a steroidal skeleton; more preferably B is phenylene or a cyclohexane group $R^2$ and $R^3$ are hydrogen and/or nitrile, X is a bivalent aromatic group, such as phenylene, especially 1,4-phenylene; or X is —$CH_2$—, —CO—, —CS—, —O(CO)—, —(CO)O—, —NH(CO)—, —(CO)NH—, —$OCF_2$—, (($C_1$-$C_6$alkyl)-N)CO—, preferably (($CH_3$)N)CO—, or —S(CS)—, —O(CS), —S($CO_3$) preferably —O(CO)—;

U is hydrogen, or with a polar group especially fluor or nitrile substituted or unsubstituted $C_1$-$C_{16}$alkyl group, especially $C_1$-$C_{12}$alkyl group, more especially $C_1$-$C_6$alkyl group; or —$CF_3$—$CF_2H$, —$CH_2F$, -$Q^1$-($C_1$-$C_6$alkylen)-$CF_3$, -$Q^1$-($C_1$-$C_6$ alkylen)-$CF_2H$, -$Q^1$-($C_1$-$C_6$ alkylen)-$CH_2F$, -$Q^1$-($C_1$-$C_6$ alkylen)-$CF_2CF_3$, -$Q^1$-($C_1$-$C_6$ alkylen)-$CF_2CHF_2$, -$Q^1$-($C_1$-$C_6$ alkylen)-$CF_2CH_2F$, -$Q^1$-($C_1$-$C_6$ alkylen)-$CFHCF_3$, -$Q^1$-($C_1$-$C_6$ alkylen)-$CFHCHF_2$, -$Q^1$-($C_1$-$C_6$ alkylen)-$CFHCH_2F$, -$Q^1$-($C_1$-$C_6$alkylen)-$CF_2CH_3$, -$Q^1$-($C_1$-$C_6$ alkylen)-$CFHCHF_2$, -$Q^1$-($C_1$-$C_6$ alkylen)-$(CF_2)_2CF_3$, -$Q^1$-($C_1$-$C_6$ alkylen)-$(CF_2)_2CHF_2$, -$Q^1$-($C_1$-$C_6$alkylen)-$(CF_2)_2CH_2F$, -$Q^1$-($C_1$-$C_6$alkylen)-$(CF_2)_2CH_3$, -$Q^1$-($C_1$-$C_6$alkylen)-$(CF_2)_3CHF_2$, -$Q^1$-($C_1$-$C_6$alkylen)-$(CF_2)_3CH_2F$, -$Q^1$-($C_1$-$C_6$alkylen)-$(CF_2)_3CF_3$, -$Q^1$-($C_1$-$C_6$alkylen)-$CF(CF_3)_2$, -$Q^1$-($C_1$-$C_6$alkylen)-$CF_2(CHF)CF_3$;

wherein one or more C-atom, CH—or $CH_2$-group is independently from each other not replaced or replaced by a linking group within the above given meaning and preferences;

especially a C-atom, CH—or $CH_2$—, group is replaced by —NH—, —$NCH_3$—, —N—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—CONCH_3—, —O—, —CO, —CO—O—, —O—CO—, —CH=CH—, —C≡C—, —O—CO—O—, or unsubstituted or substituted cyclohexylen or unsubstituted or substituted phenylene; and wherein $Q^1$ represents a single bond or —NH—, —N($CH_3$)—, —NH—CO—, —CO—NH—, —NH—CO—O—, —O—CO—NH—, —NH—CONH—, —CON($CH_3$)—, —($CH_3$)NCO—, —O—, —CO—, —COO—, —OCO—, —$OCF_2$—, —$CF_2$—O—, —$CF_2S$—, —$SCF_2$—, —$CF_2NH$—, —$NHCF_2$—, —S—, —CS—, —SCS—, —SCO—, —CH=CH—, —C≡C—or —O—CO—O—; preferably $Q^1$ is —O—, —CO—, —COO—, —COO—or a single bond more preferably —O—or a single bond;

D represents an unsubstituted or substituted aliphatic, aromatic or/and alicyclic polymerisable group, preferably a diamine group having from 1 to 40 carbon atoms, more preferably with the proviso that a 1,3-diamino phenyl group is excluded, y and z are each independently from each other 1, 2, 3 or 4, preferably 1 or 2;

w is 1,2,3,4 and preferably 1 or 2, $S^1$ and $S^2$ each independently from each other represents a single bond or a spacer unit, which is a cyclic, straight-chain or branched, substituted or unsubstituted $C_1$-$C_{24}$alkylen, in which one or more, preferably non-adjacent, C-atom, CH—or $CH_2$-group may be replaced by a linking group, and/or a non-aromatic, aromatic, unsubstituted or substituted carbocyclic or heterocyclic group of formula (V):

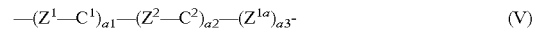

$$—(Z^1—C^1)_{a1}—(Z^2—C^2)_{a2}—(Z^{1a})_{a3}- \quad (V)$$

wherein:

$C^1$, $C^2$ each independently represents an alicyclic or aromatic, optionally substituted carbocyclic or heterocyclic group, preferably connected to each other via the bridging groups $Z^1$ and $Z^2$ and/or $Z^{1a}$, preferably $C^1$ and $C^2$ are connected at the opposite positions via the bridging groups $Z^1$ and $Z^2$ and/or $Z^{1a}$, so that groups $S^1$ and/or $S^2$ have a long molecular axis, and $Z^1$, $Z^2$, $Z^{1a}$ each independently represents a bridging group within the above given meanings and preferences, and $a_1$, $a_2$, $a_3$ each independently represents an integer from 0 to 3, such that $a_1+a_2+a_3 \leq 6$, preferably $a_3$ is 0 and $a_1+a_2 \leq 4$, preferably $S^1$ and $S^2$ each independently from each other represents a single bond or a spacer unit, which is a straight-chain or branched, substituted, or unsubstituted $C_1$-$C_{24}$alkylen, preferably $C_1$-$C_{12}$alkylen, more preferably $C_1$-$C_6$alkylen, in which one or more, preferably non-adjacent, C-atom, CH—or $CH_2$—, group may be replaced by a linking group, preferably replaced by is a single bond, —O—, —O(CO), —S—, —(CO)O—or

—$NR^{2'}$—, and $R^{2'}$ is as described above and wherein the substituent of $C_1$-$C_{24}$alkylen is preferably at least one $C_1$-$C_6$alkyl, preferably methyl; more preferably $S^1$ is straight-chain or branched $C_1$-$C_6$alkylen, —O—, —$CH_2$—, —S—and preferably —O—, $S^2$ represents a single bond or a spacer unit, which is a straight-chain or branched, substituted or unsubstituted $C_1$-$C_{24}$alkylen, in which one or more, preferably non-adjacent, C-atom, CH—or $CH_2$—, group may be replaced by a linking group, and, preferably replaced by is a single bond, —O—, —O(CO), —S—, —(CO)O—or

—$NR^2$, and wherein the substituent is preferably at least one $C_1$-$C_6$alkyl, preferably methyl.

Preferably, D represents an unsubstituted or substituted aliphatic, aromatic or/and alicyclic polymerisable group, The wording "polymerizable group" as used in the context of the present invention refers to a functional group that can be subjected to polymerization (optionally with other comonomers) to yield an oligomer, dendrimer or polymer according to the present invention. For a person skilled in the art it will be obvious which functional groups are intended for any specific polymer. Thus for example in case of "imid monomer" as the indicated polymer backbone group it is obvious to a person skilled in the art that the actual monomer units for polymerization to yield a polyimid are e.g. diamines and dianhydrides. Similarly regarding "urethane monomer" the actual monomer units are diols and diisocyanates.

D is preferably selected from unsubstituted or substituted acrylate, methacrylate, 2-chloroacrylate, 2-phenylacrylate, optionally N-lower alkyl substituted acrylamide, methacrylamide, 2-chloroacrylamide, 2-phenylacrylamide, vinyl, allyl, vinyl ether and ester, allyl ether and ester, carbonic acid ester, acetal, urea, maleinimide, norbornene, epoxy, styrene and styrene derivatives, for example alpha-methylstyrene, p-methylstyrene, p-tert-butyl styrene, organosilane, p-chlorostyrene, etc., siloxane, diamine, imide monomers, amic acid monomers and their esters, amidimide monomers, maleic acid and maleic acid derivatives, for example, di-n-butyl maleate, dimethyl maleate, diethyl maleate, etc, fumaric acid and fumaric acid derivatives, for example, di-n-butyl fumarate, di-(2-ethylhexyl) fumarate, etc, urethanes or their corresponding homo- and co-polymers. More preferably the polymerizable group D is selected from acrylate, methacrylate, vinyl ether and ester, epoxy, styrene derivatives, siloxane, diamine, norbornene, imide monomers, amic acid monomers and their corresponding homo and copolymers, or an unsubstituted or substituted, aliphatic, aromatic and/or alicyclic diamine group.

More preferably D represents an unsubstituted or substituted, aliphatic, aromatic and/or alicyclic diamine group having from 1 to 40 carbon atoms; having from 1 to 40 carbon atoms, wherein the diamine group comprises an aliphatic group, which may comprise one or more heteroatom and/or bridging group;

and/or an aromatic group; and/or an alicyclic group.

In a further preferred embodiment of the present invention,

D represents unsubstituted or substituted aliphatic, aromatic or alicyclic diamine group having from 1 to 40 carbon atoms, preferably with the proviso that a 3,5,-diamino phenyl group is excluded, D is further preferably selected from formula (VI):

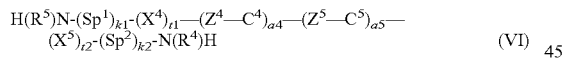

$$H(R^5)N\text{-}(Sp^1)_{k1}\text{-}(X^4)_{t1}\text{-}(Z^4\text{-}C^4)_{a4}\text{-}(Z^5\text{-}C^5)_{a5}\text{-}(X^5)_{t2}\text{-}(Sp^2)_{k2}\text{-}N(R^4)H \quad (VI)$$

wherein:

$R^4$, $R^5$ each independently from each other represents a hydrogen atom or $C_1$-$C_6$alkyl;

$Sp^1$, $Sp^2$ each independently from each other represents an unsubstituted or substituted straight-chain or branched $C_1$-$C_{24}$alkylene, in which one or more —$CH_2$-group may independently from each other be replaced by a linking group, and $k^1$, $k^2$ each independently is an integer having a value of 0 or 1; and $X^4$, $X^5$ each independently represents —O—, —S—, —NH—, —N(CH$_3$)—, —CH(OH)—, —CO—, —CH$_2$(CO)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —CH$_2$—CH$_2$—, —OCH$_2$—, —CH$_2$O—, —CH=CH—, or —C≡C—or a single bond; and $t^1$, $t^2$ each independently is an integer having a value of 0 or 1; and $C^4$, $C^5$ each independently represents a non-aromatic, aromatic, substituted or unsubstituted carbocyclic or heterocyclic group, which may have a side chain T, and $Z^4$ and $Z^5$ represent independently from each other a single bond or substituted or unsubstituted straight-chain or branched $C_1$-$C_{24}$alkylene group, in which one or more C-atom, CH— or CH$_2$-group may independently from each other be replaced by a non-aromatic, aromatic, unsubstituted or substituted carbocyclic or heterocyclic group; and/or a heteroatom and/or by a —O—, —CO—, —COO—, —OCO—, —OCF$_2$—, —CF$_2$O—, —CON(CH$_3$)—, —(CH$_3$)NCO—, —CONH—, —CF$_2$—, —NHCO—, —CO—S—, —S—CO—, —CS—S—, —SOO—, —OSO—, —CH$_2$(SO$_2$)—, CH$_2$—CH$_2$—, —OCH$_2$—, —CH$_2$O, —CH=CH—, —C≡C—, —CH=CH—COO—, —OCO—CH=CH—;

preferably, $Z^5$ represents an unsubstituted or substituted straight-chain or branched $C_1$-$C_{14}$alkylene group, $C_1$-$C_6$alkylene in which one or more, preferably non-adjacent, —C-atom, CH— or CH$_2$-group may be replaced by an oxygen or nitrogen atom and/or one or more carbon-carbon single bond is replaced by a carbon-carbon double or a carbon-carbon triple bond; and $a_4$, $a_5$ are independently integers from 0 to 3, such that $a_4+a_5 \leq 4$, and wherein D is at least once linked to at least one spacer group $S^2$ and or $S^1$; and/or linked via at least one $Sp^1$, $Sp^2$, $C^4$, $C^5$ and/or $Z^4$; $Z^5$ and wherein at least one of $k^1$, $k^2$, $a^4$ and $a^5$ is not equal to zero;

preferably with the proviso that a 3,5-diamino phenyl group is excluded.

More preferably, D is selected from formula (VI), wherein:

$C^4$, $C^5$ independently from each other are selected from a compound of group $G^2$, wherein group $G^2$ denotes:

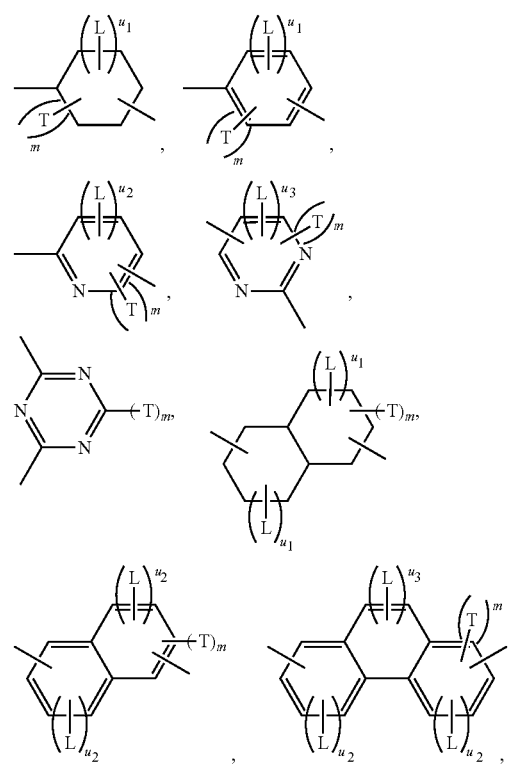

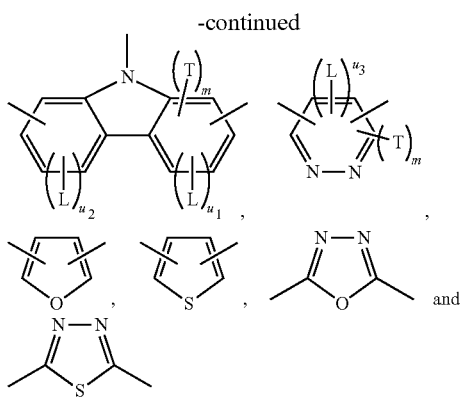

wherein

"—" denotes the connecting bonds of $C^4$ and $C^5$ to the adjacent groups of compound of formula (VI) as described above; and L is —$CH_3$, —$COCH_3$, —$OCH_3$, nitro, nitrile, halogen, $CH_2$=CH—,
$CH_2$=C($CH_3$)—, $CH_2$=CH—(CO)O—, $CH_2$=CH—O—, $CH_2$=C($CH_3$)—(CO)O—,
$CH_2$=C($CH_3$)—O—, $CH_2$=CH—,
$CH_2$=C($CH_3$)$CH_2$—, $CH_2$=CH—$CH_2$(CO)O—, $CH_2$=CH—$CH_2$O—, $CH_2$=C($CH_3$)—$CH_2$—(CO)O—, $CH_2$=C($CH_3$)—$CH_2$O—, —$NR^5R^6$, wherein:

$R^5$, $R^6$ each independently from each other represents a hydrogen atom or $C_1$-$C_6$alkyl;

T represents a substituted or unsubstituted straight-chain or branched $C_1$-$C_{24}$alkylene group, in which one or more C-atom, CH—or $CH_2$-group may independently from each other be replaced by a non-aromatic, aromatic, unsubstituted or substituted carbocyclic or heterocyclic group, or a heteroatom and/or by a bridging group;

m is an integer from 0 to 2; preferably 1 or 0; and more preferably 0;

$u_1$ is an integer from 0 to 4, with the proviso that $m+u_1$ is ≤4; and $u_2$ is an integer from 0 to 3; with the proviso that $m+u_2$ is ≤3; and $u_3$ is an integer from 0 to 2; with the proviso that $m+u_3$ is ≤2; preferably with the proviso that a 3,5-diamino phenyl group is excluded.

The diamine D of the present invention is especially more preferably selected from radicals of the following structure, $D^1$, which is represented by substituted or unsubstituted o-phenylenediamine, p-phenylene-diamine, 2,4-phenylene-diamine, biphenyldiamine, aminophenylen-$Z^4$-phenylenamino, wherein $Z^4$ has the same meaning and preferences as given above, especially 4-(4-aminobenzyl)phenylamine, 4-[2-(4-aminophenyl)ethyl]phenylamine; naphthylenediamine, benzidine, diaminofluorene, 4,6-diallylbenzene-1,3-diamine, 4,6-divinylbenzene-1,3-diamine, 4,6-diallylbenzene-1,3-diamine, 4,6-diacrylyl-$C_1$-$C_{16}$alkylen-benzene-1,3-diamine, 4,6-bis(vinyloxy)benzene-1,3-diamine, 3,4-diaminobenzoic acid, 3,4-diaminobenzyl alcohol dihydrochloride, 2,4-diaminobenzoic acid, L-(+)-threo-2-amino-1-(4-aminophenyl)-1,3-propanediol, p-aminobenzoic acid, [3,5-3h]-4-amino-2-methoxybenzoic acid, L-(+)-threo-2-(N,N-dimethylamino)-1-(4-aminophenyl)-1,3-propanediol, 2,7-diaminofluorene, 4,4'-diaminooctafluorobiphenyl, 3,3'-diaminobenzidine, 2,7-diamino-9-fluorenone, 3,5,3',5'-tetrabromo-biphenyl-4,4'-diamine, 2,2'-dichloro[1,1'-biphenyl]-4,4'-diamine, 3,9-diamino-1,1'-dimethyl-5,7-dihydro-dibenzo(a,c)cyclohepten-6-one, dibenzo(1,2)dithiine-3,8-diamine, 3,3'-diaminobenzophenone, 3,3'-diaminodiphenylmethane, 4,4-bis-(3-amino-4-hydroxyphenyl)-valeric acid, 2,2-bis(3-amino-4-hydroxyphenyl)-hexafluoropropane, 2,2-bis(3-amino-4-methylphenyl)-hexafluoropropane, tetrabromo methylenedianiline, 2,7-diamino-9-fluorenone, 2,2-bis(3-aminophenyl)hexafluoropropane, bis-(3-amino-4-chlorophenyl)-methanone, bis-(3-amino-4-dimethyl-amino-phenyl)-methanone, 3-[3-amino-5-(trifluoromethyl)benzyl]-5-(trifluoromethyl)aniline, 1,5-diamino-naphthalene, benzidine-3,3'-dicarboxylic acid, 4,4'-diamino-1,1'-binaphthyl, 4,4'-diaminodiphenyl-3,3'-diglycolic acid, dihydroethidium, o-dianisidine, 2,2'-dichloro-5,5'-dimethoxybenzidine, 3-methoxybenzidine, 3,3'-dichlorobenzidine (diphenyl-d6), 2,2'-bis(trifluoromethyl)benzidine, 3,3'-bis(trifluoromethyl)benzidine, 3,3'-dichloro-benzidine-d6, tetramethylbenzidine, di-(aminophenyl)alkylen, and from amino compounds listed below, which do not carry two amino groups and are taken as derivatives with at least one additional amino group:

aniline, 4-amino-2,3,5,6-tetrafluorobenzoic acid, 4-amino-3,5-diiodobenzoic acid, 4-amino-3-methylbenzoic acid, 4-amino-2-chlorobenzoic acid, 4-aminosalicylic acid, 4-aminobenzoic acid, 4-aminophthalic acid, 1-(4-aminophenyl)ethanol, 4-aminobenzyl alcohol, 4-amino-3-methoxybenzoic acid, 4-aminophenyl ethyl carbinol, 4-amino-3-nitrobenzoic acid, 4-amino-3,5-dinitrobenzoic acid, 4-amino-3,5-dichlorobenzoic acid, 4-amino-3-hydroxybenzoic acid, 4-aminobenzyl alcohol hydrochloride, 4-aminobenzoic acid hydrochloride, pararosaniline base, 4-amino-5-chloro-2-methoxybenzoic acid, 4-(hexafluoro-2-hydroxyisopropyl)aniline, piperazine-p-amino benzoate, 4-amino-3,5-dibromobenzoic acid, isonicotinic acid hydrazide p-aminosalicylate salt, 4-amino-3,5-diiodosalicylic acid, 4-amino-2-methoxybenzoic acid, 2-[2-(4-aminophenyl)-2-hydroxy-1-(hydroxymethyl)ethyl]isoindoline-1,3-dione, 4-amino-2-nitrobenzoic acid, ethyl 2-(4-aminophenyl)-3,3,3-trifluoro-2-hydroxypropanoate, ethyl 2-(4-amino-3-methylphenyl)-3,3,3-trifluoro-2-hydroxypropanoate, ethyl 2-(4-amino-3-methoxyphenyl)-3,3,3-trifluoro-2-hydroxypropanoate, 4-aminon-aphthalene-1,8-dicarboxylic acid, 4-amino-3-chloro-5-methylbenzoic acid, 4-amino-2,6-dimethylbenzoic acid, 4-amino-3-fluorobenzoic acid, 4-amino-5-bromo-2-methoxybenzenecarboxylic acid, 3,3'-tolidine-5-sulfonic acid, or their derivatives, again with the proviso that compounds listed which do not carry two amino groups are taken as derivatives with at least one additional amino group.

The diamine groups D are commercially available or accessible by known methods. The second amino group is accessible for example by substitution reaction.

D is further especially more preferably selected from the group of the following compounds:

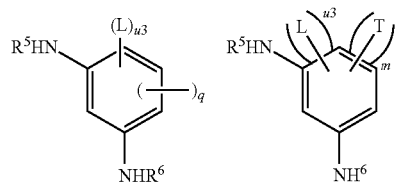

-continued

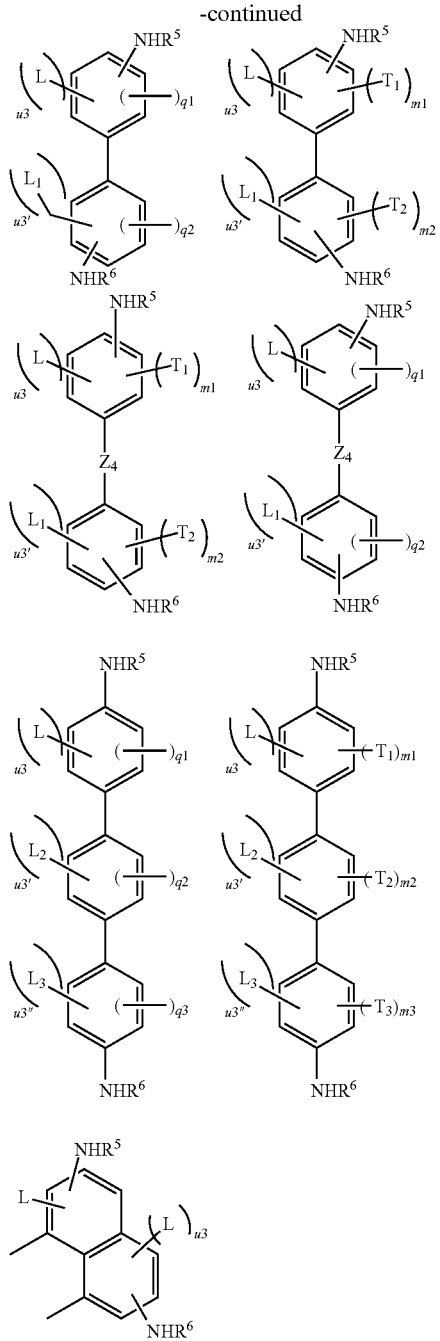

wherein
L, $L_1$, $L_2$ and $L_3$ are independently from each other —$CH_3$, —$COCH_3$, —$OCH_3$, nitro, nitrile, halogen, $CH_2$=CH—, $CH_2$=C($CH_3$)—, $CH_2$=CH—(CO)O—, $CH_2$=CH—O—, —$NR^5R^6$, $CH_2$=C($CH_3$)—(CO)O— or $CH_2$=C($CH_3$)—O—, T, $T_1$, $T_2$ and $T_3$ are independently from each other a substituted or unsubstituted straight-chain or branched $C_1$-$C_{24}$alkylene group, in which one or more C-atom, CH— or $CH_2$—, group may independently from each other be replaced by a non-aromatic, aromatic, unsubstituted or substituted carbocyclic or heterocyclic group, and/or a heteroatom and/or by a linking group;

"—" is a single bond, q is an integer of 1 or 2; and q1, q2 and q3 are independently from each other an integer from 0 to 2; preferably 1 or 2;

m is an integer of 1 or 2;

m1, m2 and m3 are independently from each other an integer from 0 to 2; preferably 1 or 2;

$u_3$, $u_{3'}$ and $u_{3''}$ are independently from each other an integer from 0 to 2;

$R^5$, $R^6$ and $Z^4$ are as described above; preferably $Z^4$ is unsubstituted or substituted straight-chain or branched $C_1$-$C_{14}$alkylene group, $C_1$-$C_6$alkylene in which one or more, preferably non-adjacent, —C-atom, CH— or $CH_2$—, group may be replaced by an oxygen or nitrogen atom;

more preferred $Z^4$ is methylen, ethylen, propylen, 2,2-dimethyl-propylen, butylen, pentylen, hexylen, $_2$(—O—$C_1$-$C_6$alkylen)methylen or $_2$(—(CO)O—$C_1$-$C_6$alkylen)methylen or the mono- or bi-radicals thereof, and wherein D is at least once linked to at least one group $S^1$ or $S^2$ via a single bond "—";

or via a side chain T, $T_1$, $T_2$ or $T_3$; or via group $Z^4$;

with the proviso that u3+q, or u3+m is ≤4;

u3+q1 and/or u3'+q2 or/and u3+m1, or/and u3'+m2, or/and u3"+q3, or/and u3"+m3 is ≤4;

q1+q2, and m1+m2; and q1+q2+q3, and m1+m2+m3 is ≥1;

preferably with the proviso that a 3,5-diamino phenyl group is excluded.

Most preferred are diamine compounds according to the invention, wherein D is a selected from the group of the following compounds:

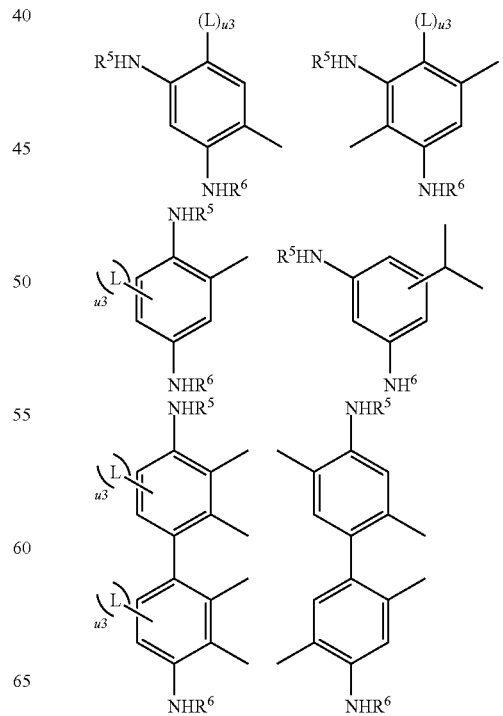

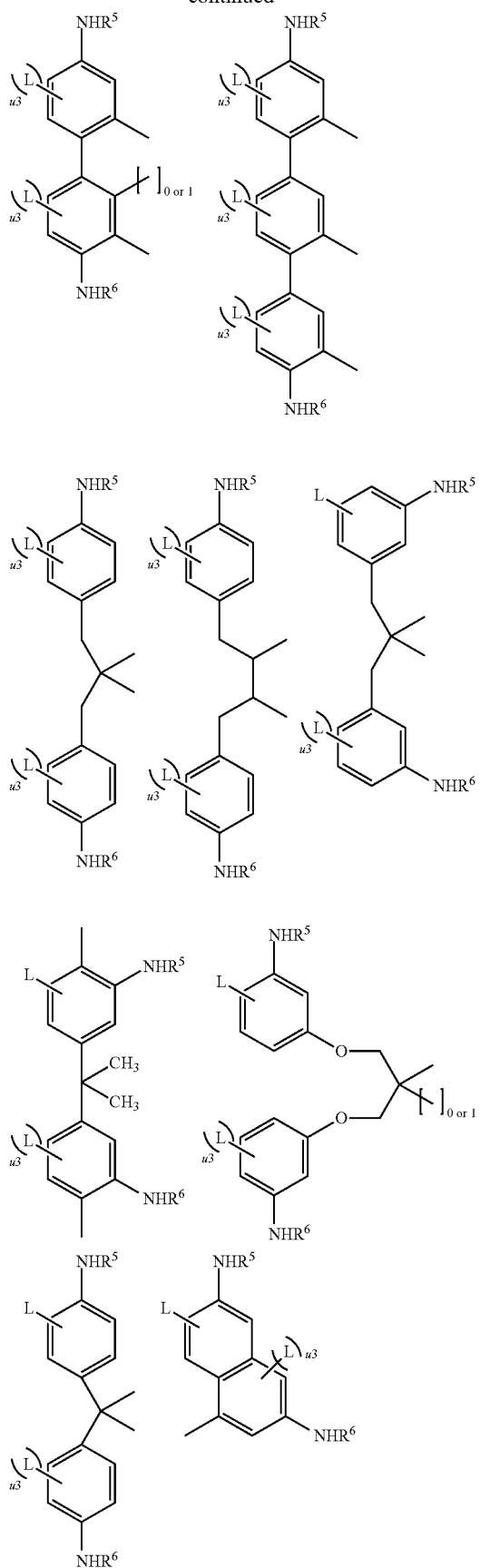

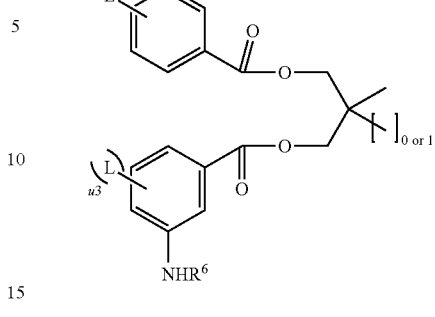

"—" denotes the linking(s) of D to $S^1$ or $S^2$ and represents a single bond; and L is —$CH_3$, —$COCH_3$, —$OCH_3$, nitro, nitrile, halogen, $CH_2$=CH—, $CH_2$=C($CH_3$)—, $CH_2$=CH—(CO)O—, $CH_2$=CH—O—, —$NR^5R^6$, $CH_2$=C($CH_3$)—(CO)O— or $CH_2$=C($CH_3$)—O—, wherein:

$R^5$, $R^6$ each independently from each other represents a hydrogen atom or $C_1$-$C_6$alkyl;

$u_3$ is an integer from 0 to 2.

Additionally, preferred diamine D of the present invention relate to diamines of formulae (VII) to (XV), comprising a group of formula (VII):

$$H_2N\text{-alkylen-}NH_2 \quad \text{(VII)},$$

wherein alkylen is at least once linked to the photoreactive group of formula (I),

(VIII)

wherein cyclohexylen group is at least once linked to the photoreactive group of formula (I),

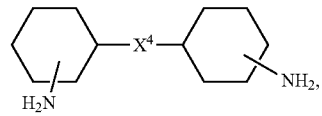
(IX)

wherein $X^4$ or/and cyclohexylen is at least once linked to the photoreactive group of formula (I),

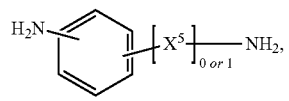
(X)

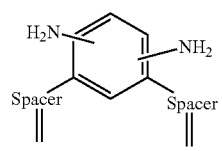
(Xa)

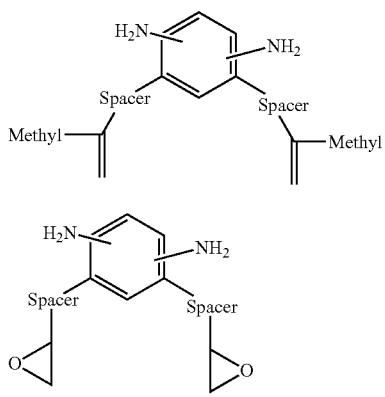 (Xb)

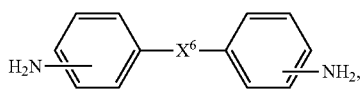 (Xc)

wherein the spacer is a single bond, -(linking group)-(C$_1$-C$_{16}$alkylen), -(linking group)-O(CO)C$_1$-C$_{16}$alkylen, -(linking group)-OC$_1$-C$_{16}$alkylen, and wherein X$^5$ or/and at phenylene is at least once linked to the photoreactive group of formula (I),
wherein X$^5$ is C$_1$-C$_{30}$alkyl,

 (XI)

wherein X$^6$ or/and phenylene is at least once linked to the photoreactive group of formula (I),

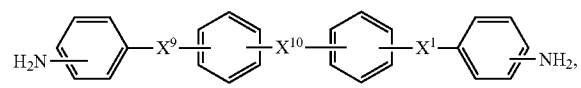 (XII)

wherein X$^7$, X$^8$ or/and phenylene is at least once linked to the photoreactive group of formula (I),

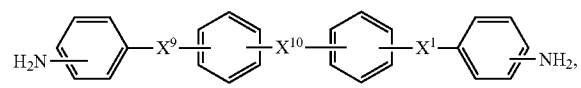 (XIII)

wherein X$^9$, X$^{10}$, X$^{11}$ or/and phenylene is at least once linked to the photoreactive group of formula (I), and
wherein X$^4$, X$^6$, X$^7$, X$^8$, X$^9$, X$^{10}$ and X$^{11}$ are independently from each other a bridging group or a single bond; or diamines of formulae (XIV) selected from the group of compounds given below:

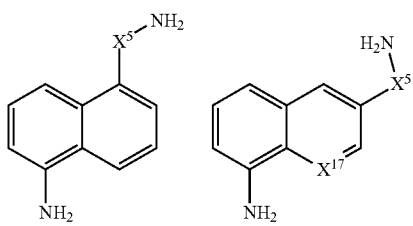

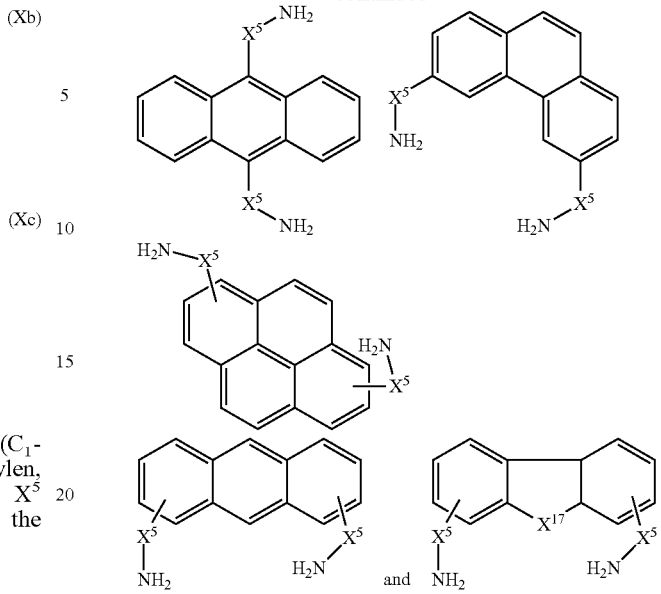

wherein X$^5$ has the meaning given above and X$^{17}$ is CH$_2$, O, NH; and which are linked at the aryl group to the photoreactive group(I),
and (XV)

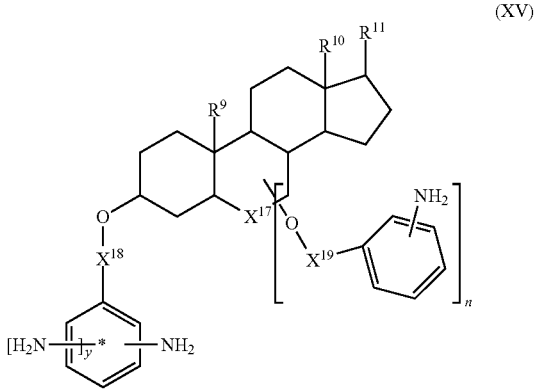 (XV)

wherein
R$^9$, R$^{10}$, R$^{11}$ have independently from each other the above-described meaning, and R$^9$ and R$^{10}$ are C$_1$-C$_{30}$alkyl, and preferably methyl and R$^{11}$ is 2-methylheptane and n is 0, if y is 1 and y is 0 if n is 1, and y1 is a single or a double bond, and X$^{18}$ is carbonyl or a single bond or NH,
wherein X$^{17}$ is CH$_2$, O, NH, and which are linked at the aryl group to the photoreactive group(I).

The term "alkylen" has the meaning of (C$_1$-C$_{12}$)alkylene, which is branched, straight chain, substituted, unsubstituted, uninterrupted or interrupted by a linking group as defined above, and an alicyclic group, such as cyclohexylen or a C$_{17}$-C$_{40}$ alicyclic group, within the meaning and preferences as described above; or —Si(R$^3$)$_2$—or —O—Si(R$^3$)$_2$—, wherein R$^3$ has the meaning as given above.

Further, preferred in the present invention is diamine D (XV), wherein X$^{12}$ is a substituted or unsubstituted aliphatic, alicyclic group, preferably

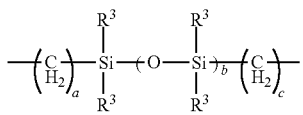

wherein $R^3$ is $C_1$-$C_{24}$alkylen is preferably at least one $C_1$-$C_6$alkyl, more preferably methyl, ethyl, propyl;
and a and c are independently from each other 1, 2 or 3, and c is an integer from 1 to 20; such as

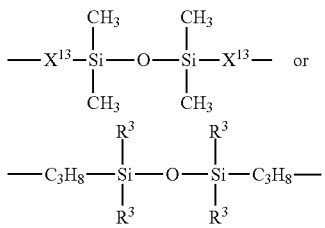

wherein $X^{13}$ is methylen, ethylen, propylene or butylen, and $R^3$ has the same meaning as given above and is preferably methyl, ethyl or propyl.

Preferably, the diamine D (VIII) is on of formula (VIII-1)

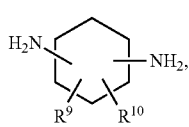
(VIII-1)

wherein $R^9$ and $R^{10}$ are independently from each other hydrogen, halogen, hydroxyl, a carbocyclic or heterocyclic non-aromatic group or $C_1$-$C_{30}$alkyl, which is branched, straight chain, substituted, unsubstituted, uninterrupted or interrupted as described above and preferably interrupted by a linking group, and more preferably by a carbocyclic or heterocyclic non-aromatic group, such as cyclohexylen or a $C_{17}$-$C_{40}$ alicyclic group.

Preferably, the diamine D (IX) is of formula (IX-1)

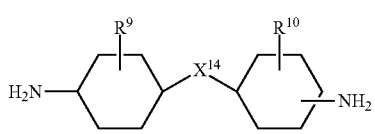
(IX-1)

wherein
$X^{14}$ is a bridging group or a single bond and preferably —COO—, —CONH—; a single bond, —O—, —S—, methylen, ethylen, propylene, $R^9$ and $R^{10}$ are independently from each other hydrogen, halogen, hydroxyl, a carbocyclic or heterocyclic non-aromatic group or $C_1$-$C_{30}$alkyl;
preferably $X^{14}$ is a single bond, or, with $CF_3$, $OCF_3$, F, substituted or unsubstituted methylen, ethylen, propylene, butylen or pentylen and $R^9$ and $R^{10}$ are halogen or substituted or unsubstituted methylen, ethylen, propylene.

Preferably, the diamine D (X) is of formula (X-1)

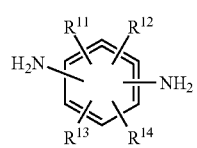
(X-1)

wherein $R^{11}R^{12}R^{13}$ and $R^{14}$ are independently from each other hydrogen, halogen, hydroxyl, a carbocyclic or heterocyclic non-aromatic group or $C_1$-$C_{30}$alkyl, acrylate group, vinyl group, allyl group, epoxy group, maleinimide group, straight-chain or branched $C_1$-$C_{16}$alkyl group, $C_1$-$C_{16}$alkylacrylate group, $C_1$-$C_{16}$alkylvinyl group, $C_1$-$C_{16}$alkylallyl group, $C_1$-$C_{16}$alkylepoxy group, $C_1$-$C_{16}$alkylmaleinimide group, preferably unsubstituted or substituted by $C_1$-$C_{16}$alkylacrylate group, more preferably by $C_1$-$C_6$alkylacrylate group;

Preferably $C_1$-$C_{30}$alkyl is methyl, ethyl, propyl, butyl, pentyl or hexyl, 1,1'-cyclohexyl, 4-($C_1$-$C_{30}$ alkyl)-cyclohexyl, 3,4''-bis[4'-($C_1$-$C_{30}$alkyl)-1,1'-bi(cyclohexyl)-4-yl], 1,1'-bi(cyclohexyl)-4-yl, 2-pyridine, pyrrolidine-2,5-dione, which is unsubstituted or substituted by $CF_3$, $OCF_3$, F, benzyl, pentyl, benzoic acid ester, 4-(phenoxycarbonyl), carboxylic acid, —$SO_3H$, —$PO_3H$, —$OR^{15}$, wherein $R^{15}$ is $C_1$-$C_{30}$ alkyl, preferably —$C_{12}H_{25}$; unsubstituted or substituted benzyl, preferably, the two $NH_2$ groups of (X-1) are in meta or para position of the phenylene ring; further preferred structures of (X-1) are:

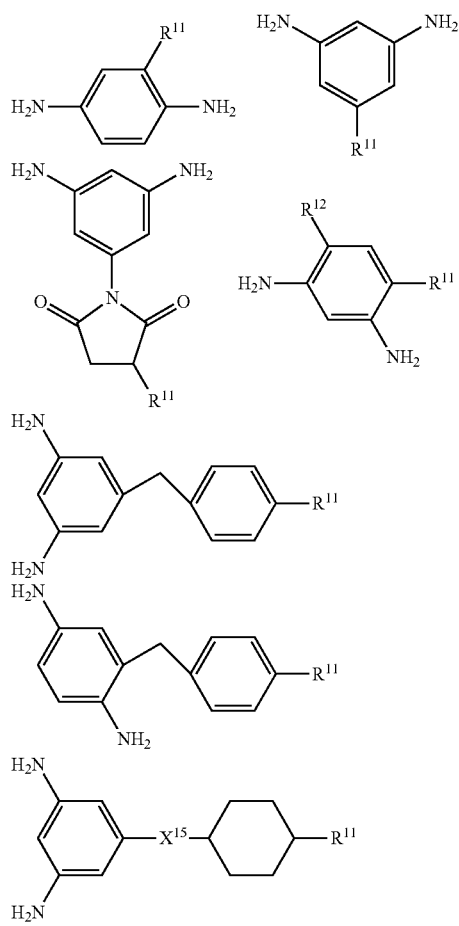

-continued

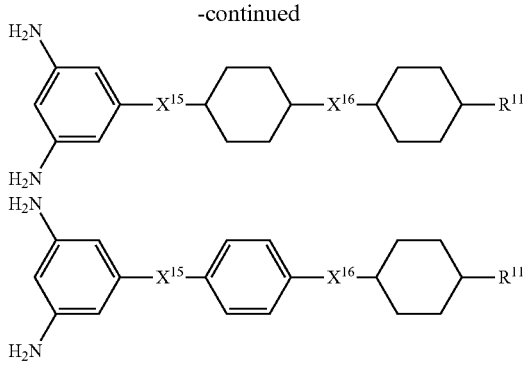

and more preferred are

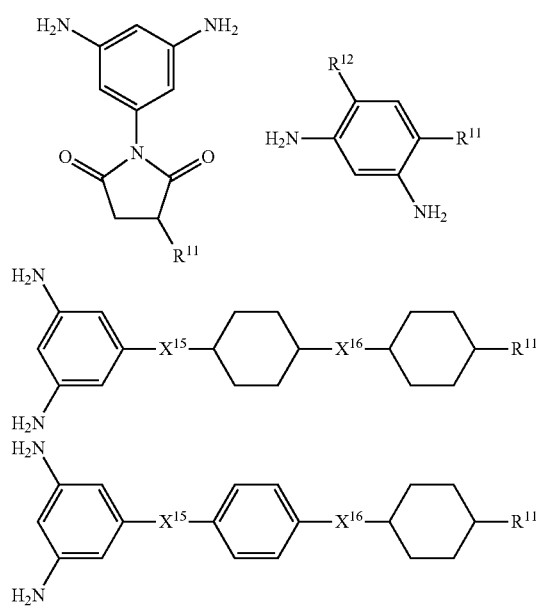

wherein $R^{11}$ and $R^{12}$ have the meanings and preferences as given above, $X^{15}$ and $X^{16}$ are independently from each other a single bond or $C_1$-$C_{30}$alkyl, preferably $C_1$-$C_6$ alkyl, —COO— and —CONH—; —COO($C_1$-$C_6$alkylene)-, —CONH($C_1$-$C_6$alkylene)-.

Further preferred diamine compounds (X) are 1-hexadecanoxy-2,4-diaminobenzene, 1-octadecanoxy-2,4-diaminobenzene, hexadecanoxy(3,5-diaminonbenzoyl), octadecanoxy(3,5-diaminobenzoyl).

Preferably, the diamine D (XI) is of formula (XI-1)

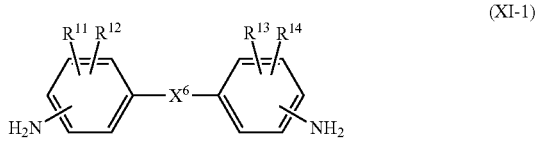

(XI-1)

wherein $X^6$ has the meaning and preferences as given above, and is preferably for example —O—, —S— or substituted or unsubstituted $C_1$-$C_6$alkylen, —O—($CH_2CH_2O)_n$—; —O—($C_1$-$C_{12}$alkyl)$_n$-O—, —S—($C_1$-$C_{12}$alkyl)$_n$-S—, triazine, 1,3,5-triazinane-2,4,6-trione, 1,1'-cyclohexylene, NR$^5$(($C_1$-$C_6$alkyl)$_n$NR$^6$), -(piperidine)$_{n1}$-($C_1$-$C_6$alkyl)$_n$-(piperidine)$_n$, wherein $_n$ is an integer from 1 to 6, and $_{n1}$ are an integer from 0 to 6, wherein $R^{11}$, $R^{12}$, $R^{13}$ and $R^{14}$ have independently from each other the meaning and preferences as given above.

Further preferred diamine D (XI-1) is:

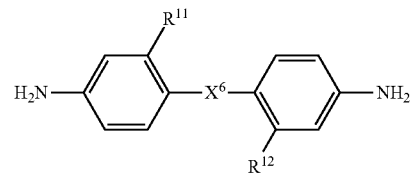

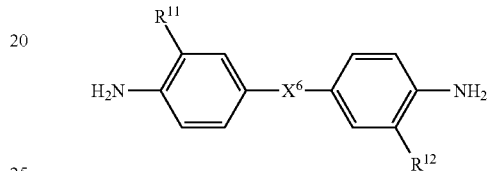

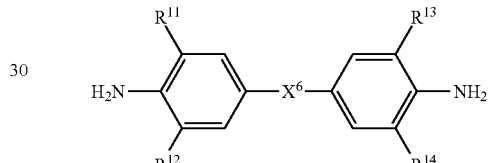

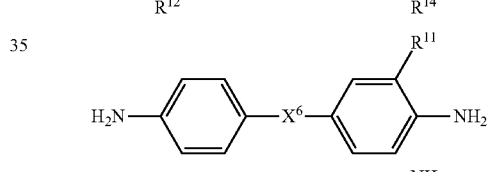

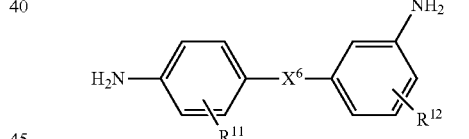

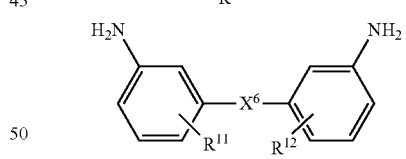

wherein $R^{11}$ and $R^{12}$ are independently from each other have the same meaning as given above, and which are preferably hydrogen, $C_1$-$C_6$alkyl, hydroxy, or 4-($C_1$-$C_{30}$alkyl)-cyclohexyl or 3,4"-bis[4'-($C_1$-$C_{30}$ alkyl)-1,1'-bi(cyclohexyl)-4-yl]. More preferred are diamine D (XI) given below:

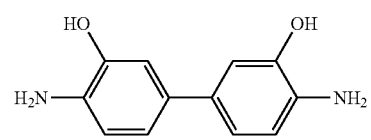

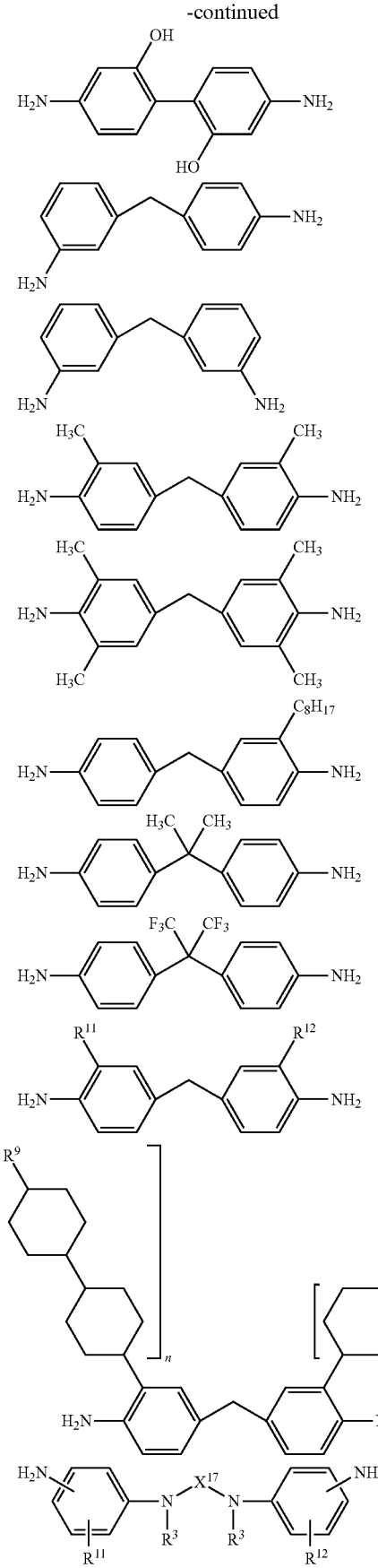

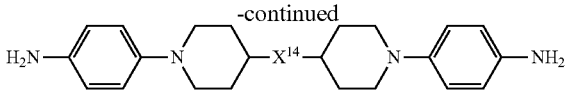

wherein n is independently from each other 0 or 1 and $R^3$, $R^{11}$, $R^{11}$, $X^{14}$ and $x^{17}$ have the same meanings and preferences as given above, and
further more preferred are diamine compounds (XI)
4,4'-diaminodiphenyl, 4,4'-diaminodiphenyl-3,3'-dimethoxy, 4,4'-diaminodiphenyl-3,3'-dimethyl, 4,4'-diaminodiphenyl-3,3'-dihydroxy, 4,4'-diamino-diphenylmethane, 4,4'-diaminodiphenylsulfide, 4,4'-diamino-diphenylsulfone, 4,4'-diaminodiphenylcarbonyl, 4,4'-diaminodiphenyl oxomethylene, 4,4'-diaminodiphenyl-bis(trifluoromethyl)-methylene, 4'-diaminodiphenyl-bis(trifluoromethyl)methylene-3,3'-dimethoxy or 4,4'-diaminodiphenyl-bis(trifluoromethyl)methylene-3,3'-dihydroxy, 4,4'-diaminodiphenyl ether, 4,4'-(p-phenyleneiso-propylidene)bisaniline, 2,2-bis[4-(4-aminophenoxy)phenyl]-hexafluoro-propane, 2,2'-bis[4-4-amino-2-trifluoro-methyl-phenoxy-)phenyl) hexafluoropropane, 4,4'-diamino-2,2'-bis/trifluoromethyl)-biphenyl, 4,4'-bis[4-amino-2-trifluoromethyl)phenoxy]-octafluorobiphenyl.

Preferably, the diamine D (XII) are diamines, wherein $X^7$ and $X^8$, $X^9$ and $X^{10}$ or $X^{11}$ are a single bond or $C_1$-$C_{30}$alkyl.

Preferably, $X^7$ and $X^8$, $X^9$ and $X^{10}$ or $X^{11}$ are independently from each other a single bond, —O-alkoxy-, such as —O-methylen-, methylen-O—; $C_1$-$C_{12}$alkylen such as methylene, ethylen, propylene, butylen, pentylen or hexylen, substituted or unsubstituted 1,1'-cyclohexylene, —SO—, —S—, —SO$_2$—, —O—, —N($R^{25}$)—, —C(CH$_3$)$_2$—, —C(CF$_3$)$_2$—, 1,1'-cyclohexyl, substituted or unsubstituted 4-($C_1$-$C_{30}$ alkyl)-cyclohexyl, substituted or unsubstituted 3,4"-bis[4'-($C_1$-$C_{30}$alkyl)-1,1'-bi(cyclohexyl)-4-yl], 1,1'-bi(cyclohexyl)-4-yl, wherein $R^{11}$ and $R^{12}$ are independently from each other preferably hydrogen, methyl, ethyl, propyl, butyl, pentyl or hexyl;
preferably $X^{10}$ is —SO—, —SO$_2$—, —O—, —N(CH$_3$)—, —C(CH$_3$)$_2$—, —C(CF$_3$)$_2$—, 1,1'-cyclohexyl, 4-($C_1$-$C_{30}$ alkyl)-cyclohexyl, 3,4"-bis[4'-($C_1$-$C_{30}$ alkyl)-1,1'-bi(cyclohexyl)-4-yl] or 1,1'-bi(cyclohexyl)-4-yl, and wherein $X^9$ and $X^{11}$ are identical and are methylene, ethylen, propylene, butylen, pentylen, hexylen or —O—;
wherein n is an integer from 0 to 3, preferably, 0 or 1; and if n is 0 than $X^9$ and $X^{11}$ are identical and are methylene, ethylene, propylene, butylene, pentylene, hexylene, —O—; —S—, —C(CH$_3$)$_2$—, —C(CF$_3$)$_2$—.

Further preferred diamine D of (XII) is:

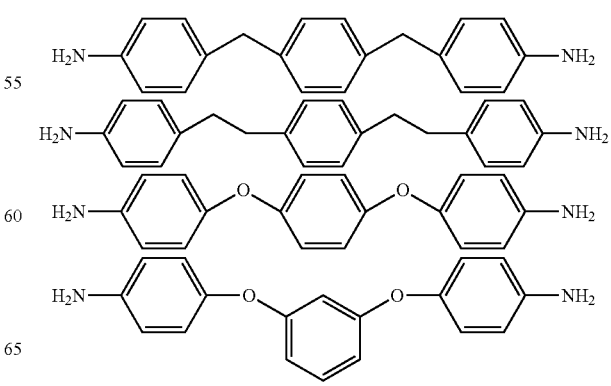

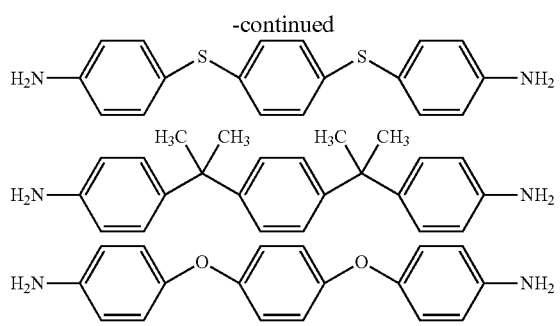
Further preferred diamine D of (XIII) are:
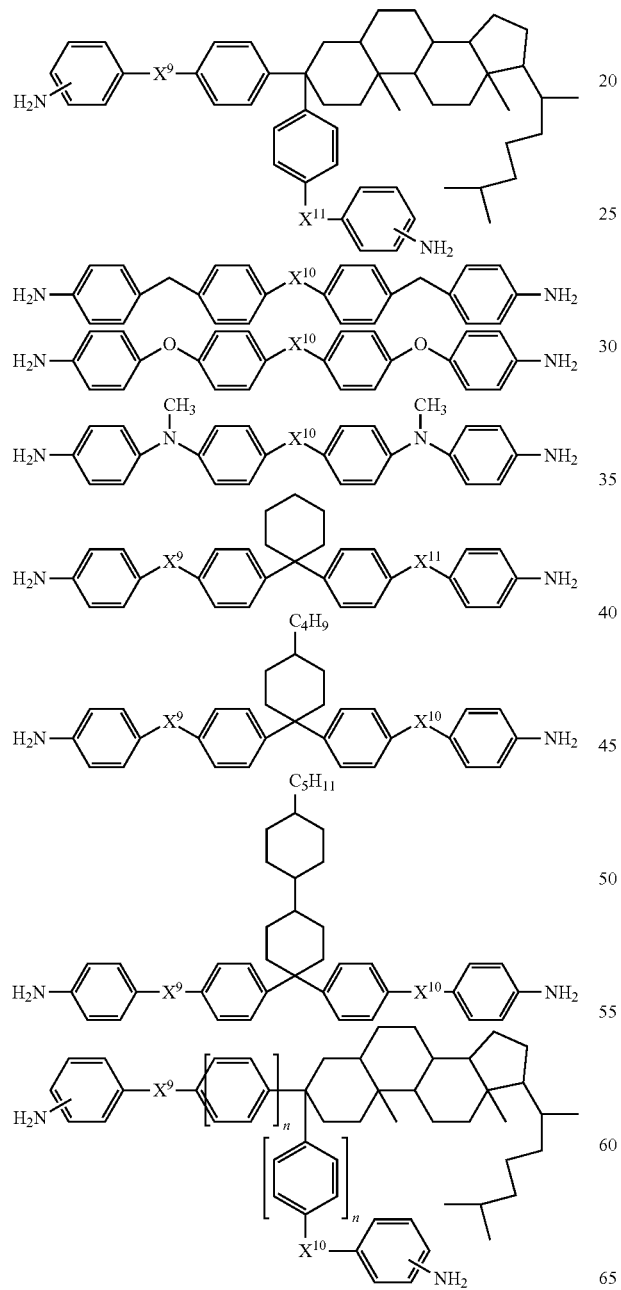
wherein n is 0 or 1, and wherein $X^7$ and $X^8$, $X^9$ and $X^{10}$ or $X^{11}$ have the above given meanings and preferences.
Preferably the diamine D (XIV) is 1,5-diaminonaphtalene, 2,7-diaminofluorene.
Preferably the diamine D (XV) is a compound as given below:
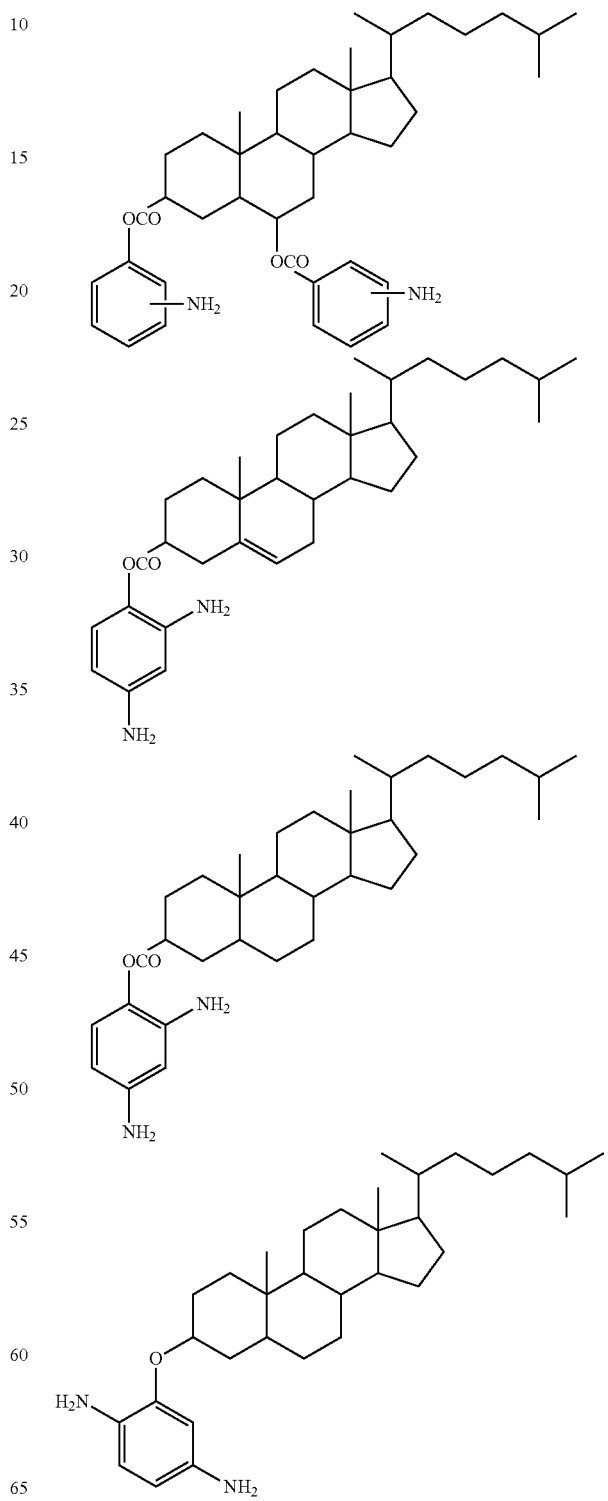

and further, 1-cholesteryl-oxy-2,4-diamino-benzene, 1-cholestanyloxy-2,4-diaminobenzene, cholesteryloxy(3,5-diamino-benzoyl), cholestan-yloxy(3,5-diaminobenzoyl).

Further, enclosed by reference are diamines as described in EP-A-1,818,354 on page 10, lines 48 to 58 and on page 11, lines 1 to 19.

Especially most preferred is a first and/or second monomer, especially first monomer, comprising a photoreactive group of formula (I) which is represented by for example a group of formula (XVI)

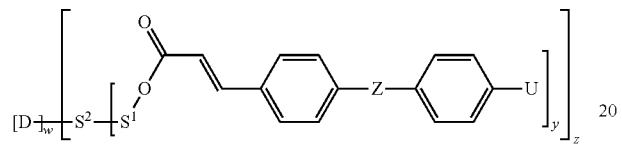

wherein

Z represents a bridging group, and preferably
—COO—, —OCO—, —OCOO—, —OCF$_2$—, —CF$_2$O—, —CON(CH$_3$)—, —(CH$_3$)NCO—, —CONH—, —NHCO—, —CO—S—, —S—CO—, —CS—S—, —SOO—, —OSO, especially —COO—, —OCO—, —OCF$_2$—, —CF$_2$O—, —CON(CH$_3$)—, —(CH$_3$)NCO—, —CONH—, —NHCO—or a single bond;

most preferred bridging group is a single bond, —COO— or —OCO—; and

D represents an unsubstituted or substituted aromatic polymerisable group, preferably a diamine group, more preferably

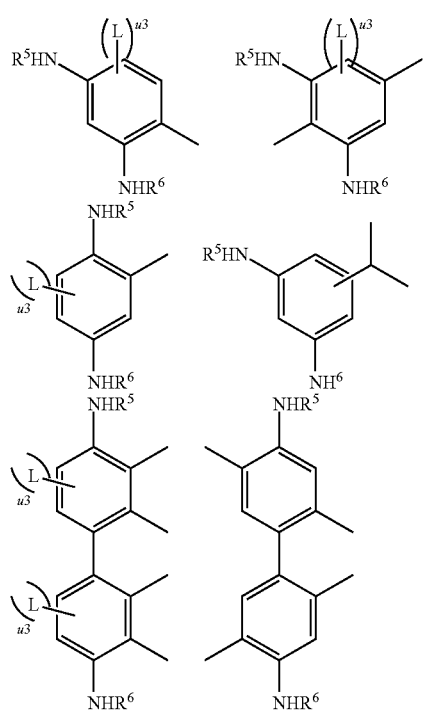

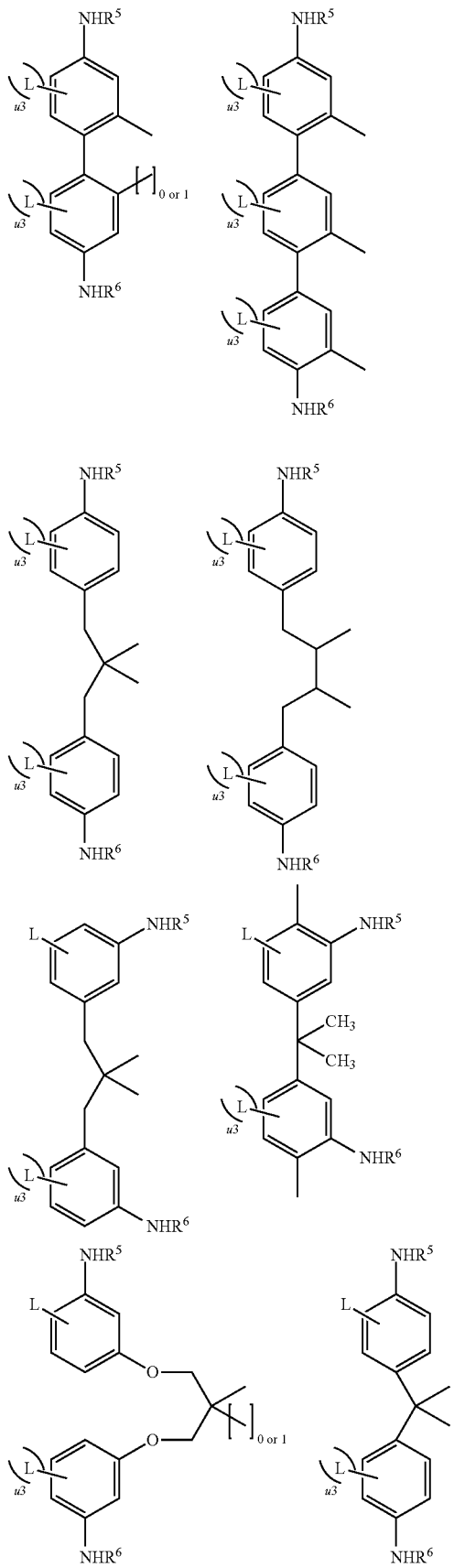

-continued

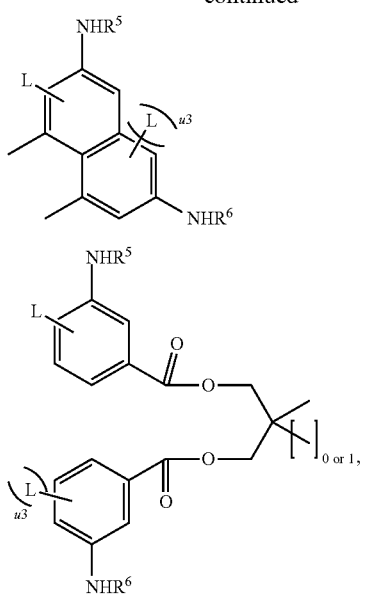

most preferably

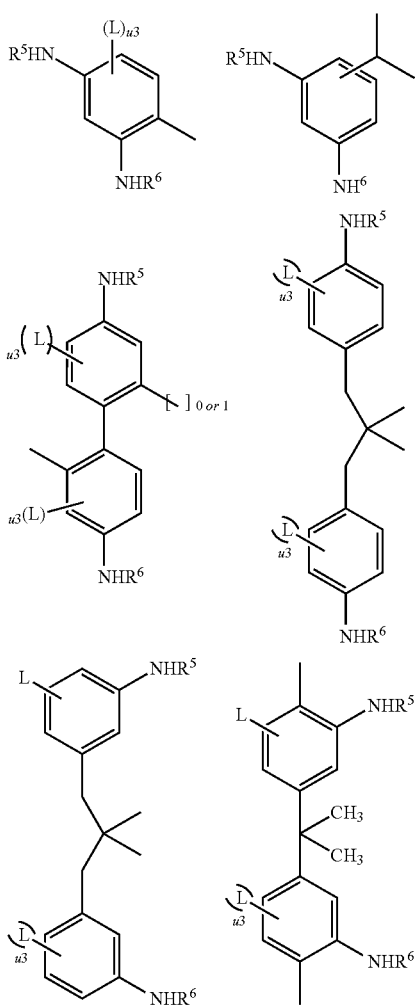

-continued

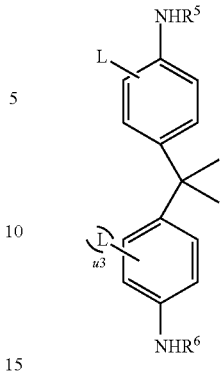

wherein "—" denotes the linking(s) of D to $S^1$ or $S^2$ and represents a single bond; and L is —$CH_3$, —$COCH_3$, —$OCH_3$, nitro, nitrile, halogen, $CH_2$=CH—, $CH_2$=C($CH_3$)—, $CH_2$=CH—(O)O—, $CH_2$=CH—O—, —$NR^5R^6$, $CH_2$=C($CH_3$)—(CO)O— or $CH_2$=C($CH_3$)—O—, wherein:

$R^5$, $R^6$ each independently from each other represents a hydrogen atom or $C_1$-$C_6$alkyl;

$u_3$ is an integer from 0 to 2;

w is 1, 2, 3, and y and z are each independently from each other 1 or 2;

$S^1$ and $S^2$ represent each independently from each other a single bond or a spacer unit, which is a straight-chain or branched, substituted or unsubstituted $O_1$—$C_{1-2}$alkylen, in which one or more, preferably non-adjacent, C-atom, CH— or $CH_2$—, group may be replaced by a linking group, preferably replaced by a single bond or at least one —O—, —(CO), —S—, —(CO)O— or

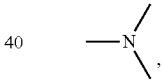

—$NR^2$—, and wherein the substituent is preferably at least one $C_1$-$C_6$alkyl, more preferably methyl, and preferably $S^1$ is substituted or unsubstituted, straight-chain or branched $C_1$-$C_6$alkylen in which one or more, preferably non-adjacent, C-atom, CH— or $CH_2$—, group may be replaced by a single bond or at least one —O—, —O(CO), —S—, —(CO)O— or

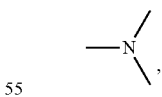

—$NR^2$—, wherein $R^{2'}$ is as described above and wherein the substituent of $C_1$-$C_{24}$alkylen is preferably at least one $C_1$-$C_6$alkyl, preferably methyl;

$R^1$ represents halogen, $C_1$-$C_{16}$alkoxy, $C_1$-$C_{16}$alkyl, nitro or nitrile, preferably methoxy, chlorine, fluorine or nitrile, and more preferably fluorine, $R^{1'}$ and $R^{1''}$ have independently from each other the meaning of hydrogen, fluorine, $C_1$-$C_6$alkoxy, nitrile and/or chlorine; preferably hydrogen methoxy, fluorine or chlorine and more preferably hydrogen or fluorine; and Z and U have the above given meanings and preferences.

More especially most preferred is a first and/or second monomer, especially first monomer, comprising a photoreactive group of formula (I) which is represented by formula (XVII)

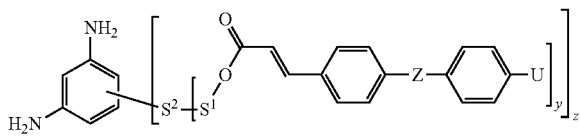

(XVII)

wherein

Z, y, z, S¹, S² and U have the above given meanings and preferences;

or

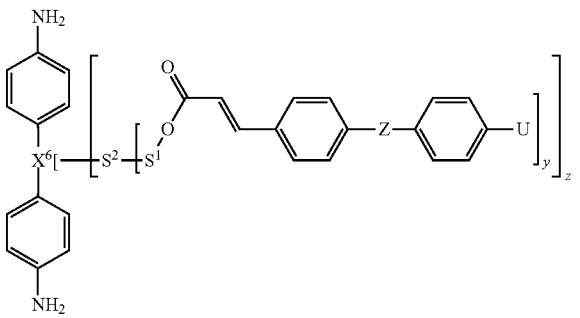

(XVIII)

wherein Z, U, S¹, S², y and z have the meanings and preferences as given above and wherein X⁶ is preferably a single bond or straight-chain or branched, substituted or unsubstituted $C_1$-$C_6$alkylen, preferably propylene, butylen, wherein propylene is linked twice in 2,2-position and butylen is linked in the 2- and 3-position;

or

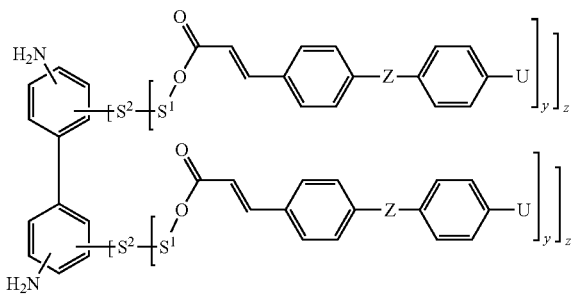

(XIX)

wherein Z, U, S¹, S², y and z have the meanings and preferences as given above and wherein the amino groups are preferably in para position of the biphenyl binding;

Further, most preferred is a first and/or second monomer, especially first monomer, comprising a photoreactive group of formula (I) which is represented by for example a group of formula (IV) formulae (XX) or (XXI)

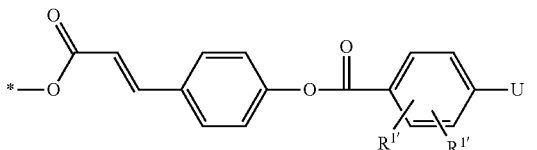

(XX)

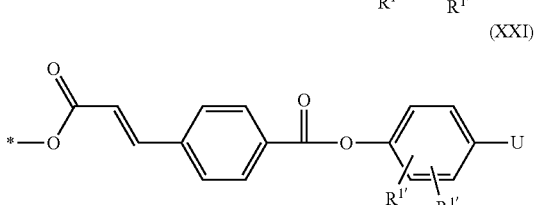

(XXI)

wherein

U and X have the above described meanings and preferences, $R^{1'}$, $R^{1''}$ are independently from each other hydrogen, halogen, $C_1$-$C_{16}$alkoxy, $C_1$-$C_{16}$alkyl, nitro or nitrile, preferably hydrogen, methoxy, fluorine, chlorine or nitrile, and more preferably hydrogen or fluorine.

The present invention also relates to a method for the preparation of the polymer, homo- or copolymer or oligomer, wherein said method comprises polymerising monomer(s) of the invention as described above and with their preferences given above.

Polyamic Acid, Polyimide, Polyamic Acid Ester

The copolymer, such as polyamic acid, polyamic acid ester and polyimide and mixtures thereof, may be prepared in line with known methods, such as those described in Plast. Eng. 36 (1996), (Polyimides, fundamentals and applications), Marcel Dekker, Inc. and in WO WO2007/071091, on page 64 second paragraph to page 68, line 29.

In a preferred embodiment, the present invention relates to a method for the preparation of polyamic acid by polycondensing of the two diamino monomers.

Further the present invention relates to a method for the preparation of polyimide by
a) by polycondensing at least one tetracarboxylic dianhydride with at least one monomer of formulae (XVI), (XVII), (XVIII), (XIX), or a monomer having a group of formulae (I), (II), (XX) or (XXI), and
b) dehydrating and ring-closure of the above polyamic acid prepared in step a).

Further, the present invention preferably relates to a method, wherein a poly-condensation reaction for the preparation of the polyamic acids is carried out in solution in organic solvents, such as ester, ether, alcohol, amide, lactone, unpolare aprotic solvents, such as toluol, or mixtures thereof. Preferred are a polar aprotic organic solvent, preferably selected from γ-butyrolactone, N,N-dimethylacetamide, N-methylpyrrolidone or N,N-dimethyl-formamide.

Preferably, the present invention relates a method, wherein subsequent to the poly-condensation cyclisation with removal of water is carried out thermally under formation of a polyimide.

More preferably, the present invention relates a method, wherein imidisation is carried out prior or after the application of the copolymer to a support.

In the context of the present invention the term "polyimide" has the meaning of partially or completely imidisated polyamic acid or polyamic ester. In analogy, the term "imidisation" has in the context of the present invention the meaning of partially or complete imidisation.

Examples of material that may be used for the dehydration are for example acetic anhydride, trifluoroacetic anhydride or propionic anhydride. Examples of material that may be used for the ring-closure catalyst may include for example trimethylamine, triethylamine, pyridine or collidine.

A polyamic acid ester is obtained by reacting for example the above polyamic acid with an organic halide, alcohol or phenol.

In addition, the present invention relates to copolymer as described above, which are obtainable by the methods described above and the preferred methods given above; or which comprises monomers as described above, which are polymerised, and preferably those of formula (IV), especially more preferred monomers of formula (XVI), especially most preferred monomers of formulae (XVII), (XVIII) or (XIX), and further most preferred monomers having a group of formulae (I), (II), (XX) or (XXI), which are polymerised.

Preferably, the copolymer of the present invention is represented by polyamic acid, polyimide, polyamic acid ester, and is preferably obtained by the methods described above and the preferred methods given above.

The tetracarboxylic dianhydride used in the present invention is not particularly limited, and represents for examples a compound of formula (XXIII)

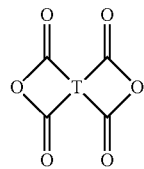

(XXVI)

wherein:
T represents a tetravalent organic radical.

The tetravalent organic radical T is preferably derived from an aliphatic, alicyclic or aromatic tetracarboxylic acid dianhydride.

Preferred examples of aliphatic or alicyclic tetracarboxylic acid dianhydrides are:
1,1,4,4-butanetetracarboxylic acid dianhydride, ethylenemaleic acid dianhydride,
1,2,3,4-cyclobutanetetracarboxylic acid dianhydride, 1,2,3,4-cyclopentanetetracarboxylic acid dianhydride; 2,3,5-tricarboxycyclopentylacetic acid dianhydride (with the term "2,3,5-tricarboxycyclopentylacetic acid dianhydride" all isomers of this compound are incorporated especially the exo and/or endo body), 2,3,5-tricarboxycyclopentylacetic-1,2:3,4-dianhydride is accessible for example by processes as described in JP59-190945, JP60-13740 and JP58-109479, respectively DE 1078120 and JP58-109479, or GB 872,355, and JP04458299, which processes are herewith incorporated by reference;
tetrahydro-4,8-methanofuro[3,4-d]oxepine-1,3,5,7-tetrone, 3-(carboxymethyl)-1,2,4-cyclopentanetricarboxylic acid 1,4:2,3-dianhydride, hexahydrofuro[31,41:4,5]cyclopenta[1,2-c]pyran-1,3,4,6-tetrone, 3,5,6-tricarboxynorbornylacetic acid dianhydride, 2,3,4,5-tetrahydrofurantetracarboxylic acid dianhydride,rel-[1S,5R,6]-3-oxabicyclo[3.2.1]octane-2,4-dione-6-spiro-3'-(tetrahydrofuran2',5'-dione), 4-(2,5-dioxotetrahydrofuran-3-yl)tetrahydronaphthalene-1,2-dicarboxylicacid dianhydride, 5-(2,5-dioxotetrahydrofuran-3-yl)-3-methyl-3-cyclohexene-1,2-dicarboxylic-acid dianhydride, bicyclo[2.2.2]oct-7-ene-2,3,5,6-tetracarboxylic acid dianhydride, bicyclo[2.2.2]octane-2,3,5,6-tetracarboxylic acid dianhydride, 1,8-dimethylbicyclo[2.2.2]oct-7-ene-2,3,5,6-tetracarboxylic acid dianhydride, pyromellitic acid dianhydride, 3,3',4,4'-benzophenonetetracarboxylic acid dianhydride, 4,4'-oxydiphthalic acid dianhydride, 3,3',4,4'-diphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)diphenyl sulfide dianhydride, 4,4'-bis(3,4-dicarboxyphenoxy)-diphenyl sulfone dianhydride, 4,4'-bis(3,4-dicarboxyphenoxy)-diphenylpropane dianhydride, 3,3',4,4'-biphenyltetracarboxylic acid dianhydride, ethylene glycol bis(trimellitic acid)dianhydride, 4,4'-(1,4-phenylene)bis(phthalic acid)dianhydride, 4,4'-(1,3-phenylene)bis(phthalic acid)dianhydride, 4,4'-(hexafluoroisopropylidene)diphthalic acid dianhydride, 4-tert-butyl-6-(2,5-dioxotetrahydro-3-furanyl)-2-benzofuran-1,3-dione, 5-(2,5-dioxotetrahydro-3-furanyl)-3a,4,5,9b-tetrahydronaphtho[1,2-c]furan-1,3-dione, 5-(2,5-dioxotetrahydro-3-furanyl)-5-methyl-3a,4,5,9b-tetrahydronaphtho[1,2-c]furan-1,3-dione, 5-(2,5-dioxotetrahydro-3-furanyl)-6-methylhexahydro-2-benzofuran-1,3-dione, 5-(2,5-dioxotetrahydro-3-furanyl)-7-methyl-3a,4,5,7a-tetrahydro-2-benzofuran-1,3-dione, 6-(2,5-dioxotetrahydro-3-furanyl)-4-methylhexahydro-2-benzofuran-1,3-dione, 9-isopropyloctahydro-4,8-ethenofuro[3',4':3,4]cyclobuta[1,2-f][2]benzofuran-1,3,5,7-tetrone, 1,2,5,6-cyclooctanetetracarboxylic acid dianhydride, octahydro-4,8-ethenofuro[3',4':3,4]cyclobuta[1,2-f][2]benzofuran-1,3,5,7-tetrone, octahydrofuro[3',4':3,4]cyclobuta[1,2-f][2]benzofuran-1,3,5,7-tetrone, tetrahydro-3,3'-bifuran-2,2',5,5'-tetrone, 4,4'-oxydi(1,4-phenylene)bis(phthalic acid)dianhydride, and 4,4'-methylenedi(1,4-phenylene)bis(phthalic acid)dianhydride.

Preferred examples of aromatic tetracarboxylic acid dianhydrides are: pyromellitic acid dianhydride,
3,3',4,4'-benzophenonetetracarboxylic acid dianhydride,
4,4'-oxydiphthalic acid dianhydride,
3,3',4,4'-diphenylsulfonetetracarboxylic acid dianhydride,
1,4,5,8-naphthalenetetracarboxylic acid dianhydride,
2,3,6,7-naphthalenetetracarboxylic acid dianhydride,
3,3',4,4'-dimethyldiphenylsilanetetracarboxylic acid dianhydride,
3,3',4,4'-tetraphenylsilanetetracarboxylic acid dianhydride,
1,2,3,4-furantetracarboxylic acid dianhydride,
4,4'-bis(3,4-dicarboxyphenoxy)diphenyl sulfide dianhydride,
4,4'-bis(3,4-dicarboxyphenoxy)diphenyl sulfone dianhydride,
4,4'-bis(3,4-dicarboxyphenoxy)diphenylpropane dianhydride,
3,3',4,4'-biphenyltetracarboxylic acid dianhydride,
ethylene glycol bis(trimellitic acid)dianhydride,
4,4'-(1,4-phenylene)bis(phthalic acid)dianhydride,
4,4'-(1,3-phenylene)bis(phthalic acid)dianhydride,
4,4'-(hexafluoroisopropylidene)diphthalic acid dianhydride,
4,4'-oxydi(1,4-phenylene)bis(phthalic acid)dianhydride,
4,4'-methylenedi(1,4-phenylene)bis(phthalic acid)dianhydride, 4-tert-butyl-6-(2,5-dioxotetrahydro-3-furanyl)-2-benzofuran-1,3-dione, and the like.

More preferably the tetracarboxylic acid dianhydrides used to form the tetravalent organic radical T are selected from:

1,2,3,4-cyclobutanetetracarboxylic acid dianhydride,
1,2,3,4-cyclopentanetetracarboxylic acid dianhydride,
2,3,5-tricarboxycyclopentylacetic acid dianhydride,
tetrahydro-4,8-methanofuro[3,4-d]oxepine-1,3,5,7-tetrone,
3-(carboxymethyl)-1,2,4-cyclopentanetricarboxylic acid 1,4:2,3-dianhydride,
hexahydrofuro[3',4':4,5]cyclopenta[1,2-c]pyran-1,3,4,6-tetrone,
5-(2,5-dioxotetrahydrofuran-3-yl)-3-methyl-3-cyclohexene-1,2-dicarboxylic acid dianhydride, pyromellitic acid dianhydride,
4-(2,5-dioxotetrahydrofuran-3-yl)tetrahydronaphthalene-1,2-dicarboxylic acid dianhydride,
5-(2,5-dioxotetrahydro-3-furanyl)-5-methyl-3a,4,5,9b-tetrahydronaphtho[1,2-c]furan-1,3-dione,
5-(2,5-dioxotetrahydro-3-furanyl)-3a,4,5,9b-tetrahydronaphtho[1,2-c]furan-1,3-dione,
5-(2,5-dioxotetrahydro-3-furanyl)-7-methyl-3a,4,5,7a-tetrahydro-2-benzofuran-1,3-dione,
4-tert-butyl-6-(2,5-dioxotetrahydro-3-furanyl)-2-benzofuran-1,3-dione,
4,4'-(hexafluorneoisopropylidene)diphthalic acid dianhydride and
bicyclo[2.2.2]oct-7-ene-2,3,5,6-tetracarboxylic acid dianhydride.

A further embodiment of the present invention relates to a composition comprising a copolymer as described above and within the above given preferences, or a monomer as described and within the above given preferences.

A further embodiment of the present invention relates to composition, preferably a blend, comprising a copolymer as described above, or prepared or obtained as described in the present invention.

Preferred is a composition comprising at least one especially the first monomer or/and second monomer, especially the first monomer, of formulae (I), especially (II) and more especially (IV), and most especially (XVI), (XVII), (XVIII), (XIX), or preferably especially the first monomer or/and second monomer, especially the first monomer having a group of formulae (I), (II), (XX) or (XXI), and more preferably at least two diamine monomers, as described above and with all given preferences thereof, or preferably at least two diamines, wherein at least one dimaine monomer is linked to the photoreactive group of formula (I) and the other diamine is $D^2$, which has the same meaning and preferences as D or $D^1$ as described in the present invention except that it is not a radical group which is linked to the photoreactive group of formula (I), however is saturated at this potential linking position with hydrogen.

Most preferred are the compositions comprising a monomer of the invention comprising a) at least two different tetracarboxylic dianhydrides, especially 1,2,3,4-cyclobutane-tetracarboxylic acid dianhydride, and 2,3,5-tricarboxycyclo-pentylacetic acid dianhydride, or/and b) two different first or/and second, especially first monomers of formulae (IV), (XVI), wherein D is a diamino group, or (XVII), (XVIII), (XIX), or a monomer having a group of formulae (I), (II), (XX) or (XXI) which comprise a polymerisable diamino group; and c) optionally a further diamine $D^2$, which has the same meaning and preferences as D or $D^1$ as described in the present invention except that it is not a radical group which is linked to the photoreactive group of formula (I), however is saturated at this potential linking position with hydrogen. Preferred further diamine is for example a diamine comprising a steroidal skeleton such as cholesterol, or an alicyclic group within the above given meanings and preferences, or aminophenylen-$Z^4$-phenylenamino, wherein $Z^4$ has the same meaning and preferences as given above, especially 4-(4-aminobenzyl)-phenylamine or 4-[2-(4-aminophenyl)ethyl]phenylamine; and d) optionally organic solvents, and e) optionally epoxy-, acrylate-, methacrylate-, vinyl-compounds, and f) optionally additives.

A more preferred composition of the present invention comprises a copolymer and in addition comprises epoxy-, acrylate-, allyl-, methacrylate-, vinyl-compounds.

The compositions, preferably blends comprising a copolymer comprising, according to the invention may optionally further include organic solvent. Organic solvent includes, however, is not limited to chlorobenzene, pyrrolidone solvents such as preferably, N-methyl-2-pyrrolidone, N-ethyl-2-pyrrolidone, N-cyclohexyl-2-pyrrolidone; dimethylsulfoxide, dimethylformamide, toluene, chloroform, organic ester, such as acetyl acetic ester or butyl acetic ester, pentyl acetic ester, hexyl acetic ester; further Y-butyrolactone, methyl cellosolve, butyl cellosolve, butyl carbitol, tetrahydrofuran, ditehylene glycol diethylether, dipentylether dipropylene glycol dimethylether, diisobutyl ketone momoethylene glycol dimethyl ether, etc. These solvents can be used alone or in mixtures thereof.

Further, the present invention may comprise additives such as cross-linking agents, such as epoxy-, acrylate-, methacrylate-agents such as for example the photoalignment additives as disclosed in US 2009/0290109; or additives selected from the following group: 4,4'-methylene-bis-(N,N-diglycidylaniline), trimethylolpropane triglycidyl ether, benzene-1,2,4,5-tetracarboxylic acid 1,2,4,5-N,N'-diglycidyldiimide, polyethylene glycol diglycidyl ether and N,N-diglycidylcyclohexylamine, Trimethylolpropane tris(3-mercaptopropionate), Pentaerythritol tetrakis(3-mercaptopropionate), Trimethylolpropane tris(2-mercaptoacetate), Pentaerythritol tetrakis(2-mercaptoacetate).

In addition, the compositions of the present invention may comprise additives such as Thioxanthone, 4,4'-Bis(dimethylamino)benzophenone, Thiomichler's Ketone.

Preferably, the composition of the invention comprises 0.5% to 99% by weight of a copolymer as described above, preferably one comprising group (I); and 99.5 to 1% by weight of an organic solvent. Preferably, the composition, preferably blend, comprises 0.5 to 40% by weight and more preferably 0.5 to 10% by weight and most preferably 0.5 to 5% by of a polymer, homo- or copolymer or oligomer as described above, preferably one comprising group (I).

The present invention further relates to a method for the preparation of a copolymer as described above, which comprises bringing into contact, preferably, polymerizing, the first and the second monomer.

The copolymer as described above may be used in form of copolymer layers alone or in combination with other polymers homo- or copolymers or oligomers monomers, photo-active polymers, photo-active oligomers and/or photo-active monomers, depending upon the application to which the copolymer layer is to be added. Therefore it is understood that by varying the composition of the copolymer layer, homo- or copolymer layer, or oligomer layer it is possible to control specific and desired properties, such as an induced pre-tilt angle, good surface wetting, a high voltage holding ratio or a specific anchoring energy.

In the context of the present invention copolymer layer has the meaning of copolymer layer.

Preferably, the invention relates to a copolymer layer comprising a copolymer according to the present invention in a polymerized, degradated, rearranged, cross-linked and/or isomerized form.

The present invention also relates to a method for the preparation of copolymer layers by using the copolymer of the present invention.

Preferred is a method for the preparation of polymer layers which comprises treating a polymer according to the invention with aligning light.

The polymer layer is preferably prepared by applying one or more polymers according to the invention to a support and, after imidisation or without imidisation, treating, preferably cross-linking and/or isomerising, the polymer or composition comprising the copolymer by irradiation with aligning light.

The treatment with aligning light may be conducted in a single step or in several separate steps. In a preferred embodiment of the invention the treatment with aligning light is conducted in a single step.

In the context of the present invention, aligning light is light of wavelengths, which can initiate photoalignment. Preferably, the wavelengths are in the UV-A, UVB and/or UV/C-range, or in the visible range. It depends on the photoalignment compound, which wavelengths are appropriate. Preferably, the photo-reactive groups are sensitive to visible and/or UV light. A further embodiment of the invention relates to the generating of aligning light by laser light. The instant direction of the aligning light may be normal to the substrate or at any oblique angle.

For generating tilt angles, preferably the aligning light is exposed from oblique angles. More preferably, aligning light is at least partially linearly polarized, elliptically polarized, such as for example circularly polarized, or non-polarized; most preferably at least circularly or partially linearly polarized light, or non-polarized light exposed obliquely. Especially, most preferred aligning light denotes substantially polarised light, especially linearly polarised light; or aligning light denotes non-polarised light, which is applied by an oblique irradiation.

In a more preferred embodiment of the invention the copolymer is treated with polarised light, especially linearly polarised light, or by oblique radiation with non-polarised light.

In general, transparent support such as glass or plastic, which are not flexible or flexible substrates, optionally coated with indium tin oxide (ITO) or Pedot: PSS (Poly(3,4-ethylenedioxythiophene) poly(styrenesulfonate) or graphene based materials are used. Flexible substrates are used for flexible LCDs.

Further, it is possible to vary the direction of orientation and the tilt angle within the copolymer layer by controlling the direction of the irradiation of the aligning light. It is understood that by selectively irradiating specific regions of the copolymer layer very specific regions of the layer can be aligned. In this way, layers with a defined tilt angle can be provided. The induced orientation and tilt angle are retained in the copolymer layer by the process, especially by the process of crosslinking.

Further preferred methods of the invention relates to
a method for the preparation of a copolymer layer, which are vertically or planar aligned, preferably vertical;
a method for the preparation of multi-domain vertical alignment of a copolymer layer;
a method for the preparation of a copolymer layer with tilted optical axis.

A further embodiment of the present invention relates to a polymer layer, in particular orientation layer, comprising at least one copolymer as described above or obtained as described above.

It is understood that the polymer layers of the present invention (in form of a polymer gel, a polymer network, a polymer film, etc.) can also be used as orientation layers for liquid crystals. A further preferred embodiment of the invention relates to an orientation layer comprising one or more polymers or oligomers according to the invention, preferably in a cross-linked form. Such orientation layers can be used in the manufacture of unstructured or structured optical- or electro-optical elements, preferably in the production of hybrid layer elements.

The present invention the wording optical or electro-optical elements has for example the meaning of multilayer systems, or devices for the preparation of
a display waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays; (PSVA) polymer stabilised vertically aligned; (FPA) field-induced photoreactive alignment; hybrid FPA; vertically aligned (VA), preferably (MVA=multidomain vertical alignment), (PVA) patterned VA; VA-IPS mode liquid crystal displays, or displays using blue phase liquid crystals; all above display types are applied in either transmissive or reflective or transflective mode.

In addition, the present invention relates to a method for the preparation of a polymer, wherein one or more polymers, copolymers or oligomers according to the present invention is applied to a support, preferably from a solution of the polymer or oligomer material and subsequent evaporation of the solvent, and wherein, after any imidisation step which may be necessary, the polymer or oligomer or polymer composition treated with aligning light, and preferably isomerized and/or cross-linked by irradiation with aligning light.

A preferred method of the present invention relates to a method, wherein the direction of orientation and the tilt angle within the polymer layer is varied by controlling the direction of the irradiation with aligning light, and/or wherein by selectively irradiating specific regions of the polymer layer specific regions of the layer are aligned.

The orientation layers are suitably prepared from a solution of the photoalignment material. The polymer solution is applied to a support optionally coated with an electrode [for example a glass plate coated with indium-tin oxide (ITO)] so that homogeneous layers of 0.05 to 50 µm thickness are produced. In this process different coating techniques like spin-coating, meniscus-coating, wire-coating, slot-coating, offset-printing, flexo-printing, gravure-printing, ink jet printing may be used. Then, or optionally after a prior imidisation step, the regions to be oriented are irradiated, for example, with a high-pressure mercury vapor lamp, a xenon lamp or a pulsed UV laser, using a polarizer and optionally a mask for creating images of structures.

Further, the present invention relates to the use of a copolymer layer according to the present invention, preferably in cross-linked form, as an orientation layer for liquid crystals.

Further, the present invention relates to preferably the use of a copolymer layer for the induction of vertical alignment of adjacent liquid crystalline layers, in particular for operating a cell in MVA mode.

The irradiation time is dependent upon the output of the individual lamps and can vary from a few seconds to several hours. The photo-reaction (such as for example dimerization, polymerisation, cross-linking, isomerization) can also be carried out, however, by irradiation of the homogeneous layer using filters that, for example, allow only the radiation suitable for the cross-linking reaction to pass through.

It is understood that the copolymer layers of the invention may be used in the production of optical or electro-optical devices having at least one orientation layer as well as unstructured and structured optical elements and multi-layer systems.

The present invention relates to the use of a copolymer layer as an orientation layer for liquid crystals. Preferred is the use for the induction of alignment, such as vertical alignment or planar alignment of adjacent liquid crystalline layers.

A further embodiment of the invention relates to an optical or electro-optical device comprising one or more polymers or oligomers according to the present invention in cross-linked form. The electro-optical devices may comprise more than one layer. The layer, or each of the layers may contain one or more regions of different spatial orientation. Preferably, the present invention relates to an optical and electro-optical unstructured or structured constructional element, preferably liquid crystal display cells, multi-layer and hybrid layer elements, comprising at least one copolymer layer according to the present invention.

More preferably, the present invention relates to an orientation layer, comprising at least one polymer layer according to the present invention.

The advantages of the present invention could not be foreseen by a skilled person. It has surprisingly been found that with this new class of materials, the process window is very broad. This material is very versatile regarding the process window that it suits the specific manufacturing conditions of different display production lines. Advantageously, there are a lot of possibilities for optimizing and improving electro optical properties, or power consumption by changing the process parameters, intrinsic viscosities exposure energies and incidence angles of irradiation and still gives access to excellent alignment properties.

All meanings and preferences such as for materials, substances, processes, devices etc. as given in the present application apply to the whole document, also if this it not especially described.

EXAMPLES

Definitions Used in the Examples

Mass spectroscopy EI=EI (electron-impact)
ES=electron spray
[M+H]=MolecularMass plus proton
$^1$H NMR=$^1$H nuclear magnetic resonance spectroscopy
$^{19}$F NMR=$^{19}$F nuclear magnetic resonance spectroscopy
DMSOd$_6$=dimethylsulfoxid deutererd
300 MHz=300 Megaherz
M$^+$=MolecularMass of the cation
m=multiplett
d=douplet
dd=double douplet
t=triplett
s=sigulett
q=quintett
br=broad
δ☐=chemical shift
HCl=hydrogen chloride
HCl solution (25%)=volume percent
NaOH=sodium hydroxid
NaOH (30%)=weight percent
NMP=N-methyl-2-pyrrolidone
THF=tetrahydrofuran
TBME=tert. butyl methyl ether
DMF=dimethylformamide
Pd(OAc)$_2$=Palladiumacetat
Pretilt=tilt of liquid crystal
RT=room temperature
Pd/C=palladium/carbon
MLC-6610(Merck KGA)=licristal®, MLC-6610(Merck KGA), nematic liquid crystal Accessibility of Starting Materials 4-(4,4,4-trifluorobutoxy)benzoic is prepared according to the process described in WO 2007/071091 A1 pages 76 which is herewith incorporated by reference.

The 2,3,5-tricarboxycyclopentylacetic-1,2:3,4-dianhydride used in these examples comprises ≥99% in exo body content. The said exo body content is defined as ratio (%) of the whole content. 2,3,5-tricarboxycyclopentylacetic-1,2:3,4-dianhydride is accessible by processes as described in JP59-190945, JP60-13740 and JP58-109479, respectively DE 1078120 and JP58-109479, or GB 872,355, and JP04458299, which processes are herewith incorporated by reference.

Example 1

Preparation of (3(3)-cholest-5-en-3-yl 3,5-dinitrobenzoate

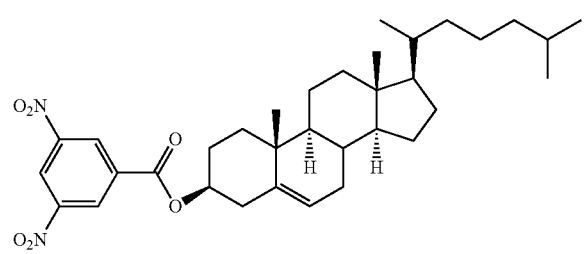

20.00 g (51.7 mmol) of cholesterol, 2.88 g (25.75 mmol) of 4-dimethylaminopyridine, 6.27 g (62.04 mmol) of triethylamine are dissolved in 100 mL of dichloromethane. 11.92 g (51.7 mmol) of commercial 3,5-dinitrobenzoylchloride dissolved in 50 mL of dichloromethane are added at 0° C. The solution is stirred for 2 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Crystallization from ethyl acetate:hexane mixture yielded 16.94 g (56%) of (3(3)-cholest-5-en-3-yl 3,5-dinitrobenzoate as yellowish crystals.

Example 2

Preparation of (3β)-cholest-5-en-3-yl 3,5-diaminobenzoate

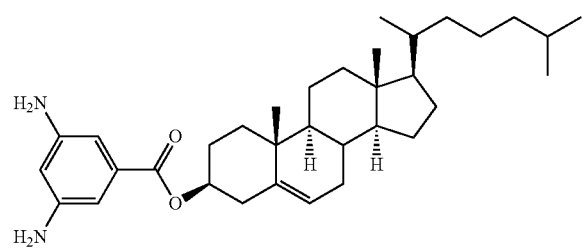

11.42 g (19.66 mmol) of (3β)-cholest-5-en-3-yl-3,5-dinitrobenzoate are dissolved in a mixture of 54 mL of N,N-dimethylformamide and 6 mL water. 32.6 g (120 mmol) ferric chloride hexahydrate are added. 13.1 g (201 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 400 g silica gel using toluene:ethyl acetate 1:3 as eluent and crystallization from ethyl acetate:hexane mixture yielded 8.20 g of (3β)-cholest-5-en-3-yl-3,5-$^1$H NMR DMSO $d_6$ 300 MHz 6.41 (d, 2H), 6.01 (t, 1H), 5.39 (m, 1H), 4.97 (s, 4H), 4.62 (m, 1H), 2.36 (m, 2H), 2.00-0.83 (m, 40H), 0.66 (s, 3H).

Example 3

Preparation of 5-(2,4-dinitrophenyl)pentan-1-ol

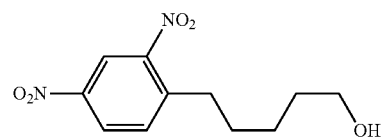 [SMILES: O=[N+]([O-])c1ccc(CCCCCO)c([N+](=O)[O-])c1]

50 g (304 mmol) of 5-phenylpentan-1-ol, 127 mL of NEt3 are dissolved in 50 mL of THF at 0° C. 46.5 g (456 mmol) of acetic anhydride is added to the mixture. The solution is stirred for 2 h at 0° C. and allowed to stir at room temperature overnight. After 22 hours at room temperature, the reaction mixture is partitioned between ethyl acetate and water. The organic phase is washed repeatedly with water, dried over sodium sulfate, filtrated and concentrated under reduced pressure. The crude product is added carefully to a mixture of 250 g sulphuric acid and 160 g nitric acid cooled at −5° C. The solution is stirred for 2 h at −5° C. The mixture is quenched with 500 g of ice and the product is extracted with toluene. The organic phase is washed repeatedly with water, dried over sodium sulfate, filtrated and concentrated under reduced pressure. The yellow oil is refluxed in 300 ml of methanol with 60 ml of HCl. After 22 hours under reflux, the reaction mixture is partitioned between ethyl acetate and water. The organic phase is washed repeatedly with water, dried over sodium sulfate, filtrated and concentrated under reduced pressure. Chromatography of the residue on 400 g silica gel using toluene:ethyl acetate 1:1 as eluant yielded 61 g (80%) of 5-(2,4-dinitrophenyl)pentan-1-ol as yellowish oil.

Example 4

Preparation of 7-{[5-(2,4-dinitrophenyl)pentyl]oxy}-2H-chromen-2-one

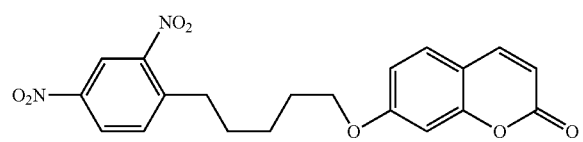

5 g (30.8 mmol) of commercial available 7-hydroxy-2H-chromen-2-one, 7.84 (30.8 mmol) of 5-(2,4-dinitrophenyl)pentan-1-ol, 10.5 g (40.0 mmol) of triphenylphosphine are dissolved in 100 mL of THF at 0° C. 8.1 g (40.0 mmol) of DIAD is added to the mixture. The solution is stirred for 2 h at 0° C. and allowed to stir at room temperature overnight. After 22 hours at room temperature, the reaction mixture is partitioned between ethyl acetate and water. The organic phase is washed repeatedly with water, dried over sodium sulfate, filtrated and concentrated under reduced pressure. Chromatography of the residue on 200 g silica gel using toluene:ethyl acetate 9:1 as eluant yielded 7.9 g (65%) of 7-{[5-(2,4-dinitrophenyl)pentyl]oxy}-2H-chromen-2-one as yellowish crystals.

Example 5

Preparation of 7-[(3,5-dinitrobenzyl)oxy]-2H-chromen-2-one

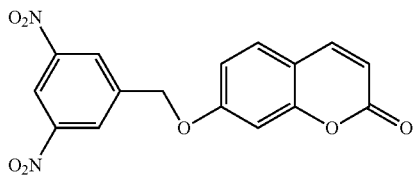

7-[(3,5-dinitrobenzyl)oxy]-2H-chromen-2-one is prepared analogous to 7-{[5-(2,4-dinitrophenyl)pentyl]oxy}-2H-chromen-2-one using 3,5-dinitrobenzyl alcohol.

Example 6

Preparation of 7-{[5-(2,4-diaminophenyl)pentyl]oxy}-2H-chromen-2-one

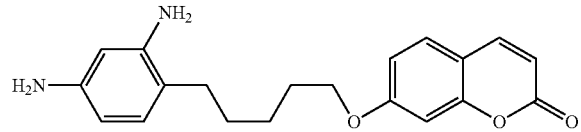 [SMILES: O=c1ccc2ccc(OCCCCCc3ccc([N+](=O)[O-])cc3[N+](=O)[O-])cc2o1]

2.90 g (7.28 mmol) of 7-{[5-(2,4-dinitrophenyl)pentyl]oxy}-2H-chromen-2-on are dissolved in a mixture of 63 ml of N,N-dimethylformamide and 7 ml water. 11.8 g (43.6 mmol) ferric chloride hexahydrate are added. 4.75 g (72.8 mmol) Zinc powder are added portionwise within 60 min. The mixture is allowed to react for 2 hours. The reaction mixture is then partitioned between ethyl acetate and water and filtered. The organic phase is washed repeatedly with water, dried over sodium sulfate, filtered and concentrated by rotary evaporation. Filtration of the residue on 200 g silica gel using toluene:ethyl acetate(1:3) as eluant and crystallization form ethylacetate:hexane mixture yielded 1.53 g of 7-{[5-(2,4-diaminophenyl)pentyl]oxy}-2H-chromen-2-one as yellowish crystals.

$^1$H NMR DMSO $d_6$ 300 MHz 8.00 (d, 1H), 7.63 (d, 1H), 6.98 (d, 1H), 6.95 (dd, 1H), 6.56 (d, 1H), 6.29 (d, 1H), 5.87 (d, 1H), 5.76 (dd, 1H), 4.46 (d, 4H), 4.08 (t, 2H), 2.29 (m, 2H), 1.75 (m, 2H), 1.46 (m, 4H).

Example 7

7-[(3,5-diaminobenzyl)oxy]-2H-chromen-2-one is prepared analogous to 7-{[5-(2,4-diaminophenyl)pentyl]oxy}-2H-chromen-2-one using 7-[(3,5-dinitrobenzyl)oxy]-2H-chromen-2-one.

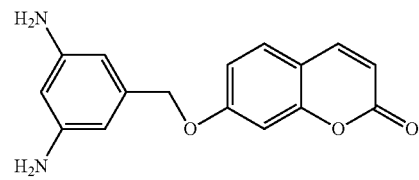 [SMILES: O=c1ccc2ccc(OCc3cc([N+](=O)[O-])cc([N+](=O)[O-])c3)cc2o1]

Mass spectroscopy EI: 283 (MH$^+$).

Example 8

Preparation of 4,4'-Dinitro-1,1'-biphenyl-2,2'-dicarboxylic acid

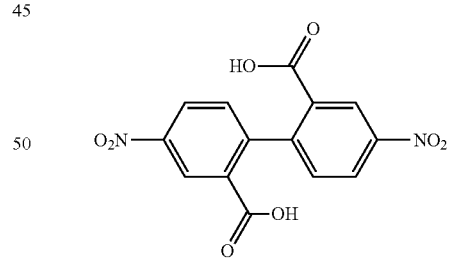

30.0 g (120.13 mmol) Diphenic acid are dissolved at room temperature in 469 g (4.59 mol) concentrated sulfuric acid (96%). The solution is cooled to −15° C. and a mixture of 92.4 g (1.011 mol) concentrated nitric acid (69%) and 12.0 g (0.117 mol) concentrated sulfuric acid (96%) is added slowly so that the mixture temperature is maintained below 0° C. After the addition the solution is allowed to react at room temperature for 24 h. After the mixture is poured onto crushed ice, the precipitate that formed i collected by filtration, washed with water and dried at room temperature under vacuum for 10 h.

Example 9

Preparation of 4,4'-Dinitro-1,1'-biphenyl-2,2'-dimethanol

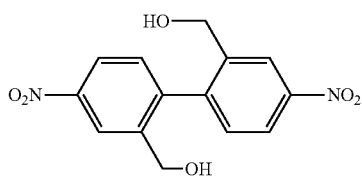 [SMILES: O=[N+]([O-])c1ccc(-c2ccc([N+](=O)[O-])cc2CO)c(CO)c1]

3.6 g (10.83 mmol) 4,4'-Dinitro-1,1'-biphenyl-2,2'-dicarboxylic acid are dissolved in 25 ml tetrahydrofuran and added dropwise in a the course of 1 hours to 65 ml (65.02 mmol) of a borane-tetrahydrofuran complex 1.0 M solution in tetrahydrofuran. After 19 hours at 25° C., 50 ml water are carefully added. After 1 h the solution is acidified to pH=1-2 with 10 ml 1N HCl solution and allowed to stirred for 30 min. The reaction mixture is then partitioned between ethyl acetate and water; the organic phase is washed repeatedly with water, dried over sodium sulfate, filtered and concentrated by rotary evaporation. The residue, 4.2 g of 4,4'-Dinitro-1,1'-biphenyl-2,2'-dimethanol as white powder is used without further purification.

Example 10

Preparation of {2'-[(acryloyloxy)methyl]-4',4-dinitro-1,1'-biphenyl-2-yl}methyl acrylate

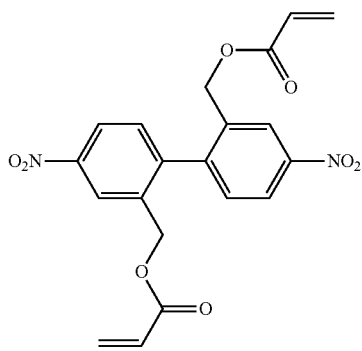 [SMILES: C=CC(=O)OCc1cc([N+](=O)[O-])ccc1-c1ccc([N+](=O)[O-])cc1COC(=O)C=C]

10 g (32.8 mmol) of 4,4'-Dinitro-1,1'-biphenyl-2,2'-dimethanol, 13.5 g (111 mmol) of N,N-dimethylaniline are dissolved in 100 ml of THF at 0° C. 8.92 g (98.5 mmol) of acryloyl chlorid is added dropwise. The solution is stirred for 2 h at 0° C. and allowed to stir at room temperature overnight. After 22 hours at room temperature, the reaction mixture is partitioned between ethyl acetate and water. The organic phase is washed repeatedly with water, dried over sodium sulfate, filtrated and concentrated under reduced pressure. Filtration of the residue on 400 g silica gel using toluene:ethyl acetate(1:1) as eluant yielded 8.9 g of {2'-[(acryloyloxy)methyl]-4',4-dinitro-1,1'-biphenyl-2-yl}methyl acrylate as a yellowish oil.

Example 11

Preparation of {2'-[(acryloyloxy)methyl]-4',4-diamino-1,1'-biphenyl-2-yl}methyl acrylate

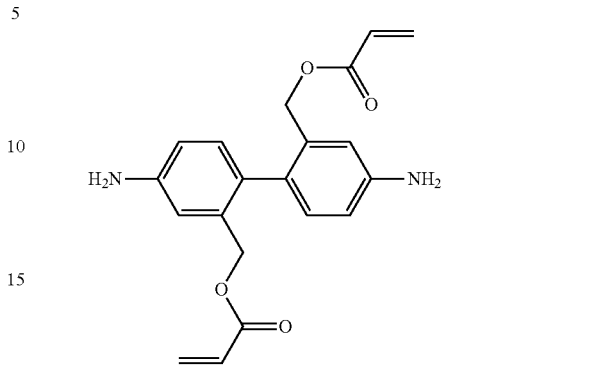

{2'-[(acryloyloxy)methyl]-4',4-diamino-1,1'-biphenyl-2-yl}methyl acrylate is prepared analogous to 7-{[5-(2,4-diaminophenyl)pentyl]oxy}-2H-chromen-2-one starting from {2'-[(acryloyloxy)methyl]-4',4-dinitro-1,1'-biphenyl-2-yl}methyl acrylate.

$^1$H NMR DMSO $d_6$ 300 MHz 6.78 (d, 2H), 6.64 (d, 2H), 6.53 (d, 2H), 6.31 (m, 2H), 6.17 (m, 2H), 5.94 (d, 2H), 5.14 (s, 4H), 4.73 (s, 4H).

Example 12

Preparation of (2E)-3-{4-[(4-benzoylbenzoyl)oxy]phenyl}prop-2-enoic acid

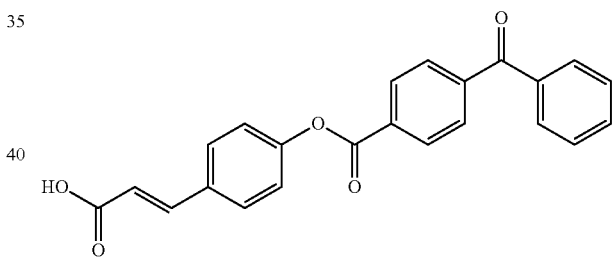

6.89 g (56.4 mmol) of 4-hydroxybenzaldehyd, 12.7 g (56.4 mmol) of 4-benzoylbenzoic acid, 0.69 g (5.6 mmol) of 4-Dimethylaminopyridine are dissolved in 100 ml of dichloromethane. 11.89 g (62.0 mmol) of N-(3-Dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature the reaction mixture was partitioned between dichloromethane and water; the organic phase is washed repeatedly with water, dried over sodium sulphate, filtered and concentrated by rotary evaporation. 4.69 g (14.2 mMol) of the intermediate 4-formylphenyl 4-benzoylbenzoate and 3.00 g (28.4 mMol) of Malonic acid are dissolved in 18 ml (227.1 mMol) of Pyridin.1.21 g (14.2 mMol) of Piperidin are added to the suspension which is allowed to react at 100° C. under argon for 1.5 h. The yellow solution is then thrown on ice. The solution is carefully acidified to pH=1-2 with a 25% HCl solution and is stirred for 15 min. The product is filtrated off and dried at room temperature under vacuum for 10 h to give 5.2 g of (2E)-3-{4-[(4-benzoylbenzoyl)oxy]phenyl}prop-2-enoic acid as white powder.

Example 13

Preparation of 4-{(1E)-3-[2-(2,4-dinitrophenyl)ethoxy]-3-oxoprop-1-enyl}phenyl 4-benzoylbenzoate

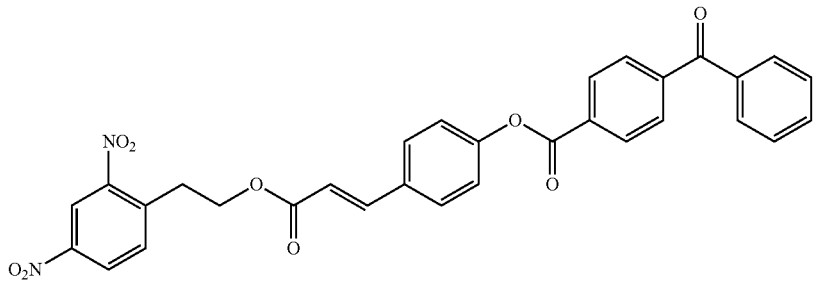 [SMILES: O=C(/C=C/c1ccc(OC(=O)c2ccc(C(=O)c3ccccc3)cc2)cc1)OCCc1ccc([N+](=O)[O-])cc1[N+](=O)[O-]]

2.50 g (11.8 mmol) of 2-(2,4-dinitrophenyl)ethanol, 4.39 g (11.8 mmol) of (2E)-3-{4-[(4-benzoylbenzoyl)oxy]phenyl}prop-2-enoic acid, 144 mg (1.2 mmol) of 4-Dimethylaminopyridine are dissolved in 30 ml of dichloromethane. 2.48 g (13.0 mmol) of N-(3-Dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature the reaction mixture is partitioned between dichloromethane and water. The organic phase is washed repeatedly with water, dried over sodium sulphate, filtered and concentrated by rotary evaporation. Chromatography of the residue on 200 g silica gel using toluene:ethyl acetate 95:5 as eluant and crystallization form ethylacetate:hexane mixture to yield 5.35 g of 4-{(1E)-3-[2-(2,4-dinitrophenyl)ethoxy]-3-oxoprop-1-enyl}phenyl 4-benzoylbenzoate as colorless crystals.

Example 14

Preparation of 4-{(1E)-3-[2-(2,4-diaminophenyl)ethoxy]-3-oxoprop-1-enyl}phenyl 4-benzoylbenzoate

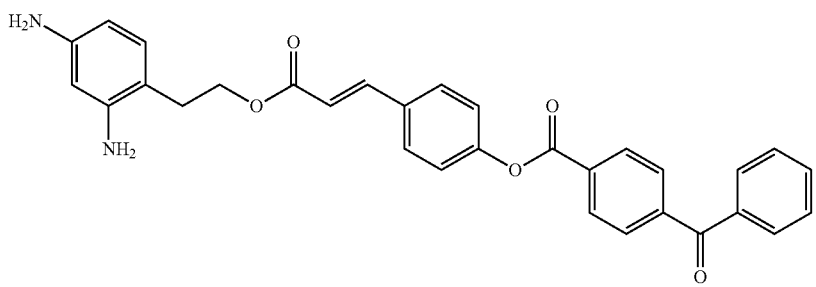 [SMILES: Nc1ccc(CCOC(=O)/C=C/c2ccc(OC(=O)c3ccc(C(=O)c4ccccc4)cc3)cc2)c(N)c1]

4.74 g (8.38 mmol) of (4-{(1E)-3-[2-(2,4-dinitrophenyl)ethoxy]-3-oxoprop-1-enyl}phenyl 4-benzoylbenzoate are dissolved in a mixture of 54 ml of N,N-dimethylformamide and 6 ml water. 13.9 g (51.4 mmol) ferric chloride hexahydrate are added. 5.60 g (85.7 mmol) Zinc powder are added portionwise within 60 min. The reaction mixture is allowed to react for 2 hours. The reaction mixture is then partitioned between ethyl acetate and water and filtered. The organic phase is washed repeatedly with water, dried over sodium sulfate, filtered and concentrated by rotary evaporation. Filtration of the residue on 200 g silica gel using toluene:ethyl acetate (1:3) as eluant and crystallization form ethylacetate:hexane mixture yielded 3.30 g of 4-{(1E)-3-[2-(2,4-diaminophenyl)ethoxy]-3-oxoprop-1-enyl}phenyl 4-benzoylbenzoate as yellowish crystals $^1$H NMR DMSO $d_6$ 300 MHz 8.82 (d, 2H), 8.56-7.60 (m, 10H), 7.63 (d, 2H), 6.69 (m, 2H), 5.89 (d, 1H), 5.81 (m, 1H), 4.66 (s, 2H), 4.59 (s, 2H), 4.16 (t, 2H), 2.72 (t, 2H)

List of the Diamines Used for the Polymer Preparation

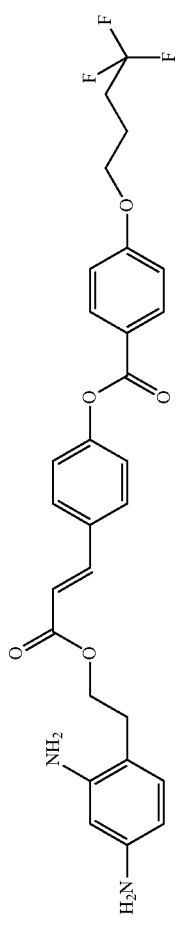

4-{(1E)-3-[2-(2,4-diaminophenyl)ethoxy]-3-oxoprop-1-enyl}phenyl 4-(4,4,4-trifluorobutoxy)benzoate/
Prepared according to WO2007/071091

Diamine 1

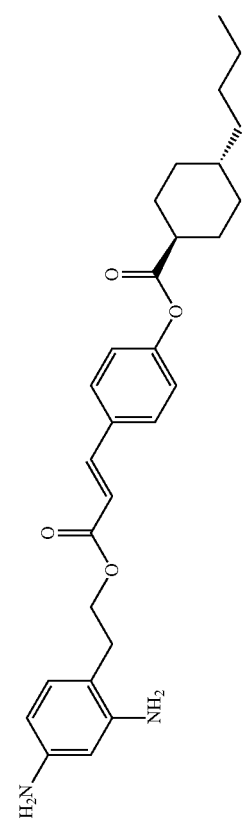

4-{(1E)-3-[2-(2,4-diaminophenyl)ethoxy]-3-oxoprop-1-enyl}phenyl 4-butylcyclohexanecarboxylate/
Prepared according to WO2008/145225

Diamine 2

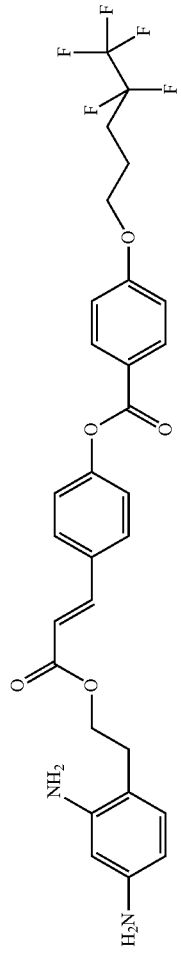

4-{(1E)-3-[2-(2,4-diaminophenyl)ethoxy]-3-oxoprop-1-enyl}phenyl 4-[(4,4,5,5,5-pentafluoropentyl)oxy]benzoate
Prepared according to WO2007/071091

Diamine 3

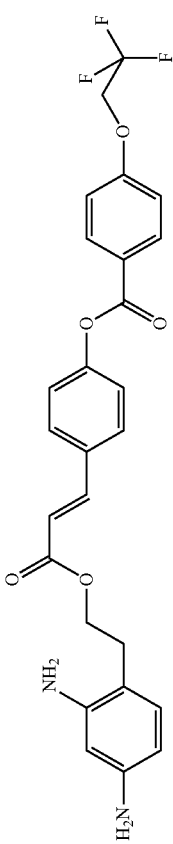

4-{(1E)-3-[2-(2,4-diaminophenyl)ethoxy]-3-oxo-1-propenyl}phenyl 4-(2,2,2-trifluoroethoxy)benzoate/
Prepared according to WO2007/071091

Diamine 4

-continued
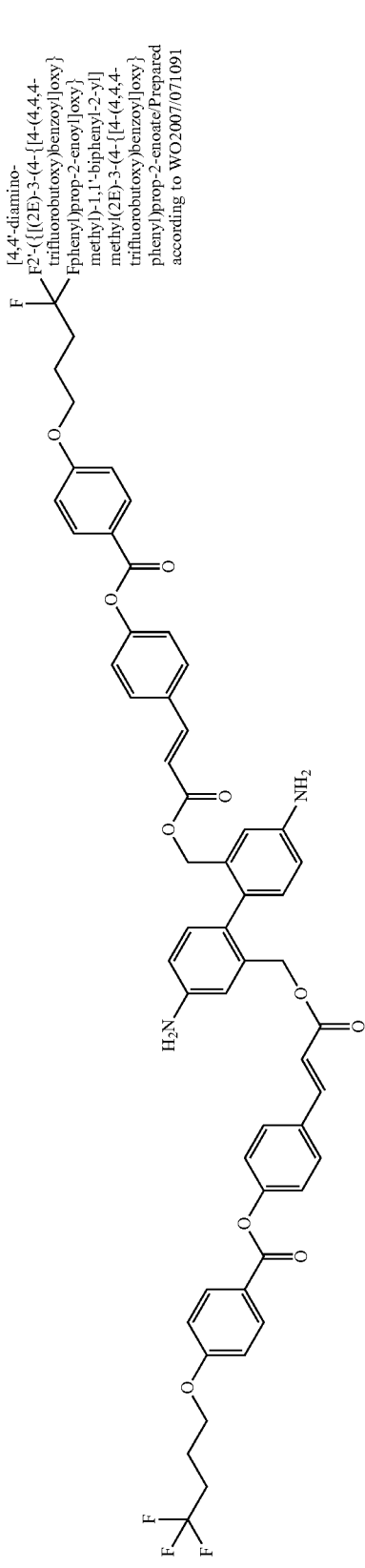
[4,4'-diamino-F2'-{[(2E)-3-(4-{[4-(4,4,4-trifluorobutoxy)benzoyl]oxy}Fphenyl)prop-2-enoyl]oxy}methyl)-1,1'-biphenyl-2-yl]methyl(2E)-3-(4-{[4-(4,4,4-trifluorobutoxy)benzoyl]oxy}phenyl)prop-2-enoate/Prepared according to WO2007/071091
Diamine 5
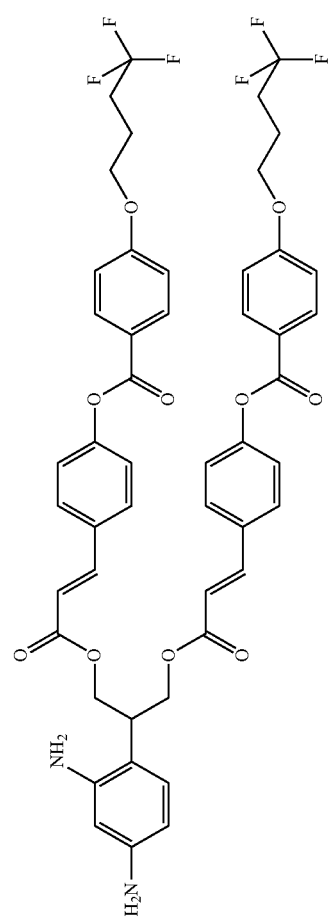
2-(2,4-diaminophenyl)-3-{[(2E)-3-(4-{[4-(4,4,4-trifluorobutoxy)benzoyl]oxy}phenyl)prop-2-enoyl]oxy}propyl (2E)-3-(4-{[4-(4,4,4-trifluorobutoxy)benzoyl]oxy}phenyl)prop-2-enoate/Prepared according to WO2007/071091
Diamine 6

-continued
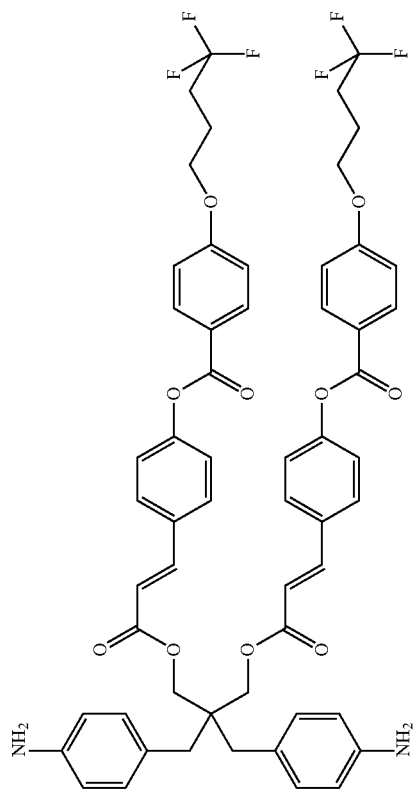
Diamine 7
2,2-bis(4-aminobenzyl)-3-{[(2E)-3-(4-{[4-(4,4,4-trifluorobutoxy)benzoyl]oxy}phenyl)prop-2-enoyl]oxy}propyl (2E)-3-(4-{[4-(4,4,4-trifluorobutoxy)benzoyl]oxy}phenyl)prop-2-enoate/
Prepared according to WO2007/071091
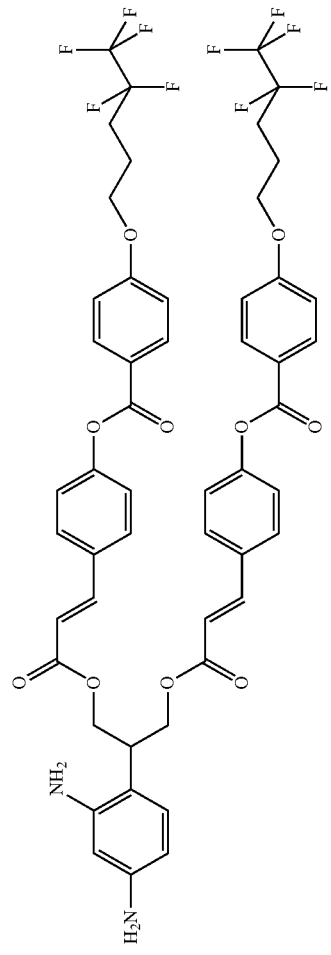
Diamine 8
2-(2,4-diaminophenyl)-3-{[(2E)-3-(4-{[4-((4,4,5,5,5-pentafluoropentyl)oxy)benzoyl]oxy}phenyl)prop-2-enoyl]oxy}propyl (2E)-3-(4-{[4-((4,4,5,5,5-pentafluoropentyl)oxy)benzoyl]oxy}phenyl)prop-2-enoate/
Prepared according to WO2007/071091

-continued
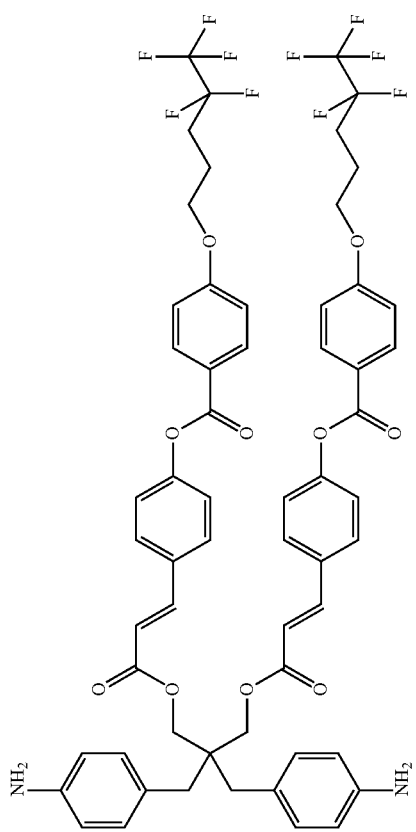
Diamine 9
2,2-bis(4-aminobenzyl)-3-{[(2E)-3-(4-{[4-((4,4,5,5-pentafluoropentyl)oxy)benzoyl]oxy}phenyl)prop-2-enoyl]oxy}propyl (2E)-3-(4-{[4-((4,4,5,5-pentafluoropentyl)oxy)benzoyl]oxy}phenyl)prop-2-enoate/ Prepared according to WO2007/071091
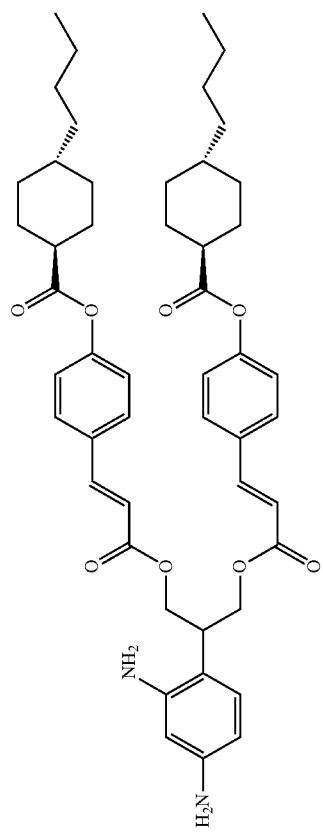
Diamine 10
2-(2,4-diaminophenyl)-3-{[(2E)-3-(4-{[(4-butylcyclohexyl)carbonyl]oxy}phenyl)prop-2-enoyl]oxy}propyl (2E)-3-(4-{[(4-butylcyclohexyl)carbonyl]oxy}phenyl)prop-2-enoate/ Prepared according to WO2008/145225

2,2-bis(4-aminobenzyl)-3-{[(2E)-3-(4-{[(4-butylcyclohexyl)carbonyl]oxy}phenyl)prop-2-enoyl]oxy}propyl (2E)-3-(4-{[(4-butylcyclohexyl)carbonyl]oxy}phenyl)prop-2-enoate/ Prepared according to WO2008/145225
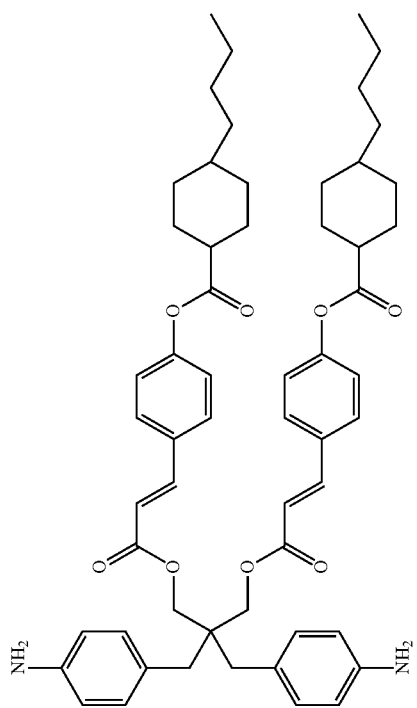
Diamine 11
(3β)-cholest-5-en-3-yl 3,5-diaminobenzoate
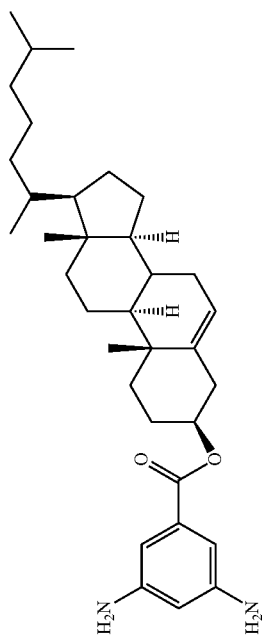
Diamine 12
7-{[5-(2,4-diaminophenyl)pentyl]oxy}-2H-chromen-2-one
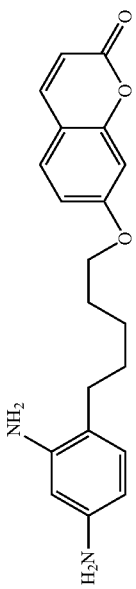
Diamine 13

-continued
Diamine 14
7-[(3,5-diaminobenzyl)oxy]-2H-chromen-2-one
Diamine 15
{2'-[(acryloyloxy)methyl]-4',4-diamino-1,1'-biphenyl-2-yl} methyl acrylate
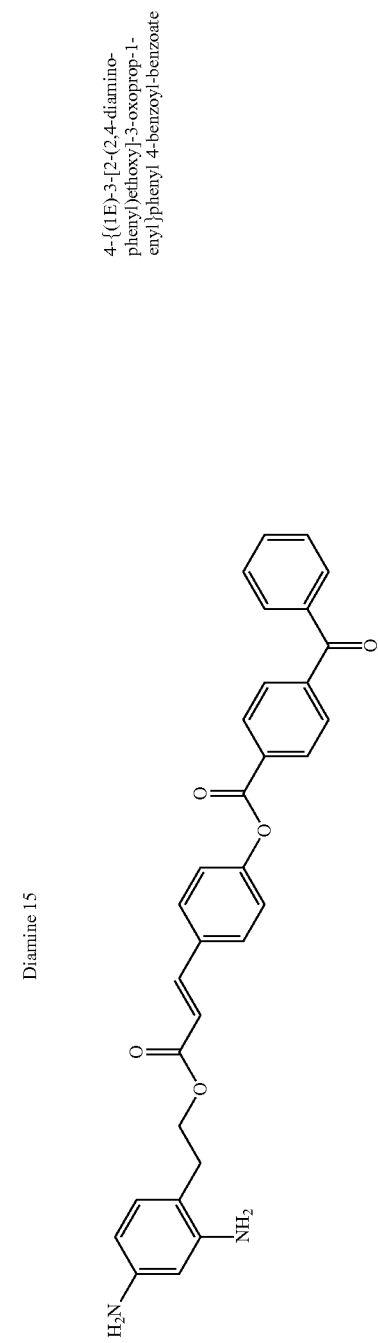
Diamine 16
4-{(1E)-3-[2-(2,4-diaminophenyl)ethoxy]-3-oxoprop-1-enyl}phenyl 4-benzoyl-benzoate A polymer backbone which can be referred as polymer main chain is a polyimide or polyamic acid material. Polyamic acids are precursor materials of polyimides.

General Procedure for Polymerisation Step a (Formation of Polyamic Acid)

0.820 g (3.66 mmol) of 2,3,5-tricarboxycyclopentylacetic-1,2:3,4-dianhydride is added to a solution of 0.549 g (1.09 mmol) of 4-{(1E)-3-[2-(2,4-diaminophenyl)ethoxy]-3-oxo-1-propenyl}phenyl 4-(2,2,2-trifluoroethoxy)benzoate and 2.55 g (2.56 mmol) of [4,4'-diamino-2'-({[(2E)-3-(4-{[4-(4,4,4-trifluorobutoxy)benzoyl]oxy}phenyl)prop-2-enoyl]oxy}methyl)-1,1'-biphenyl-2-yl]methyl (2E)-3-(4-{[4-(4,4,4-trifluorobutoxy)benzoyl]oxy}phenyl)prop-2-enoate in 6.56 mL of NMP. Stirring is then carried out at 0° C. for 2 hours. The mixture is subsequently allowed to react for 21 hours at room temperature. The polymer mixture is diluted with 18 mL of THF, precipitated into 800 mL of water to yield, after drying at room temperature under vacum, 3.76 g of polyamic acid P1 in the form of a white powder.

General Procedure for Imidization Step B (Formation of the Polyimide)

1.00 g of polyamic acid P1 obtained in above is dissolved in 9 ml of NMP. Thereto are added 0.753 mL of pyridine and 883 mL of acetic acid anhydride, and the dehydration and ring closure is carried out at 80° C. for 6 h. The polymer mixture is diluted with 10 ml NMP, precipitated into 100 ml diethyl ether and collected by filtration. The polymer is reprecipitated from THF (10 ml) into 200 ml water to yield, after drying at room temperature under vacuum, 0.950 g polyimide P29.

Polymer formed was characterized through its intrinsec viscosity and NMR data. In NMR, some representative signals could be seen. The integration are given as relative values. Molecular weight of the polymers formed is preferably in the range of 20000 to 200000.

List of the Polymers

| Polymer | Diamines (in % mol ratio) | Dianhydrides (in % mol ratio) | Viscosity dL/g | Imidization degree (%) |
|---|---|---|---|---|
| P1 | 4 (30) 5 (70) | TCA (100) | 0.34 | 0 |

Analytical data of polymer P1: $^1$H NMR/DMSO d6 300 MHz 12.38 (s, 1.0H), 10.33-9.52 (m, 0.8H), 8.04-8.01 (m, 1.9H), 7.82-7.58 (m, 4.5H), 7.24-7.06 (m, 4.6H), 6.56 (m, 0.9H), 4.90 (s, 1.7H), 4.25 (s, 0.3H), 4.10 (s, 1.5H), 3.33-2.70 (m, 8H), 2.49 (m, 2.7H), 1.90 (m, 2.7H)

| Polymer | Diamines (in % mol ratio) | Dianhydrides (in % mol ratio) | Viscosity dL/g | Imidization degree (%) |
|---|---|---|---|---|
| P2 | 4 (70) 5(30) | TCA (100) | 0.26 | 0 |

Analytical data of polymer P2: $^1$H NMR/DMSO d6 300 MHz 12.38 (s, 1.0H), 10.22-10.05 (m, 0.6H), 9.70-9.40 (m, 0.3H), 8.12-8.01 (m, 1.4H), 7.79-7.50 (m, 3.5H), 7.32-7.06 (m, 3.5H), 6.64-6.51 (m, 0.7H), 4.90 (m, 1.4H), 4.25 (s, 0.7H), 4.10 (s, 0.7H), 3.33-2.70 (m, 8H), 2.49 (m, 1.8H), 1.90 (m, 1.8H)

| Polymer | Diamines (in % mol ratio) | Dianhydrides (in % mol ratio) | Viscosity dL/g | Imidization degree (%) |
|---|---|---|---|---|
| P3 | 1 (50) 12 (50) | CBDA (100) | 0.36 | 0 |

Analytical data of polymer P3: $^1$H NMR/DMSO d6 300 MHz 12.47 (s, 1.6H), 10.41 (s, 0.7H), 10.19 (s, 0.4H), −9.58 (s, 0.4H), 8.38-7.10 (m, 7.7H), 6.60 (m, 0.4H), 5.39 (s, 0.4H), 4.71 (s, 0.5H), 4.29-3.59 (m, 5.3), 3.03 (s, 0.9H), 2.49 (m, 1.5H), 2.17-0.64 (m, 20H)

| Polymer | Diamines (in % mol ratio) | Dianhydrides (in % mol ratio) | Viscosity dL/g | Imidization degree (%) |
|---|---|---|---|---|
| P4 | 1 (70) 12 (30) | CBDA (100) | 0.30 | 0 |

Analytical data of polymer P4: $^1$H NMR/DMSO d6 300 MHz 12.47 (s, 1.0H), 10.41 (s, 0.3H), 10.19 (s, 0.5H), −9.82-9.58 (m, 0.5H), 8.38-7.10 (m, 8.5H), 6.60 (m, 0.7H), 5.39 (s, 0.3H), 4.71 (s, 0.3H), 4.29-3.59 (m, 3.7), 2.94-2.80 (m, 1.2H), 2.49 (m, 1.6H), 2.17-0.64 (m, 14H)

| Polymer | Diamines (in % mol ratio) | Dianhydrides (in % mol ratio) | Viscosity dL/g | Imidization degree (%) |
|---|---|---|---|---|
| P5 | 1 (90) 12 (10) | TCA (100) | 0.21 | 0 |

Analytical data of polymer P5: $^1$H NMR/DMSO d6 300 MHz 12.38 (s, 1.0H), 10.05-9.46 (m, 1.0H), 8.07 (s, 1.0 H), 7.79-7.10 (m, 5.0H), 6.60 (m, 0.5H), 5.39 (s, 0.1H), 4.71 (s, 0.1H), 4.24-4.14 (m, 2.0H), 3.3-2.51 (m, 2.4H), 2.49 (m, 2.0H), 2.17-0.64 (m, 3.8H)

| Polymer | Diamines (in % mol ratio) | Dianhydrides (in % mol ratio) | Viscosity dL/g | Imidization degree (%) |
|---|---|---|---|---|
| P6 | 9 (5) 1 (95) | TCA (100) | 0.21 | 0 |

Analytical data of polymer P6: $^1$H NMR/DMSO d6 300 MHz 12.40 (s, 1.0H), 10.22-9.40 (m, 1.0H), 8.15-8.01 (m, 1.3H), 7.85-7.06 (m, 6.3H), 6.65-6.55 (d, 0.7H), 4.25-4.10 (m, 2.5H), 3.33-2.70 (m, 10H), 2.49 (m, 1.9H), 1.90 (m, 1.9H)

| Polymer | Diamines (in % mol ratio) | Dianhydrides (in % mol ratio) | Viscosity dL/g | Imidization degree (%) |
|---|---|---|---|---|
| P7 | 3 (20) 1 (80) | TCA (100) | 0.23 | 0 |

Analytical data of polymer P7: $^1$H NMR/DMSO d6 300 MHz 12.40 (s, 1.0H), 10.22-9.40 (m, 1.0H), 8.10 (s, 1.1H), 7.90-7.06 (m, 5.7H), 6.65-6.55 (d, 0.6H), 4.25-4.10 (m, 2.3H), 3.33-2.70 (m, 9.8H), 2.49 (m, 1.9H), 1.90 (m, 1.9H)

| Polymer | Diamines (in % mol ratio) | Dianhydrides (in % mol ratio) | Viscosity dL/g | Imidization degree (%) |
|---|---|---|---|---|
| P10 | 7 (70) 3 (30) | TCA (100) | 0.50 | 60 |

Analytical data of polymer P10: $^1$H NMR/DMSO d6 300 MHz 12.39 (s, 0.2H), 10.03 (s, 0.2H), 8.02 (m, 1.0H), 7.87-7.10 (m, 4.9), 6.60 (m, 0.4H), 4.29-2.59 (m, 4.0), 2.49 (m, 1.3H), 1.97 (m, 1.3H)

| Polymer | Diamines (in % mol ratio) | Dianhydrides (in % mol ratio) | Viscosity dL/g | Imidization degree (%) |
|---|---|---|---|---|
| P11 | 1 (70) 3 (30) | TCA (100) | 0.39 | 50 |

Analytical data of polymer P11: $^1$H NMR/DMSO d6 300 MHz 12.59 (s, 0.4H), 10.06 (s, 0.4H), 8.05 (s, 1.0H), 7.90-7.05 (m, 4.6H), 6.61 (m, 0.5H), 4.14 (br, 2.0H), 4.08-2.75 (m, 2.3H), 2.49 (m, 1.4H), 1.96 (m, 1.4H)

| Polymer | Diamines (in % mol ratio) | Dianhydrides (in % mol ratio) | Viscosity dL/g | Imidization degree (%) |
|---|---|---|---|---|
| P12 | 1 (50) 6 (50) | TCA (100) | 0.27 | 80 |

Analytical data of polymer P12: $^1$H NMR/DMSO d6 300 MHz 12.59 (s, 0.0H), 10.06 (s, 0.0H), 7.99 (s, 1.0H), 7.87-7.06 (m, 4.5H), 6.57 (br, 0.5H), 4.36 (br, 0.6H), 4.12 (br, 1.3H), 4.08-2.75 (m, 1.3H), 2.49 (m, 1.2H), 1.96 (m, 1.2H)

| Polymer | Diamines (in % mol ratio) | Dianhydrides (in % mol ratio) | Viscosity dL/g | Imidization degree (%) |
|---|---|---|---|---|
| P13 | 1 (70) 6 (30) | TCA (100) | 0.34 | 80 |

Analytical data of polymer P13: $^1$H NMR/DMSO d6 300 MHz 12.61 (s, 0.1H), 10.04 (s, 0.1H), 8.04 (m, 1.0H), 7.90-7.09 (m, 3.7H), 6.60 (br, 0.4H), 4.46 (br, 0.5H), 4.12 (s, 1.3H), 4.08-2.75 (m, 2.3H), 2.49 (m, 1.1H), 1.96 (m, 1.1H)

| Polymer | Diamines (in % mol ratio) | Dianhydrides (in % mol ratio) | Viscosity dL/g | Imidization degree (%) |
|---|---|---|---|---|
| P14 | 7 (70) 10 (30) | TCA (100) | 0.30 | 80 |

Analytical data of polymer P14: $^1$H NMR/DMSO d6 300 MHz 12.51 (s, 0.2H), 10.04 (s, 0.2H), 8.03 (d, 1.0H), 7.79-7.06 (m, 6.8H), 6.73 (d, 0.6H), 6.58 (m, 0.3H), 4.34-3.35 (m, 4.7H), 2.49 (m, 1.4H), 1.96-0.85 (m, 6.5H)

| Polymer | Diamines (in % mol ratio) | Dianhydrides (in % mol ratio) | Viscosity dL/g | Imidization degree (%) |
|---|---|---|---|---|
| P15 | 1 (70) 8 (30) | TCA (100) | 0.20 | 80 |

Analytical data of polymer P15: $^1$H NMR/DMSO d6 300 MHz 12.60 (s, 0.1H), 10.03 (s, 0.1H), 8.12 (m, 1.0H), 7.90-7.09 (m, 4.3H), 6.60 (br, 0.5H), 4.46-4.12 (br, 1.8H), 4.08-2.75 (m, 1.9H), 2.49 (m, 1.3H), 1.96 (m, 1.3H)

| Polymer | Diamines (in % mol ratio) | Dianhydrides (in % mol ratio) | Viscosity dL/g | Imidization degree (%) |
|---|---|---|---|---|
| P16 | 8 (30) 7 (70) | TCA (100) | 0.50 | 100 |

Analytical data of polymer P16: $^1$H NMR/DMSO d6 300 MHz 8.01 (d, 1.0H), 7.77-7.05 (m, 4.9H), 6.67 (br, 0.5H), 4.46-2.63 (m 3.6H), 2.49 (m, 1.2H), 1.96 (m, 1.2H)

| Polymer | Diamines (in % mol ratio) | Dianhydrides (in % mol ratio) | Viscosity dL/g | Imidization degree (%) |
|---|---|---|---|---|
| P17 | 1 (70) 10 (30) | TCA (100) | 0.16 | 90 |

Analytical data of polymer P17: $^1$H NMR/DMSO d6 300 MHz 12.60 (s, 0.0H), 10.03 (s, 0.0H), 8.06 (s, 1.0H), 7.930-7.10 (m, 5.4H), 6.59 (br, 0.3H), 4.46-4.12 (br, 1.9H), 4.08-2.75 (m, 1.8H), 2.49 (m, 1.1H), 2.17 (m, 2.0H), 1.96 (m, 1.3H), 1.77-0.55 (m, 5.8H)

| Polymer | Diamines (in % mol ratio) | Dianhydrides (in % mol ratio) | Viscosity dL/g | Imidization degree (%) |
|---|---|---|---|---|
| P18 | 6 (70) 7 (30) | TCA (100) | 0.49 | 90 |

Analytical data of polymer P18: $^1$H NMR/DMSO d6 300 MHz 12.60 (s, 0.0H), 10.03 (s, 0.0H), 8.12 (m, 1.0H), 7.90-7.05 (m, 3.9H), 6.710 (br, 0.4H), 4.34-4.12 (br, 1.6H), 4.08-2.75 (m, 1.6H), 2.49 (m, 1.1H), 1.96 (m, 1.1H)

| Polymer | Diamines (in % mol ratio) | Dianhydrides (in % mol ratio) | Viscosity dL/g | Imidization degree (%) |
|---|---|---|---|---|
| P19 | 6 (50) 7 (50) | TCA (100) | 0.55 | 80 |

Analytical data of polymer P19: $^1$H NMR/DMSO d6 300 MHz 12.60 (s, 0.1H), 10.03 (s, 0.1H), 8.12 (m, 1.0H), 7.86-7.05 (m, 4.4H), 6.60 (br, 0.4H), 4.46-2.75 (m, 3.2H), 2.49 (m, 1.1H), 1.96 (m, 1.1H)

| Polymer | Diamines (in % mol ratio) | Dianhydrides (in % mol ratio) | Viscosity dL/g | Imidization degree (%) |
|---|---|---|---|---|
| P20 | 6 (30) 7 (70) | TCA (100) | 0.64 | 80 |

Analytical data of polymer P20: $^1$H NMR/DMSO d6 300 MHz 12.60 (s, 0.1H), 10.03 (s, 0.1H), 8.12 (m, 1.0H), 7.86-7.05 (m, 4.8H), 6.60 (br, 0.5H), 4.46-2.75 (m, 3.6H), 2.49 (m, 1.1H), 1.96 (m, 1.1H)

| Polymer | Diamines (in % mol ratio) | Dianhydrides (in % mol ratio) | Viscosity dL/g | Imidization degree (%) |
|---|---|---|---|---|
| P21 | 1 (70) 2 (30) | TCA (100) | 0.48 | 100 |

Analytical data of polymer P21: $^1$H NMR/DMSO d6 300 MHz 8.12 (m, 1.0H), 7.90-7.11 (m, 4.7H), 6.60 (br, 0.3H), 4.46-4.12 (br, 2.0H), 4.08-2.75 (m, 3.2H), 2.49 (m, 1.6H), 1.96 (m, 1.6H), 2.72-0.75 (m, 3.4)

| Polymer | Diamines (in % mol ratio) | Dianhydrides (in % mol ratio) | Viscosity dL/g | Imidization degree (%) |
|---|---|---|---|---|
| P22 | 3 (70) 2 (30) | TCA (100) | 0.40 | 0 |

Analytical data of polymer P22: $^1$H NMR/DMSO d6 300 MHz 12.38 (s, 1.0H), 10.06 (m, 0.5H), 9.50 (m, 0.5H), 8.08 (d, 0.8H), 7.78-7.10 (m, 5.0H), 6.70 (m, 0.5H), 4.13 (m, 1.8H), 3.30-2.75 (m, 2.5H), 2.49 (m, 1.9H), 2.20-0.84 (m, 2.6H)

| Polymer | Diamines (in % mol ratio) | Dianhydrides (in % mol ratio) | Viscosity dL/g | Imidization degree (%) |
|---|---|---|---|---|
| P23 | 11 (30) | 1 (70) | TCA (100) | 0.17 | 50 |

Analytical data of polymer P23: $^1$H NMR/DMSO d6 300 MHz 12.51 (s, 0.4H), 10.20-9.39 (m, 0.5H), 8.12 (m, 1.0H), 7.90-7.09 (m, 8.0H), 6.60 (br, 0.9H), 4.46-3.35 (m, 3.0H), 3.30-2.75 (m, 5.9H), 2.49 (m, 1.3H), 1.96 (m, 1.3H)

| Polymer | Diamines (in % mol ratio) | Dianhydrides (in % mol ratio) | Viscosity dL/g | Imidization degree (%) |
|---|---|---|---|---|
| P24 | 7 (70) | 1 (30) | TCA (100) | 0.39 | 70 |

Analytical data of polymer P24: $^1$H NMR/DMSO d6 300 MHz 12.40 (s, 0.2H), 10.03 (m, 0.2H), 8.12-7.05 (m, 6.2H), 6.70 (m, 0.5H), 4.13 (m, 1.1H), 4.10-2.75 (m, 3.1H), 2.49 (m, 1.1H), 1.95 (m, 1.1H), 1.83-0.85 (m, 6.8H)

| Polymer | Diamines (in % mol ratio) | Dianhydrides (in % mol ratio) | Viscosity dL/g | Imidization degree (%) |
|---|---|---|---|---|
| P25 | 7 (70) | 2 (30) | TCA (100) | 0.38 | 80 |

Analytical data of polymer P25: $^1$H NMR/DMSO d6 300 MHz 12.40 (s, 0.2H), 10.03 (m, 0.2H), 8.09 (d, 1.0H), 7.77-7.05 (m, 5.9H), 6.70 (m, 0.5H), 4.13 (m, 1.2H), 4.10-2.75 (m, 3.1H), 2.49 (m, 1.3H), 2.10-0.84 (m, 3.5H)

| Polymer | Diamines (in % mol ratio) | Dianhydrides (in % mol ratio) | Viscosity dL/g | Imidization degree (%) |
|---|---|---|---|---|
| P26 | 7 (30) | 1 (70) | TCA (100) | 0.44 | 40 |

Analytical data of polymer P26: $^1$H NMR/DMSO d6 300 MHz 12.54 (s, 1.0H), 10.03 (m, 1.0H), 8.06 (m, 4.8H), 7.77-7.08 (m, 23.2H), 6.66 (m, 2.3H), 4.32-3.34 (m, 10.7H), 3.30-2.75 (m, 9.1H), 2.49 (m, 6.6H), 1.97 (m, 6.6H)

| Polymer | Diamines (in % mol ratio) | Dianhydrides (in % mol ratio) | Viscosity dL/g | Imidization degree (%) |
|---|---|---|---|---|
| P27 | 7 (50) | 1 (50) | TCA (100) | 0.35 | 80 |

Analytical data of polymer P27 $^1$H NMR/DMSO d6 300 MHz 12.60 (s, 0.3H), 10.03 (s, 0.3H), 8.12 (m, 1.0H), 7.90-7.09 (m, 5.0H), 6.60 (br, 0.5H), 4.46-4.12 (br, 2.0H), 4.08-2.75 (m, 1.6H), 2.49 (m, 1.3H), 1.96 (m, 1.3H)

| Polymer | Diamines (in % mol ratio) | Dianhydrides (in % mol ratio) | Viscosity dL/g | Imidization degree (%) |
|---|---|---|---|---|
| P28 | 11 (30) | 7 (70) | TCA (100) | 1.01 | 60 |

Analytical data of polymer P28: $^1$H NMR/DMSO d6 300 MHz 12.40 (s, 0.2H), 10.03 (m, 0.2H), 8.02 (d, 1.0H), 7.77-7.06 (m, 7.3H), 6.70 (m, 0.7H), 4.13 (m, 1.2H), 4.10-2.75 (m, 2.6H), 2.49 (m, 1.3H), 2.10-0.84 (m, 5.8H)

| Polymer | Diamines (in % mol ratio) | Dianhydrides (in % mol ratio) | Viscosity dL/g | Imidization degree (%) |
|---|---|---|---|---|
| P29 | 4 (30) | 5 (70) | TCA (100) | 0.36 | 70 |

Analytical data of polymer P29: $^1$H NMR/DMSO d6 300 MHz 12.38 (s, 0.3H), 10.50 (s, 0.3H), 8.10-7.05 (m, 12.9H), 6.56 (d, 1.0H), 4.95 (br, 2.1H), 4.38-3.65 (m, 3.1H), 3.26-2.70 (m, 2.5H), 2.49 (m, 2.1H), 1.91 (m, 2.1H)

| Polymer | Diamines (in % mol ratio) | Dianhydrides (in % mol ratio) | Viscosity dL/g | Imidization degree (%) |
|---|---|---|---|---|
| P30 | 1 (90) | 13 (10) | TCA (100) | 0.27 | 0 |

Analytical data of polymer P18: $^1$H NMR/DMSO d6 300 MHz 12.38 (s, 1.0H), 10.05-9.36 (m, 1.0H), 8.08 (d, 1.0H), 7.94-7.02 (m, 5.2H), 6.91 (m, 0.1H), 6.63 (m, 0.5H), 4.26-4.13 (m, 2.3H), 4.10-2.75 (m, 2.5H), 2.49 (m, 1.6H), 1.96 (m, 1.6H)

| Polymer | Diamines (in % mol ratio) | Dianhydrides (in % mol ratio) | Viscosity dL/g | Imidization degree (%) |
|---|---|---|---|---|
| P31 | 1 (50) | 13 (50) | TCA (100) | 0.18 | 0 |

Analytical data of polymer P31: $^1$H NMR/DMSO d6 300 MHz 12.38 (s, 1.0H), 10.05-9.36 (m, 1.0H), 8.08 (m, 0.7H), 7.94-6.77 (m, 3.6H), 6.64 (m, 0.5H), 4.26-4.13 (m, 1.3H), 3.90-2.75 (m, 2.5H), 2.49 (m, 2.4H), 1.96 (m, 0.8H), 1.72 (s, 1.0H), 1.41-1.21 (m, 2.2H)

| Polymer | Diamines (in % mol ratio) | Dianhydrides (in % mol ratio) | Viscosity dL/g | Imidization degree (%) |
|---|---|---|---|---|
| P32 | 1 (95) | 14 (5) | TCA (100) | 0.13 | 0 |

Analytical data of polymer P32: $^1$H NMR/DMSO d6 300 MHz 12.38 (s, 1.0H), 10.05-9.36 (m, 1.0H), 8.08 (d, 0.9H), 7.94-7.02 (m, 5.2H), 6.91 (m, 0.1H), 6.63 (m, 0.5H), 5.12 (s, 0.1H), 4.26-4.13 (m, 2.3H), 4.10-2.75 (m, 2.5H), 2.49 (m, 1.6H), 1.96 (m, 1.6H)

| Polymer | Diamines (in % mol ratio) | Dianhydrides (in % mol ratio) | Viscosity dL/g | Imidization degree (%) |
|---|---|---|---|---|
| P33 | 5 (90) | 15 (10) | TCA (100) | 0.55 | 0 |

Analytical data of polymer P33: $^1$H NMR/DMSO d6 300 MHz 12.40 (s, 1.0H), 10.22 (m, 1.0H), 8.04 (d, 2.0H), 7.86-7.06 (m, 9.8H), 6.57 (m, 1.0H), 6.45-5.83 (m, 0.3H), 4.91 (br, 2.0H), 4.11 (s, 1.9H), 4.10-2.75 (m, 1.3H), 2.49 (m, 2.8H), 1.96 (m, 2.8H)

| Polymer | Diamines (in % mol ratio) | Dianhydrides (in % mol ratio) | Viscosity dL/g | Imidization degree (%) |
|---|---|---|---|---|
| P34 comparative example 1 | 1 (100) | | TCA (100) | 0.30 | 40 |

Analytical data of polymer P34: $^1$H NMR/DMSO d6 300 MHz 0.26-9.45 (m, 1.2H), 8.11 (d, 2.0H), 7.87-6.95 (m, 10.0H), 6.65 (m, 1.0H), 4.37-3.94 (m, 4.0H), 3.46-2.68 (m, 10.0H), 2.49 (m, 2.0H), 1.96 (m, 2.0H)

| Polymer | Diamines (in % mol ratio) | Dianhydrides (in % mol ratio) | Viscosity dL/g | Imidization degree (%) |
|---|---|---|---|---|
| P35 comparative example 2 | 7 (100) | TCA (100) | 0.58 | 70 |

Analytical data of polymer P35: $^1$H NMR/DMSO d6 300 MHz 12.35 (s, 0.3H), 10.04 (m, 0.3H), 8.02 (d, 4.0H), 7.86-7.06 (m, 22.0H), 6.57 (m, 2.0H), 4.13-3.39 (m, 8H), 3.30-2.75 (m, 12.0H), 2.49 (m, 4.0H), 1.96 (m, 4.0H)

| Polymer | Diamines (in % mol ratio) | Dianhydrides (in % mol ratio) | Viscosity dL/g | Imidization degree (%) |
|---|---|---|---|---|
| P36 | 1 (90) 16 (10) | TCA (100) | 0.22 | 0 |

Analytical data of polymer P36: $^1$H NMR/DMSO d6 300 MHz 12.34 (s, 1H), 10.05 (m, 1H), 9.28 (m, 0.1), 8.07 (d, 1.1H), 7.91-7.06 (m, 6.3H), 6.58 (m, 0.7H), 4.25-4.14 (m, 2.2H), 3.30-2.75 (m, 10.0H), 2.49 (m, 1.8H), 1.96 (m, 2.2H)

Applicatory Examples

Example 1 (Comparative Example)

A liquid crystal cell is prepared as described in the procedure below, wherein the liquid crystal is aligned by photo reactive polymer P34.

A 5.0 wt % solution is prepared by mixing the polymer P34 in solvent of N-methyl-2-pyrrolidone (NMP) and a second solvent butyl cellulose (BC) and the whole composition is stirred thoroughly and filtered to obtain the final solution. The solvent ratio between N-methyl-2-pyrrolidone and butyl cellulose is 50:50.

The above polymer solution is spin-coated onto the two ITO coated glass substrates at a spin speed of 2700 rpm for 30 seconds. After spin coating, the substrates are subjected to baking procedure consisting of pre-baking for 5 minutes at 130° C. and post-baking for 40 minutes at a temperature of 220° C. The resulting layer thickness is around 67 nm.

The substrates with the coated polymer layer on top are exposed to linearly polarized UV light (LPUV) at an incidence angle of 40° relative to the normal of the substrate surface. The plane of polarization is within the plane spanned by the substrate normal and the propagation direction of the light. The applied exposure dose is 48 mJ/cm$^2$.

After LPUV exposure, a cell is assembled with the 2 substrates, the exposed polymer layers facing to the inside of the cell. The substrates are adjusted relative to each other such that the induced alignment directions are parallel to each other (corresponds to the anti-parallel rubbed configuration in case of alignment by rubbing procedure). The cell is capillary filled with liquid crystal MLC6610(Merck KGA), which had a negative dielectric anisotropy.

The liquid crystal in the cell shows well defined homeotropic orientation. A tilt angle of 86.72° is measured using the crystal rotation method.

Example 2 (Comparative Example)

Another cell ss prepared in similar manner as in Example 1. Voltage holding ratio of this cell is measured at room temperature. The voltage decay V (at T=20 ms) of a voltage surge if 64 µs with $V_0$(V at t=0)=5V is then measured over a period of T=20 ms. The voltage holding ratio is then determined, given by VHR=$V_{rms}$(t=T)/$V_o$ is 99.50% at room temperature.

Example 3 (Comparative Example)

A liquid crystal cell is prepared in similar manner as in Example 1 but with a 4% solution of polymer P35, with spin speed of 2800 rpm-30 seconds and exposure dose of 48 mJ with an incidence angle of 40°. The liquid crystal in the cell shows well defined homeotropic orientation. A tilt angle of 88.14° is measured using the crystal rotation method.

Example 4 (Comparative Example)

Another cell is prepared in similar manner as in Example 3. Voltage holding ratio of this cell measured as in Example 2 is 99.60% at room temperature.

Example 5

A liquid crystal cell is prepared in similar manner as in Example 1 but with a 5% solution of polymer P24, with spin speed of 2800 rpm-30 seconds and exposure dose of 48 mJ with an incidence angle of 40°. The liquid crystal in the cell shows well defined homeotropic orientation. A tilt angle of 87.82° is measured using the crystal rotation method. This shows the advantage of fine-tuning the optical properties by copolymerization.

Example 6

Another cell is prepared in similar manner as in Example 5. Voltage holding ratio of this cell measured as in Example 2 is 99.60% at room temperature. This shows the flexibility of fine-tuning the electro-optical properties without worsening by copolymerization.

Example 7

A liquid crystal cell is prepared in similar manner as in Example 1 but with a 4% solution of polymer P20, with spin speed of 2400 rpm-30 seconds and exposure dose of 48 mJ with an incidence angle of 40°. The liquid crystal in the cell shows well defined homeotropic orientation. A tilt angle of 87.62° is measured using the crystal rotation method. This again shows that the optical properties could be fine-tuned by copolymerization.

Example 8

Another cell is prepared in similar manner as in Example 7. Voltage holding ratio of this cell measured as in Example 2 is 99.60% at room temperature. This shows the flexibility of fine-tuning the electro-optical properties without worsening by copolymerization.

Example 9

A liquid crystal cell is prepared in similar manner as in Example 1 but with a 4% solution of polymer P5, with spin speed of 1600 rpm-30 seconds, but with post-baking temperature of 40 min-200° C. and exposure dose of 48 mJ with an incidence angle of 40°. The liquid crystal in the cell shows well defined homeotropic orientation. A tilt angle of 88.68° is measured using the crystal rotation method. This again shows the flexibility of fine-tuning the optical properties by copolymerization.

Example 10

Another cell is prepared in similar manner as in Example 9. Voltage holding ratio of this cell measured as in Example 2 is 99.60% at room temperature. This again shows the flexibility of fine-tuning the electro-optical properties without worsening by copolymerization.

Example 11

A liquid crystal cell is prepared in similar manner as in Example 9 but with a 5% solution of polymer P7, with spin speed of 2200 rpm-30 seconds. The liquid crystal in the cell shows well defined homeotropic orientation. A tilt angle of 87.63° is measured using the crystal rotation method.

Example 12

A liquid crystal cell is prepared in similar manner as in Example 9 but with a 5% solution of polymer P22, with spin speed of 2200 rpm-30 seconds. The liquid crystal in the cell shows well defined homeotropic orientation. A tilt angle of 87.93° is measured using the crystal rotation method.

Example 13

A liquid crystal cell is prepared in similar manner as in Example 1 but with a 5% solution of polymer P25, with spin speed of 2800 rpm-30 seconds and exposure dose of 48 mJ with an incidence angle of 40°. The liquid crystal in the cell shows well defined homeotropic orientation. A tilt angle of 87.75° is measured using the crystal rotation method.

Example 14

A liquid crystal cell is prepared in similar manner as in Example 1 but with a 5% solution of polymer P23, with spin speed of 2000 rpm-30 seconds and exposure dose of 48 mJ with an incidence angle of 40°. The liquid crystal in the cell shows well defined homeotropic orientation. A tilt angle of 87.59° is measured using the crystal rotation method.

Example 15

A liquid crystal cell is prepared in similar manner as in Example 1 but with a 5% solution of polymer P28, with spin speed of 5500 rpm-30 seconds and exposure dose of 48 mJ with an incidence angle of 40°. The liquid crystal in the cell shows well defined homeotropic orientation. A tilt angle of 88.03° is measured using the crystal rotation method.

Example 16

A liquid crystal cell is prepared in similar manner as in Example 9 but with a 4% solution of polymer P30, with spin speed of 1500 rpm-30 seconds. The liquid crystal in the cell shows well defined homeotropic orientation. A tilt angle of 88.10° is measured using the crystal rotation method. This shows again the flexibility of fine-tuning the optical properties by copolymerization.

The invention claimed is:
1. Copolymer comprising
a) a first monomer of formula (IV),

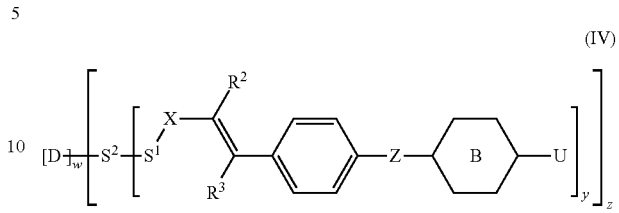

wherein
B represents an unsubstituted or substituted benzene or phenylene, pyridine, triazine, pyrimidine, biphenylene, naphthalene, phenanthrene, triphenylene, tetraline;
U is hydrogen, or with a polar group substituted or unsubstituted $C_1$-$C_{16}$alkyl group; or —$CF_3$, —$CF_2$H, —$CH_2$F, -$Q^1$-($C_1$-$C_6$alkylen)-$CF_3$, -$Q^1$-($C_1$-$C_6$ alkylen)-$CF_2$H, -$Q^1$-($C_1$-$C_6$ alkylen)-$CH_2$F, -$Q^1$-($C_1$ -$C_6$ alkylen)-$CF_2CF_3$, -$Q^1$-($C_1$-$C_6$ alkylen)-$CF_2CHF_2$, -$Q^1$-($C_1$-$C_6$ alkylen)-$CF_2CH_2$F, -$Q^1$-($C_1$-$C_6$alkylen)-CFHCF_3$, -$Q^1$-($C_1$-$C_6$alkylen)-CFHCHF_2$, -$Q^1$-($C_1$-$C_6$ alkylen)-CFHCH_2$F, -$Q^1$-($C_1$-$C_6$alkylen)-$CF_2CH_3$, -$Q^1$-($C_1$-$C_6$ alkylen)-CFHCHF_2$,-$Q^1$-($C_1$-$C_6$ alkylen)-($CF_2$)$_2$$CF_3$, -$Q^1$-($C_1$-$C_6$ alkylen)-($CF_2$)$_2$$CHF_2$, -$Q^1$-($C_1$-$C_6$ alkylen)-($CF_2$)$_2$$CH_2$F, -$Q^1$-($C_1$-$C_6$alkylen)-($CF_2$)$_2$$CH_3$, -$Q^1$-($C_1$-$C_6$alkylen)-($CF_2$)$_3$$CHF_2$, -$Q^1$-($C_1$-$C_6$alkylen)-($CF_2$)$_3$$CH_2$F, -$Q^1$-($C_1$-$C_6$alkylen)-($CF_2$)$_3$$CF_3$, -$Q^1$-($C_1$-$C_6$alkylen)-CF($CF_3$)$_2$, -$Q^1$-($C_1$-$C_6$alkylen)-$CF_2$(CHF)$CF_3$;
wherein one or more C-atom, CH- or $CH_2$-group is independently from each other not replaced or replaced by a linking group; and wherein
$Q^1$ represents a single bond or —NH—, —N($CH_3$)—, —NH—CO—, —CO—NH—, —NH—CO—O—, —O—CO—NH—, —NH—CONH—, —CON($CH_3$)—, —($CH_3$)NCO—, —O—, —CO—, —COO—, —OCO—, —$OCF_2$—, —$CF_2$—O—, —$CF_2$S—, —$SCF_2$—, —$CF_2$NH—, —NH$CF_2$—, —S—, —CS—, —SCS—, —SCO—, —CH=CH—, —C≡C— or —O—CO—O—; and
Z is a bridging group selected from the group consisting of —O—, —CO—, —COO—, —OCO—, —OCOO—, —$OCF_2$—, —$CF_2O$—, —CON($CH_3$)—, —($CH_3$)NCO—, —CONH—, —NHCO—, —CO—S—, —S—CO—, —CSS—, —SOO—, —OSO—, —CSS—, —SOO—, —OSO—, —$CH_2$($SO_2$)—, —$CH_2$—$CH_2$—, —$OCH_2$—, —$CH_2$O, —CH=CH—, —C≡C—, —CH=CH—COO—, —OCO—CH=CH—, or a single bond;
$S^1$ and $S^2$ each independently from each other represents a single bond or a spacer unit, which is a cyclic, straight-chain or branched, substituted or unsubstituted $C_1$-$C_{24}$alkylen, in which one or more C-atom, CH- or $CH_2$- group may be replaced by a linking group, and/or a non-aromatic, aromatic, unsubstituted or substituted carbocyclic or heterocyclic group of formula (V):

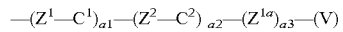

wherein:
$C^1$, $C^2$ each independently represents an alicyclic or aromatic, optionally substituted carbocyclic or heterocyclic group, and
$Z^1$, $Z^2$, $Z^{1a}$ each independently represents a bridging group within the above given meanings, and a1, a2, a3 each independently represents an integer from 0 to 3, such that a1+a2+a3≤6;

X is a bivalent aromatic group, or X is —CH$_2$—, —CO—, —CS—, —O(CO)—, —(CO)O—, —NH(CO)—, —(CO)NH—, —OCF$_2$—, —((C$_1$-C$_6$alkyl)-N)CO—, or —((CH$_3$)N)CO—, or —S(CS)—, —O(CS)—, —S(CO)—;

R$^2$ and R$^3$ are hydrogen and/or nitrile;

y and z are each independently from each other 1, 2, 3 or 4;

w is 1, 2, 3, or 4, and wherein

D represents an unsubstituted or substituted aliphatic, aromatic or/and alicyclic polymerisable group, with the proviso that a 1,3-diamino phenyl group is excluded, and b) a second monomer having at least one monomer selected from the group of compounds having at least one not-photoreactive or at least one photoreactive group, with the proviso that the second monomer is different from that the first monomer and with the proviso that if Z of the first monomer is —OCF$_2$— or —CF$_2$O—, then Z of the second monomer is not —OCF$_2$— or —CF$_2$O—.

2. Copolymer according to claim 1, wherein the second monomer comprises a photoreactive group, which is selected from formula (II)

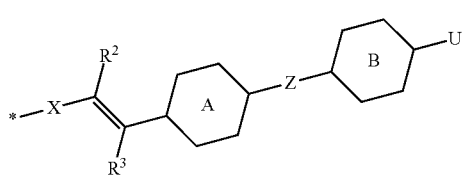

(II)

wherein A is selected from the group consisting of benzene, phenylene, pyridine, triazine, pyrimidine, biphenylene, naphthalene, phenanthrene, triphenylene, and tetraline which are uninterrupted or interrupted by at least a single heteroatom and/or at least a single bridging group;

B is unsubstituted or substituted benzene or phenylene, pyridine, triazine, pyrimidine, biphenylene, naphthalene, phenanthrene, triphenylene, tetraline, cyclohexylene or a steroidal skeleton;

U represents hydrogen or a straight-chain or branched, unsubstituted or at least once, with halogen, nitile, ether, ester, siloxane, amide or amine substituted C$_1$-C$_{16}$alkyl group, wherein one or more C-atom, CH—or CH$_2$-group is independently from each other not replaced or replaced by a linking group which is selected from a single bond, —S—, —S(CS)—, —(CS)S—, —CO—S—, —S—CO—, —O—, —CO, —CO—O—, —O—CO—,

—NR$^{2'}$—, —NR$^{2'}$—CO—, —CO—NR$^{2'}$—, —NR$^{2'}$—CO—O—, —O—CO—NR$^{2'}$—, —NR$^{2'}$—CO—NR$^{2'}$—, —CH=CH—, —C≡C—, —O—,CO—O—, —Si(CH$_3$)$_2$—O—Si(CH$_3$)$_2$-, a cyclic, straight-chain or branched, substituted or unsubstituted C$_1$-C$_{24}$alkylen, wherein one or more C-atom, CH—or CH$_2$-group may independently from each other be replaced by —O—; and unsubstituted or substituted cyclohexylen and unsubstituted or substituted phenylene and wherein:

R$^{2'}$ represents a hydrogen atom or C$_1$-C$_6$alkyl;

with the proviso that oxygen atoms of linking groups are not directly linked to each other;

Z is a bridging group selected from the group consisting of —O—, —CO—, —COO—, —OCO—, —OCOO—, —OCF$_2$—, —CF$_2$O—,—CON(CH$_3$)—, —(CH$_3$)NCO—, —CONH—, —NHCO—, —CO—S—, —S—CO—, —CSS—, —SOO—, —OSO—, —CSS—, —SOO—OSO—CH$_2$(SO$_2$)—, —CH$_2$—CH$_2$—, —OCH$_2$—, —CH$_2$O, —CH=CH—, —C≡C—,—CH=CH—COO—, —OCO—CH=CH—, or a single bond;

X is a bivalent aromatic group, or X is —CH$_2$—, —CO—, —CS—, —O(CO)—, —(CO)O—, —NH(CO)—, —(CO)NH—, —OCF$_2$—, —((C$_1$-C$_6$alkyl)—N)CO—, or —((CH$_3$)N)CO—, or —S(CS)—, —O(CS)—, —S(CO)—;

R$^2$ and R$^3$ are hydrogen and/or nitrile;

or coumarin group, chalcon group, stilben group and azobenzene group.

3. Copolymer according to claim 1, wherein the second monomer comprises a not-photoreactive group, which is a carbocyclic or heterocyclic aromatic and/or alicyclic or aliphatic group, which is unsubstituted or substituted by an acrylate group, vinyl group, allyl group, epoxy group, maleinimide group, straight-chain or branched C$_1$-C$_{16}$alkyl group, C$_1$-C$_6$alkylacrylate group, C$_1$-C$_{16}$ alkylvinyl group, C$_1$-C$_{16}$alkylallyl group, C$_1$-C$_{16}$alkylepoxy group, C$_1$-C$_{16}$alkylmaleinimide group.

4. Copolymer according to claim 1, wherein the second monomer comprises a not-photoreactive group, which is substituted or unsubstituted phenylen-(bridging group)-phenylene-, or (phenylene)$_{n1}$-(bridging group)$_{m1}$-(phenylene)$_{n2}$-(bridging group)$_{m1}$-(cyclohexylen)$_{n3}$-, wherein n1, n2, n3 represent an integer of 0, 1, 2,3, 3 or 4 and m1, m2 an interger of 0 or 1, with proviso that at least one n1, n2, n3 or n4 is >1; or naphthylene or phenylene, which are unsubstituted or substituted by at least one, acrylate group, vinyl group, allyl group, epoxy group, maleinimide group, straight-chain or branched C$_1$-C$_{16}$alkyl group, C$_1$-C$_{16}$alkylacrylate group, C$_1$-C$_{16}$alkylvinyl group, C$_1$-C$_{16}$alkylallyl group, C$_1$-C$_{16}$alkylepoxy group, C$_1$-C$_{16}$alkylmaleinimide group; or a steroidal skeleton.

5. Copolymer according to claim 2, comprising a) a first monomer of formula (II) wherein U is a straight-chain or branched, with fluorine, in the terminal position of the alkyl group substituted C$_1$-C$_{16}$alkyl group, wherein one or more C-atom, CH—or CH$_2$-group is independently from each other not replaced or replaced by a linking group, and b) a second monomer having at least one monomer selected from the group of compounds having at least one photoreactive group of formula (II) with the same meaning as described above, with the proviso that the U substituent is different from that of the first monomer.

6. Composition, comprising a copolymer as described in claims 1, 3, 4, or 5.

7. Method for the preparation of a copolymer as described in claim 1, which comprises bringing into contact the first and the second monomer.

8. Copolymer, which is obtainable by the method according to claim 7.

9. Copolymer layer comprising at least a copolymer as described in claim 1 or 8.

10. Optical and electro-optical unstructured or structured constructional elements, comprising a copolymer as described in claim 1.

11. Optical and electro-optical unstructured or structured constructional elements according to claim 10, represented by multilayer systems, or devices for the preparation of a display waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays; (PSVA) polymer stabilised vertically aligned; (FPA) field-induced photo-reactive alignment; hybrid FPA; vertically aligned (VA); VA-IPS mode liquid crystal displays, or displays using blue phase liquid crystals; all above display types are applied in either transmissive or reflective or transflective mode, comprising a copolymer as described in claim 1.

12. Orientation layer, comprising at least one composition as described in claim 6.

13. Copolymer according to claim 1, wherein y and z are each independently from each other 1 or 2, and w is 1 or 2.

* * * * *